United States Patent [19]

Ueda et al.

[11] Patent Number: 5,799,237
[45] Date of Patent: Aug. 25, 1998

[54] READING APPARATUS IN WHICH IMAGE READING MEANS MAY BE FIXED TO READ AND ORIGINAL BEING CONVEYED

[75] Inventors: Noriyoshi Ueda; Masakazu Hiroi, both of Yokohama; Shinichi Nakamura, Kawasaki; Yoshio Mizuno, Ichikawa; Chikara Sato, Hachioji; Tokuharu Kaneko, Yokohama; Yoshinori Isobe, Tokyo; Akimaro Yoshida, Yokohama; Yasuhide Hishikawa, Kawasaki; Tomohito Nakagawa, Matsudo, all of Japan

[73] Assignee: Canon Kabushiki Kaisha, Japan

[21] Appl. No.: 865,620

[22] Filed: May 30, 1997

Related U.S. Application Data

[63] Continuation of Ser. No. 674,989, Jul. 3, 1996, abandoned, which is a continuation of Ser. No. 321,923, Oct. 12, 1994, abandoned.

[30] Foreign Application Priority Data

Oct. 14, 1993 [JP] Japan ................ 5-280404
Oct. 14, 1993 [JP] Japan ................ 5-280405

[51] Int. Cl.$^6$ ............................................ G03G 15/00
[52] U.S. Cl. ................. 399/367; 399/365; 399/372
[58] Field of Search ........................... 399/361, 365, 399/367, 368, 371, 372; 271/110, 114, 121, 130, 38

[56] References Cited

U.S. PATENT DOCUMENTS

| | | | |
|---|---|---|---|
| 4,479,061 | 10/1984 | Koizumi et al. | 250/487.1 |
| 4,660,957 | 4/1987 | Ueda et al. | |
| 4,866,484 | 9/1989 | Murai | |
| 4,934,683 | 6/1990 | Ueda et al. | 271/3.1 |
| 4,935,775 | 6/1990 | Ueda et al. | |
| 4,992,827 | 2/1991 | Kobayashi et al. | |
| 5,018,714 | 5/1991 | Honjo et al. | 271/3.1 |
| 5,029,315 | 7/1991 | Morikawa et al. | |
| 5,119,145 | 6/1992 | Honjo et al. | |
| 5,125,636 | 6/1992 | Higashio et al. | |
| 5,132,741 | 7/1992 | Kitajima et al. | |
| 5,237,380 | 8/1993 | Iimori | |
| 5,278,622 | 1/1994 | Segawa | |
| 5,385,341 | 1/1995 | Yamada et al. | |

FOREIGN PATENT DOCUMENTS

| | | |
|---|---|---|
| 60-2965 | 1/1985 | Japan |
| 60-218638 | 11/1985 | Japan |
| 63-163448 A | 7/1988 | Japan |
| 1-272260 | 10/1989 | Japan |
| 1-294137 | 11/1989 | Japan |
| 3-278070 A | 12/1991 | Japan |
| 4-81775 | 3/1992 | Japan |

OTHER PUBLICATIONS

Patent Abstracts of Japan, vol. 012, No. 431 (P-786), Nov. 15, 1988, relating to JP 63 163448 A, Jul. 6, 1988.
Patent Abstracts of Japan, vol. 016, No. 102 (P-1324), Mar. 12, 1992, relating to JP 03 278070 A, Dec. 9, 1991.

*Primary Examiner*—Sandra L. Brase
*Attorney, Agent, or Firm*—Fitzpatrick, Cella, Harper & Scinto

[57] ABSTRACT

A reading apparatus includes an image reader for reading a sheet original positioned at a reading position and an automatic original conveyor for supplying the sheet original onto the reading position, wherein the sheet original can be read through an image flow reading mode while the sheet original is being conveyed by the automatic original conveyor by fixing the image reader at any position. The apparatus also has a convey path for directing the sheet original to the reading position, and a controller for initiating conveyance of the sheet original waiting at a predetermined position in the convey path in response to a flow reading mode start signal during the image flow reading mode and for initiating the image flow reading mode by outputting an image tip signal when a tip end of the sheet original reaches a flow reading image tip position.

56 Claims, 43 Drawing Sheets

CL MEANS CLUTCH; SL MEANS SOLENOID; D MEANS DRIVER; PLL MEANS PLL CIRCUIT;
AR MEANS SWITCHBACK; CP MEANS CLOSED LOOP; IRQ MEANS INTERRUPT REQUEST
SPC MEANS STEPPING MOTOR PATTERN CONTROLLER

READING APPARATUS IN WHICH IMAGE READING MEANS MAY BE FIXED TO READ AND ORIGINAL BEING CONVEYED

This application is a continuation of application No. 08/674,989, filed Jul. 3, 1996, which is a continuation of application Ser. No. 08/321,923, filed Oct. 12, 1994, both now abandoned.

BACKGROUND OF THE INVENTION

1. Field of the Invention

The present invention relates to a reading apparatus and an image forming apparatus using such a reading apparatus. More particularly, it relates to an image forming apparatus such as a copying machine, a laser beam printer and the like having a sheet convey apparatus for conveying a sheet to a predetermined position such as an image reading portion.

2. Related Background Art

Automatic original feeding apparatuses are grouped into an original circulating type (RDF) and an original non-circulating type (ADF). In case of the original feeding apparatuses of RDF type, exposure regarding an original is effected while the original is being passed through an exposure portion, and then the original is discharged above (or below) an original stacking portion. Further, when a plurality of copies of the same originals are desired, the originals are successively re-circulated.

Thus, combination of a flow-reading mode, wherein the exposure regarding the original is effected while the original is being moved, and the original feeding apparatus of RDF type does not require to shifting an exposure device. In contrast; in a stationary reading mode, the original is temporarily stopped and then the exposure apparatus is shifted along an original area. Accordingly, exchange time for exchanging originals can be reduced and the copying system can be operated at a high speed, thereby providing high productivity. Further, comparing the above-mentioned combination with the stationary reading mode with respect to a predetermined original exchange time, the above-mentioned combination permits the circulation of originals at an original shifting speed slower than that of the stationary reading mode, thereby reducing noise.

Referring to the combination of the flow reading mode and the RDF, the copying system can have higher speed operation and greater productivity by further combining it with a flash exposure technique. Although detailed explanation of the flash exposure technique is omitted, in comparison with the aforementioned exposure device, the flash exposure device is so designed as to expose the entire surface of the original simultaneously and requires a high power light source and a photosensitive body of belt type, thereby making the device bulky, expensive and high power consuming. Thus, the use of the flash exposure technique is limited to large high-speed operated copying machines.

On the other hand, the above-mentioned original feeding apparatus of ADF type is designed so that the original is stopped at a predetermined position on a platen, exposure operations corresponding to the number of copies are repeated by shifting the exposure device reciprocally, the original is discharged onto a predetermined discharge tray after the exposure, and the above-mentioned operations are repeated to obtain the predetermined number of copies. In the copying system using the ADF, since each original is not required to be circulated several times by combining the system with a sorter, the damage to the originals can be reduced.

In consideration of the above technique, recently, various techniques for achieving high speed operation and reduction of noise have been proposed.

As a first example, the inventors of the subject invention have proposed an image forming apparatus wherein either of two sheet supply means arranged on both sides of a sheet stacking tray is selectively and automatically operated to supply a sheet to an image reading portion depending on the size of the original, the mode and the like, and an image is formed on the supplied sheet.

For example, regarding a system of RDF type, as shown in FIG. 21, in an original stationary reading mode (in which a sheet is supplied from a first sheet supply means), sheet originals P stacked on a sheet stacking plate 304 are separated one by one by a first sheet separation means 306, the separated sheet original is conveyed by a sheet supply means 338 to a predetermined position on a platen 303, an image formed on the sheet original is read by shifting an image reading portion (optical system) 380 in a copying machine 301 in a direction shown by the arrow a, and the sheet original is then re-stacked on the sheet stacking plate 304 by a discharge means 311. In an original flow reading mode (in which a sheet original is supplied from a second sheet supply means), the sheet originals P stacked on the sheet stacking plate 304 are separated one by one by a second sheet separation means 314, and the separated sheet original is conveyed by a sheet supply means 315. The optical system 380 is fixed to a position spaced apart from a home position (shown by the broken line) of the optical system by a distance L, the sheet original P conveyed by a wide belt 307 arranged above the platen 303 at a constant speed is read by the optical system while the sheet original is being moved, and the read sheet original is discharged onto the sheet stacking plate 304 by the discharge means 311.

In the case where the flow reading mode is selected, for example, when the operator rests originals of small size (for instance, A4 size, B5 size, LTR size or the like) on the original tray 304 and depresses a start key (not shown) of the copying machine, the flow reading mode is started if a first inlet sensor 322 is turned ON and a sheet length detection sensor 368 is turned OFF. In this case, first of all, the original tray 304 is lowered to a predetermined position around a fulcrum 340, so that the sheet originals P are bundle-fed toward the second separation means 314 by a stopper (sheet bundle convey means) 321 until the sheet originals reach a bundle convey position detection sensor 328 to turn this sensor ON. Then, the sheet original is supplied by the number of the second sheet supply means 315 to the platen 303, where the image on the sheet original is read by the original flow reading mode to obtain the copy. Thereafter, the sheet original is discharged from the platen onto the original tray 304 through a pair of discharge rollers 311. Whenever the sheet original is discharged, a trailing end of the sheet original is pushed toward the second separation means by the stopper 321 to align the sheet original with the other sheet originals on the original tray. When the sheet originals are circulated again, after all of the sheet originals are discharged onto the original tray, the sheet originals are bundle-fed, supplied and copied again.

As a second example, there has been proposed a copying machine (FIGS. 19 and 20) wherein the flow reading mode is effected through the original non-circulating fashion (ADF).

In this copying machine, when the sheet original is conveyed to the platen, the flow reading mode is effected with the exposure device fixed at a predetermined position below the platen, and after the sheet original is read, the sheet original is discharged onto the original tray. In this case, when a number of same copies are desired, after the flow reading is finished, the sheet original is not discharged but is temporarily is stopped at that position, and the exposure device is reciprocally shifted by the number of times corresponding to the number of copies to read the sheet original. Thereafter, the sheet original is discharged onto the original tray (i.e. combination of the flow reading mode and the stationary reading mode).

In the above-mentioned proposed copying machines, for example, regarding the first example, since the original re-circulating process is used, the original exchange speed in the flow reading mode can be increased to achieve high productivity and to reduce noise. However, if a number of same copies are desired, a set of sheet originals must be re-circulated by the number of times corresponding to the number of copies, with the result that high stress is applied to the sheet original when the sheet original passes through the separation means and the sheet original is curled when it is passed through a curved convey paths, thereby damaging the sheet original. Further, the poor conveyance is apt to occur during the handling of the sheet originals to reduce the reliability of the machine.

On the other hand, regarding the second example (FIGS. 19 and 20), since the sheet originals are not re-circulated, there is no problem regarding damage of the sheet original. However, it is difficult to increase the original exchange time and to effect the registration between the sheet original and a transfer sheet with high accuracy.

For example, in the copying machine regarding the second example shown in FIG. 19, there are two flow reading positions 1102, 1103. In this case, for example, when the sheet original of small size is read by the flow reading mode, if a sheet-to-sheet distance is kept constant in 1:1 mode, the predetermined productivity may be ensured; however, in 1:n mode, since a distance lx between an image tip timing sensor 1004 and the flow reading position is great, the original exchange time will be increased. That is to say, when the combination of the flow reading mode and the stationary reading mode is used, since a wide belt 1005 cannot be moved while the preceding original is read by the optical system through the stationary reading mode, the tip end of the succeeding original must be waiting at an upstream side of the image tip timing sensor 1004, with the result that the sheet-to-sheet distance lx is increased to increase the original exchange time, thereby not achieving high productivity. If the distance lx between the image tip timing sensor 1004 and the flow reading position is shortened to improve the productivity, during the flow reading mode, the trailing end of the original is subjected to shock due to clutch ON/OFF of an upstream drive system (separation and supply of the original) to cause undesirable movement of the image, thereby deteriorating the copied image. Further, the sheet original having large size cannot be completely read. The copying machine shown in FIG. 20 has the same disadvantage.

SUMMARY OF THE INVENTION

An object of the present invention is to provide a reading apparatus and an image forming apparatus in which a flow reading mode and a stationary reading mode can be used in combination and which can prevent damage of a sheet original, reduce noise and achieve high productivity.

To achieve the above object, the present invention is directed to an image forming apparatus comprising an image reading means for reading a sheet original positioned at a reading position (platen glass) and an automatic original convey means for supplying the sheet original onto the platen glass. The sheet original can be read through an image flow reading mode while the sheet original is being conveyed by the automatic original convey means by fixing the image reading means at any position. The apparatus comprises a convey path for directing the sheet original to the platen glass, and a control means for initiating conveyance of the sheet original waiting at a predetermined position in the convey path in response to a flow reading mode start signal during the image flow reading mode and for initiating the image flow reading mode by outputting an image tip signal when a tip end of the sheet original reaches a flow reading image tip position.

Further, the present invention is direction to the image forming apparatus comprising an image reading means for reading a sheet original positioned at a reading position (platen glass) and an automatic original convey means for supplying the sheet original onto the platen glass. The sheet original can be read through an image flow reading mode while the sheet original is being conveyed by the automatic original convey means by fixing the image reading means at any position and then the sheet original can be read through a stationary reading mode by shifting the image reading means after the sheet original is positioned and fixed at a predetermined position on the platen glass. The apparatus further comprises a convey path for directing the sheet original to the platen glass, and a control means for initiating conveyance of the sheet original waiting at a predetermined position in the convey path in response to a flow reading mode start signal during the image flow reading mode and for initiating the image flow reading mode by outputting an image tip signal when a tip end of the sheet original reaches a flow reading image tip position.

With the arrangement as mentioned above, in the image forming apparatus which can utilize both the flow reading mode and the stationary reading mode, a distance between an original waiting position in the flow reading mode and a flow reading image tip can be set to a minimum running distance for stabilizing a flow reading speed so that a succeeding original can be conveyed while keeping a constant distance between the succeeding original and a preceding original (original being read through the flow reading mode) while the preceding original is being conveyed (scanned). When the preceding original reaches the stationary reading position (where the fixed original is read by shifting an optical system), the succeeding original can be positioned and fixed at the original waiting position (in the flow reading mode) by the control means, thereby permitting continuous initiation of the flow reading mode and the stationary reading mode while keeping the minimum original-to-original distance to achieve high productivity and reduction of noise.

Further, the present invention is directed to the image forming apparatus comprising an image reading means for reading a sheet original positioned at a reading position (platen glass) and an automatic original convey means for supplying the sheet original onto the platen glass, and the sheet original can be read through an image flow reading mode while the sheet original is being conveyed by the automatic original convey means by fixing the image reading means at any position. A distance between a tip end waiting position of the original on the platen glass and a flow reading image tip position is set to have a predetermined running distance so that a shifting speed of the original when the tip end of the original waiting at the predetermined position on the platen glass during the flow reading mode reaches the flow reading image tip position is equal to a flow reading scan speed. It further comprises a control circuit for permitting such a movement of the original.

Further, the present invention is directed to the image forming apparatus comprising an image reading means for reading a sheet original positioned at a reading position (platen glass) and an automatic original convey means for supplying the sheet original onto the platen glass. The sheet original can be read through an image flow reading mode while the sheet original is being conveyed by the automatic original convey means by fixing the image reading means at any position and then the sheet original can be read through a stationary reading mode by shifting the image reading means after the sheet original is positioned and fixed at a predetermined position on the platen glass. A distance between a tip end waiting position of the original on the platen glass and a flow reading image tip position is set to have a predetermined running distance so that a shifting speed of the original when the tip end of the original waiting at the predetermined position the platen glass during the flow reading mode reaches the flow reading image tip position is equal to a flow reading scan speed. It further comprises a control circuit for permitting such a movement of the original.

Further, the present invention is related to the image forming apparatus comprising an image reading means for reading a sheet original positioned at a reading position (platen glass) and an automatic original convey means for supplying the sheet original onto the platen glass, and the sheet original can be read through an image flow reading mode while the sheet original is being conveyed by the automatic original convey means by fixing the image reading means at any position and then the sheet original can be read through a stationary reading mode by shifting the image reading means after the sheet original is positioned and fixed at a predetermined position on the platen glass. A distance between a flow reading exposure position and a reading start position of the reading means in the stationary reading mode is set to a distance obtained by adding a maximum length of a sheet original which can be read or scanned and a deceleration stop running distance of a drive system.

With the arrangement as mentioned above, in an image forming apparatus wherein both the flow reading mode and the stationary reading mode can be used and which includes the control means, by setting the original tip end waiting position at the predetermined position on the platen and by setting the distance between the predetermined position and the flow reading image tip position (exposure position) to the predetermined running distance, during the flow reading mode, the speed of the sheet original can be stabilized to be the same as the flow reading speed (process speed), thereby eliminating the distortion of the image due to the change in speed during exposure.

Further, in the combination of the flow reading mode and the stationary reading mode (referred to as "mix mode" hereinafter), the original-to-original distance can be minimized by determining the best timing between the tip end of the sheet original and the position on the platen. Thus, since the original-to-original distance is smaller than that in the case where the flow reading and the stationary reading are effected by determining the timing between the tip end of the sheet original and a position out of the platen, the high speed image formation and reduction of noise can be achieved. Further, in the flow reading mode, since the distance between the original waiting position and the reading position can be set to become shorter, highly accurate registration can be achieved.

Further, in the combination of the flow reading mode and the stationary reading mode (i.e. the mix mode), the distance between the flow reading image tip position and the waiting position of the original to be flow-read is set to the minimum running distance that the speed becomes constant after the rising acceleration of the drive system. After the constant speed is attained, inherent vibration of the drive system (overshoot and the like) falls within a level which does not adversely affect upon the image. Since the distance between the flow reading image tip position and the stationary reading image tip position is set in consideration of the minimum running distance taking into account the acceleration of speed reduction of the drive system in order to surely stop the sheet original at the stationary reading position with high accuracy after the flow reading is finished, highly accurate registration and high productivity can be achieved.

As mentioned above, according to the present invention, by using the combination of the flow reading and the stationary reading, it is possible to perform the flow reading scan of the sheet original during the exchange of the sheet originals and to perform the flow reading scan of the next sheet original during the exchange of the sheet originals. Thus, although the original exchange speed is normally 1300 mm/sec (top line speed), in the present invention, the original exchange can be effected at the same speed as the process speed of about 500 mm/sec without increasing the original exchange time.

Further, since the required productivity of the sheet original reading can be obtained, the reliability regarding the reduction of noise and prevention of damage of the sheet original can be improved while maintaining the high productivity. In addition, when a positional relation between the flow reading image tip position and the stationary reading image tip position is determined, the reading means and the sheet originals are arranged in consideration of the stop and rising control for the sheet original (minimum distance through which the sheet original reaches the flow reading speed) so that the flow reading and the stationary reading can be effected continuously while keeping the sheet-to-sheet distance between the preceding original and the succeeding original constant, the reliability regarding high productivity, reduction of noise and prevention of damage of the sheet original can be improved.

DETAILED DESCRIPTION OF THE PREFERRED EMBODIMENTS

Figure 1:
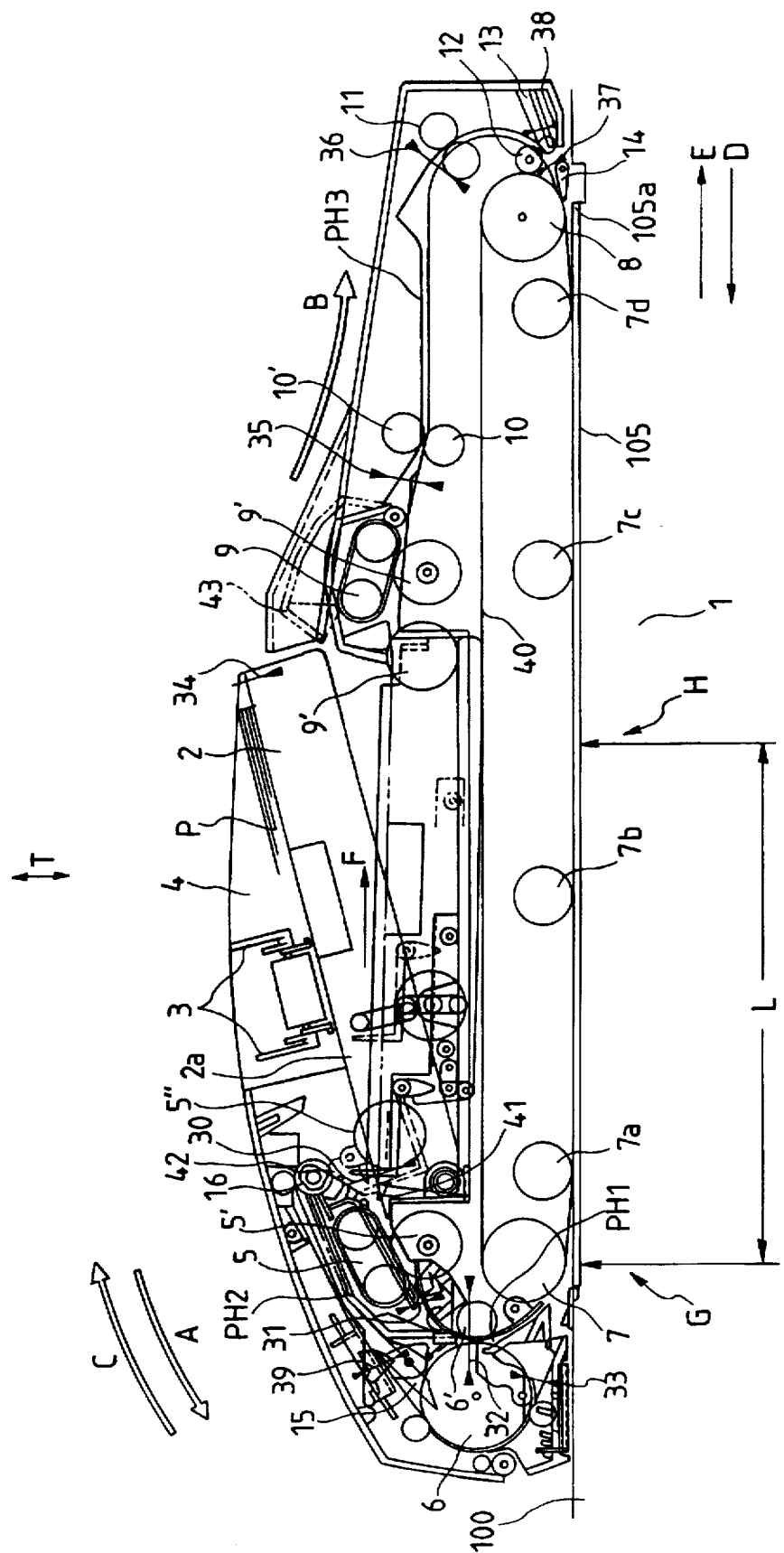
FIG. 1 is an elevational sectional view of an automatic original feeding apparatus (RDF) applied to an image forming apparatus according to the present invention.

The present invention will now be explained in connection with embodiments thereof with reference to the accompanying drawings. FIG. 1 shows an automatic original feeding apparatus according to a first embodiment (in this embodiment, since the automatic original feeding apparatus is shown as a re-circulating document feeder, the apparatus will be referred to as "RDF" hereinafter).

First of all, a fundamental flow of an original in the RDF will now be described briefly. A plurality of originals P stacked on a treatment tray 2 of the RDF 1 can be switched toward an A side (switch path) or a B side (closed-loop path) in accordance with a set mode and a size of the original. As an example, in case of the original having large size (for example, B4 size, A3 size or the like) or in case of a both-face copy mode, the original is supplied from the A side (switch back path) and is positioned at a predetermined position on a platen 105 of an image forming apparatus 100 through a predetermined path PH1 (not explained). After the original is exposed by an optical system, the original is conveyed toward a C side (discharge path PH2) to be returned onto the treatment tray 2.

A recycle lever 3 arranged above the treatment tray 2 serves to sort or divide the exposed (or copied) originals from non-exposed (or non-copied) originals. When a copy start button (not shown) is turned ON, the recycle lever 3 is rested on the original stack. Since the original is separated and supplied from the lowermost one, the recycle lever 3 rested on the uppermost original upon the depression of the copy start button is lowered below an original stacking surface 2a only when all of the originals are supplied to the platen, so that the operator can recognize that all of the originals have been circulated (1 cycle). Although detailed explanation of the arrangement of the RDF is omitted, the RDF comprises a separation and supply means 5, 5', 5'', a convey roller 6' for directing the original to the platen 105, a reverse rotation roller 6, and a pair of discharge rollers 16 for directing the original discharged from the platen 105 to the tray 2 or the platen again.

In case of a one-face copy mode regarding the original having small size, the original is supplied from the B side and is positioned at a predetermined position on the platen 105 of the image forming apparatus 100 through a predetermined path PH3 (not explained). After the original is exposed by an optical system, the original is conveyed toward the C side (discharge path PH2) to be returned onto the treatment tray 2. The RDF further comprises a separation and supply means 9, 9', 9'', a convey roller 10, a pair of regist rollers 11 for the B side (closed-loop path), and a back-up roller 12 arranged at a turn path portion to facilitate the handling of a thick original. In this case, the tray 2 is lowered to a horizontal position.

The RDF further includes a manual insertion path inlet 13 and a turn flapper 14. The back-up roller 12 also acts as a manual insertion supply roller. When the original is supplied from the B side, the turn flapper 14 is positioned above a platen edge 105a so that the original can be guided not to be caught by the platen edge 105a. When an original is manually supplied through the manual insertion supply inlet 13, the turn flapper 14 is also positioned above a platen edge 105a. After the copying operation, the turn flapper 14 is retarded below the platen edge 105a to dip the original returned toward an E direction.

Figure 2:
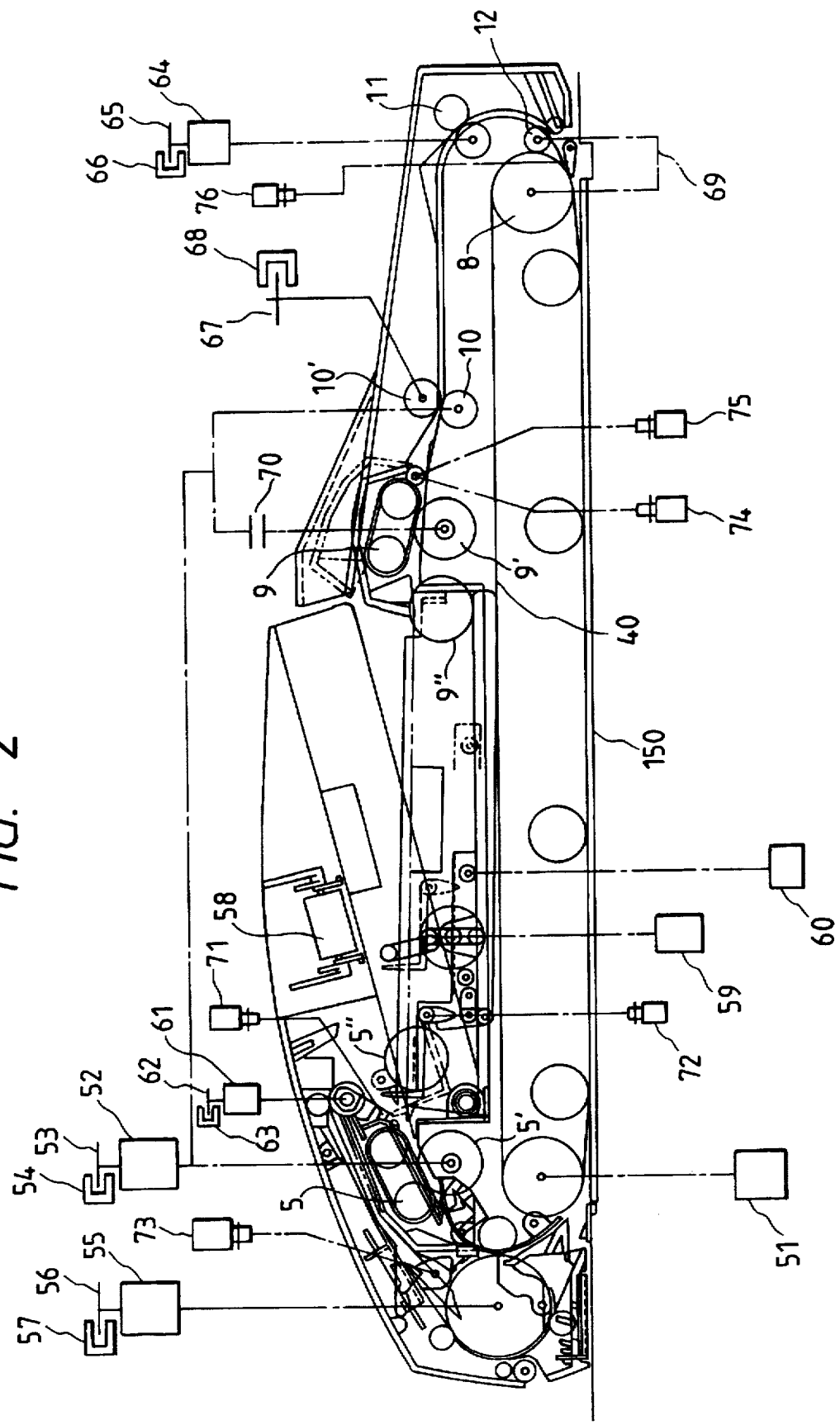
FIG. 2 is an elevational sectional view of a drive system of the RDF.

FIG. 2 shows a drive system of the RDF according to the illustrated embodiment.

In the illustrated embodiment, a stepping motor 51 is used as a drive means for driving a convey belt (means for conveying the original onto the platen) 40 arranged above the platen 105. One of reasons for using the stepping motor is that it has good controlling ability (i.e. quick control response of start and stop of the motor) and that a moving speed of the convey belt 40 (and the back-up roller driven by the convey belt) must be correctly equalized to a rotational speed of the pair of regist rollers 11 (fully described later).

Further, the back-up roller 12 receives a driving force from the turn roller 8 driven by the convey belt 40 so that a rotational speed of the back-up roller is equalized to the peripheral moving speed of the convey belt 40. The regist rollers 11 in the closed-loop path are driven by a stepping motor 64. One of reasons for using the stepping motor 64 is that it is important to equalize the speed of the convey belt to the speed of the regist rollers, as mentioned above (to ensure high accurate registration). In the illustrated embodiment, while the convey belt 40 and the regist rollers 11 were driven by the stepping motors, the convey belt and the regist rollers may be driven from a same drive source by controlling speed equalization under the PLL control of a DC motor or by turning ON/OFF a clutch associated with a single drive source. Incidentally, the reference numeral 65 denotes a clock disc attached to a drive shaft of the stepping motor 64; and 66 denotes a clock detection sensor for detecting out-of-phase of the stepping motor 64.

A separation motor 52 serves to drive the separation and supply means 5, 5', 5" at the switch back side when it is rotated in a normal direction and to drive the separation and supply means 9, 9', 9" and the convey roller 10 at the closed-loop side when it is rotated in a reverse direction. In order to effect the speed control, a clock disc 53 is attached to a drive shaft of the separation motor 52 and a clock sensor 54 is associated with the clock disc. Further, when the separation motor 52 is reversely rotated, a driving force from the separation motor is transmitted to the separation and supply means 9, 9', 9" through a clutch 70 so that the separation and supply means 9, 9', 9" can be selectively rotated or stopped by turning ON/OFF the clutch. Further, a clock disc 67 is attached to a roller shaft of a drive roller 10' urged against the convey roller 10 and a clock count sensor 68 is associated with the clock disc so that conveying speed and a conveyed amount of the original can be counted.

Furthermore, a reverse rotation motor 55 having a reverse rotation roller is used as a drive means for effecting the registration and reverse rotation at the switch back side. In the illustrated embodiment, the reverse rotation motor 55 is a DC motor, and the speed of the convey belt 40 is equalized to the speed of the reverse rotation roller 6 under the PLL control. In order to effect the PLL control, a clock disc 56 is attached to a drive shaft of the reverse rotation motor 55 and a clock detection sensor 57 is associated with the clock disc. Incidentally, a stepping motor may be used as the reverse rotation motor to synchronize with the aforementioned belt motor to attain the speed equalization.

Further, a discharge motor 61 serves to drive the discharge rollers 16 in the switch back path. In order to equalize the speed of the discharge rollers to the speed of the reverse rotation roller 6, a clock disc 62 is attached to a drive shaft of the discharge motor and a clock sensor 63 is associated with the clock disc. Further, a tray ascend/descend motor 59 is used as a drive source capable of lifting and lowering the original tray 2 in the closed-loop original handling process.

At the initial phase of the closed-loop original handling process, a tip end of the original stack is conveyed to reach the closed-loop separation and supply means 9, 9', 9" by an abutment shutter 41. In this case, a bundle convey motor 60 (stepping motor in the illustrated embodiment) is used as a bundle convey drive means and a drive means for jogging the original (returned after the closed-loop original handling process) toward the separation and supply means again. Further, as mentioned above, a recycle motor 58 arranged inside of a tray side regulating plate 4 is used as a drive source for driving the recycle lever 3 for dividing the copied originals from the non-copied originals.

Next, explaining solenoids and the like in the drive system, there are provided a weight solenoid 71 for driving a weight 42 aiding the original supply toward the switch back side, a shutter solenoid 72 for rotating and retarding the shutter 41 in the original supply, and a reverse rotation flapper solenoid 73 for rocking a reverse rotation flapper 15 for switching between the discharge path and the both-face copy path in the switch back reverse rotation. Further, at the closed-loop side, there are provided a partition rotation solenoid 74 for driving a closed-loop weight for aiding the original supply and dividing the copied originals from the non-copied originals in the closed-loop mode, and a pressure solenoid 75, which solenoids are operated with rotation of a closed-loop weight shaft. Further, there is arranged a solenoid 76 for rotating the closed-loop path flapper 14 for switching the path regarding the platen 105 in the original manual insertion mode.

Next, sheet sensors and image reading positions in the paths will be explained. First of all, briefly explaining the switch back side, there are provided an empty sensor 30 for detecting the fact that the originals are set on the tray 2, a separation sensor 31 for detecting the fact that the original is separated from the other originals, a switch back regist sensor 32 for effecting the registration of the original and for determining the timing for eliminating the skew-feed of the original, a reverse rotation sensor 33 for detecting the fact that the original is returned from the platen in a switch back fashion, and a discharge sensor 39 for detecting the discharge of the original.

Next, explaining the closed-loop side, the empty sensor 30 is also used regarding the closed-loop side. The closed-loop side includes an original set sensor 34 for detecting whether a length of the original is half size (A4, LTR, B5) or is greater than the half size on the basis of the presence/absence of a trailing end of the original when the original is set. When the empty sensor 30 is turned ON and the original set sensor 34 is turned OFF, it is judged that the original has the half size, so that the original is supplied from the closed-loop side. Actually, in the illustrated embodiment, the detection of the empty sensor 30, detection of the original set sensor 34 and detection (not shown) of a width of the original are simultaneously effected so that the size of the original A4, LTR or B5 is determined.

Further, the original set sensor 34 detects the tip end of the original stack bundle-conveyed toward the closed-loop side by the shutter 41 (FIG. 1) after the tray 2 is lowered in the closed-loop original supply. When the tip end of the original stack reaches a position optimum to the separation of the originals (i.e. when a predetermined number of clock pulses ("clocks") are counted after the detection of the tip end), the shutter 41 is stopped. The original set sensor also acts as an original tip end detection sensor to stop the shutter. There are also provided a closed-loop separation sensor 35, a closed-loop regist sensor 36 for effecting the registration of the original and for determining the timing for eliminating the skew-feed of the original in the closed-loop mode, an image tip sensor 37 for determining the position of the original on the platen, and a manual insertion set and discharge sensor 38.

A home position of the optical system for starting the exposure in the stationary reading mode (in which the original is fixed and the optical system is shifted) is a first image tip (stationary reading image tip) G. A second image tip (flow reading image tip) H spaced apart from the position G to the right by a distance L is a scanning point in the flow reading mode (in which the optical system is fixed and the original is read while being moved).

Figure 3:
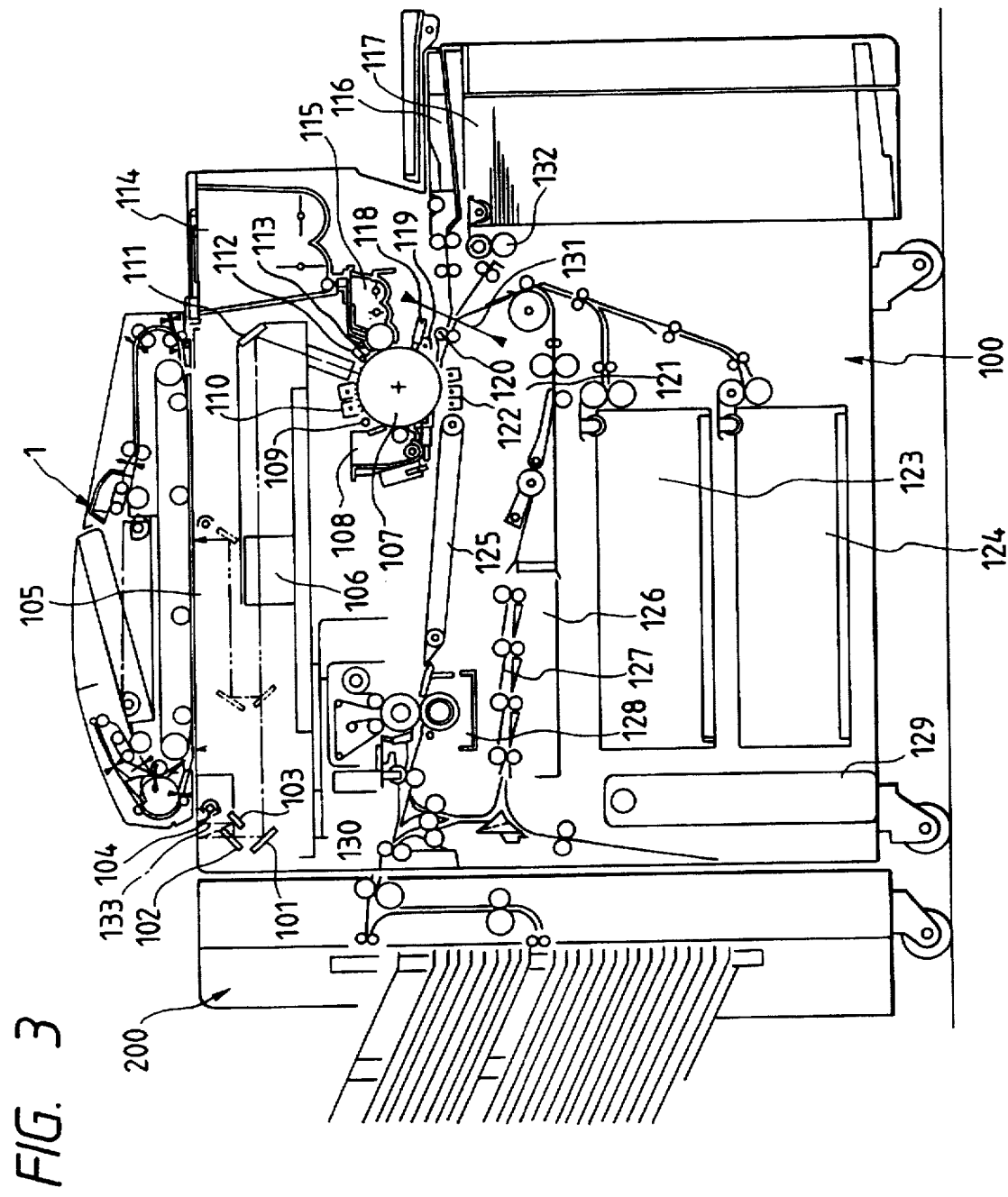
FIG. 3 is an elevational sectional view of the RDF mounted to the image forming apparatus.

Next, the image forming apparatus 100 to which the RDF is mounted will be briefly explained with reference to FIG. 3.

As is well-known, the optical system includes a third mirror 101, a second mirror 102, a first mirror 103, an original illuminating lamp 104, a zoom lens 106 and a fourth mirror 111 so that original information on the platen 105 can be transmitted to a photosensitive drum 107. The optical system is designed so that the original is fixed at a predetermined position and an image on the original can be read by reciprocally shifting an exposure portion 133 along the platen (stationary reading mode) and so that the exposure portion 133 is fixedly locked at a predetermined position by a lock means (described later) and the image on the original can be read while the original is being moved (flow reading mode).

The reference numeral 108 denotes a drum cleaner; 109 denotes a pre-exposure lamp; 110 denotes a first charger; 112 denotes a blank exposure lamp; 113 denotes a potential sensor; 114 denotes a hopper portion for toner; 115 denotes a developing device; 116 denotes a multi-feeder; 117 denotes a side tray; 118 denotes a roller electrode; 119 denotes a pre-transfer charger; 120 denotes a pair of regist rollers; 121 denotes a re-supply portion (in both-face mode); 122 denotes a transfer separation charger; 123 denotes an upper front tray; 124 denotes a lower front tray; 125 denotes a convey portion; 126 denotes an intermediate tray; 127 denotes a second convey portion; 128 denotes a fixing device; 129 denotes a waste toner collecting container; 130 denotes a discharge portion; and 200 denotes a copy sheet output device (sorter). Since the process relation of the image forming apparatus is well-known, explanation thereof will be omitted.

In order to explain a flow of the sheet in the illustrated embodiment, as an example of a sheet supply portion of the image forming apparatus, a sheet supply roller 132, a regist sensor 131 and the pair of regist rollers 120 are referred to hereinbelow.

In the illustrated embodiment, since the flow reading can be effected by the image forming apparatus, it is important to synchronize the timing of the sheet supply, registration, transfer and separation of the sheet in the image forming apparatus and the flow of the original (particularly, the conveyance of the original to the image reading position) in the original feeding apparatus with the process of the image forming apparatus. Prior to explanation of the synchronism between the image forming apparatus and the original feeding apparatus, the flow of the original inherent to the original feeding apparatus will be explained.

In the illustrated embodiment, explanation of the switch back path for supplying the original from the A side as shown in FIG. 1 will be omitted. Now, the flow of the original supplied from the B side in the mix mode (the combination of the flow reading mode and the stationary reading mode) will be explained with reference to FIG. 4A to FIG. 8R.

Figure 4A:
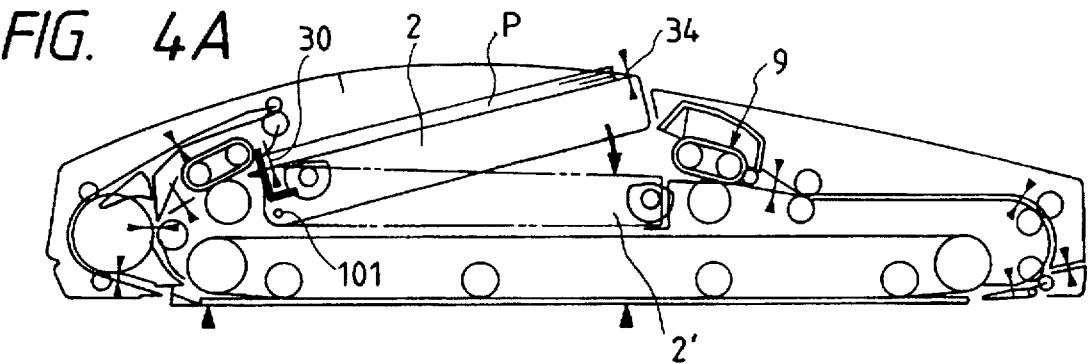
FIGS. 4A to 4D, FIGS. 5E to 5H, FIGS. 6I to 6L, FIGS. 7M to 7P and FIGS. 8Q to 8R are elevational sectional views of the RDF showing a flow of a sheet original in a mix mode.
Figure 4B:
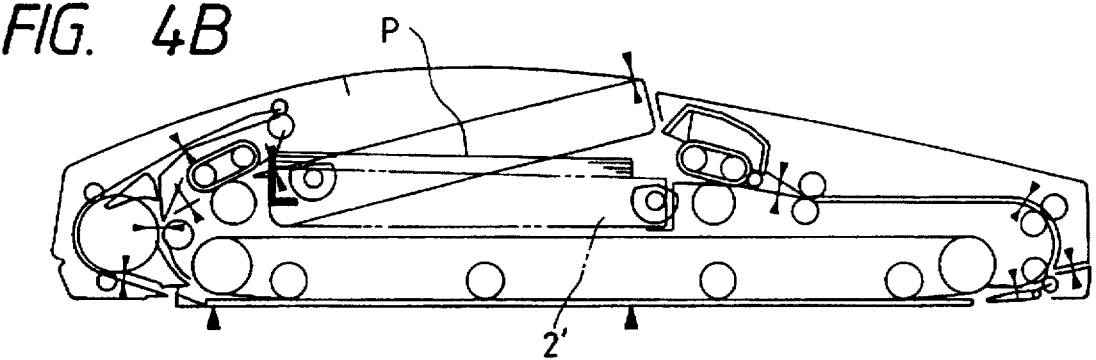
Figure 4C:
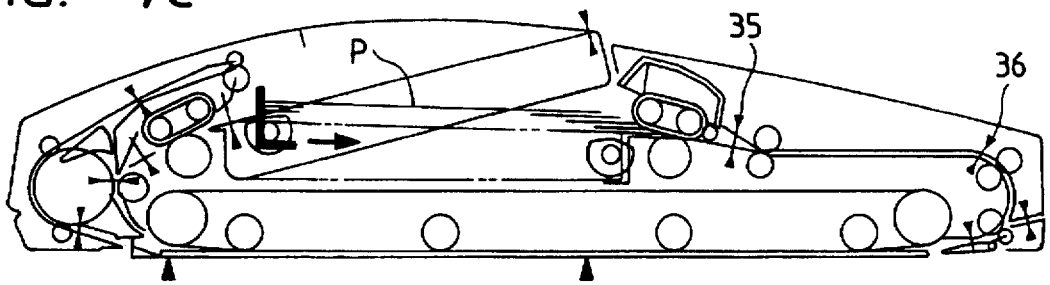

First of all, FIG. 4A shows a condition that the originals P are set on the tray. In this condition, when the empty sensor 30 detects the original and the original set sensor 34 is turned OFF (i.e. when the length of the original falls within a predetermined range), the copy start signal regarding a predetermined mode is emitted from the image forming apparatus. When the copy start signal designates the mix mode, the tray 2 is lowered to a lowered position 2' (shown by the broken line in FIG. 2) in a direction I around the fulcrum. When the lowering of the tray is finished, the sheet bundle P is bundle-fed by the original abutment shutter 41 in a direction J. An amount of the bundle-feed of the sheet bundle effected by the shutter 41 is selected so that the sheet bundle is stopped when it is advanced by a predetermined amount (optimum to be separated by the separation and supply means 9) after the tip end of the sheet bundle P passes through the original set sensor 34. Then, the lowermost original $P_n$ is fed out from the sheet bundle (FIGS. 4C and 4D).

Figure 4D:
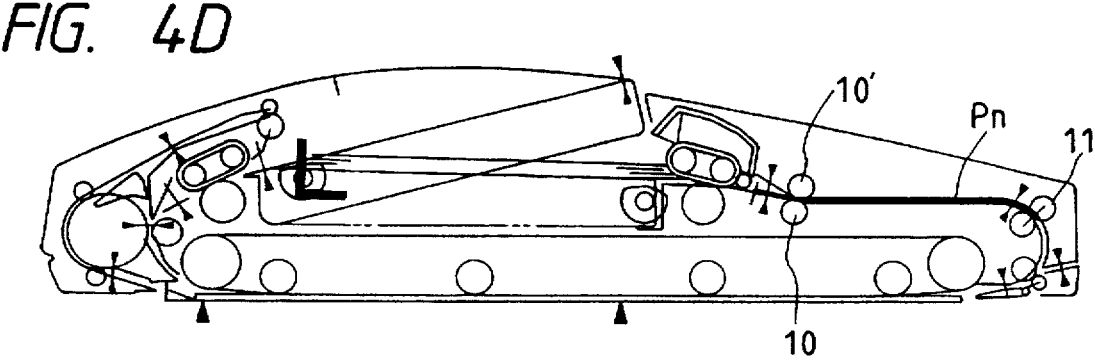

FIG. 4D shows a condition that the original $P_n$ is abutted against the regist rollers 11. A loop is formed in the original between a nip of the regist rollers 11 (now stopped) and the convey rollers 10, 10', thereby correcting the skew-feed of the original. After a predetermined time is elapsed, the regist rollers 11 are rotated to start the conveyance of the original $P_n$.

Figure 5E:
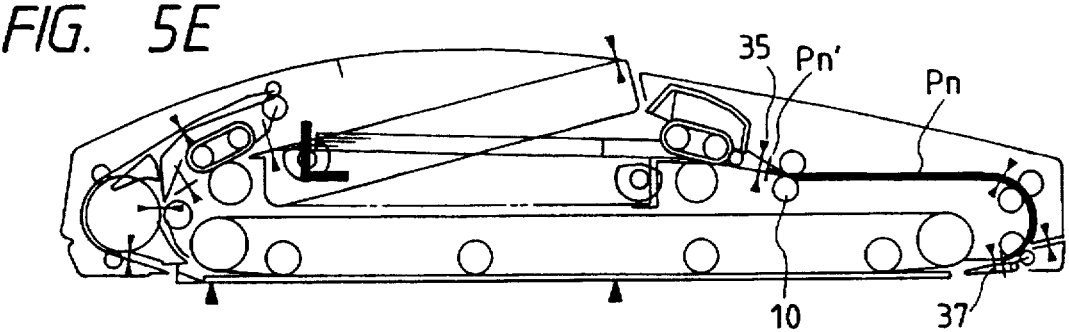

FIG. 5E shows a condition that the trailing end of the original leaves the separation sensor 35. In this condition, the separation and supply of a next original $P_{n-1}$ is started. In the condition shown in FIG. 4D, after the loop is formed in the original, since the clock disc is attached to the roller shaft of the driven roller 10' driven by the convey roller 10 as mentioned above (the drive source for the regist rollers 11 differs from the drive source for the convey roller 10) so that the convey speed of the original $P_n$ can be recognized by the clock disc and the clock counter sensor. Thus, the regist rollers 11 are rotated on the basis of an output of the clock sensor so that the peripheral rotational speed of the regist rollers becomes the same as the convey speed of the original $P_n$ (That is to say, a control circuit is designed so that it controls the rotational speed of the stepping motor 64 for driving the regist rollers to be synchronized with the convey speed of the original in response to the clock signal).

Although the details will be described later, immediately before the tip end of the original $P_n$ is nipped by the back-up roller 12 driven by the convey belt 40, the speed equalization control between the convey rollers 10, 10' and the regist rollers 11 (convey⇌registration speed equalization control) is switched to the speed equalization control between the wide belt 40, back-up roller 12 and the regist rollers 11 (belt⇌registration speed equalization control), by synchronizing the clock for driving the wide belt (i.e. stepping motor 51 for driving the wide belt 40) with the stepping motor 64 for driving the regist rollers 11 (for example, the stepping motor 64 is rotated synchronously with the stepping motor 51 by the clock associated with the motor).

Figure 5F:
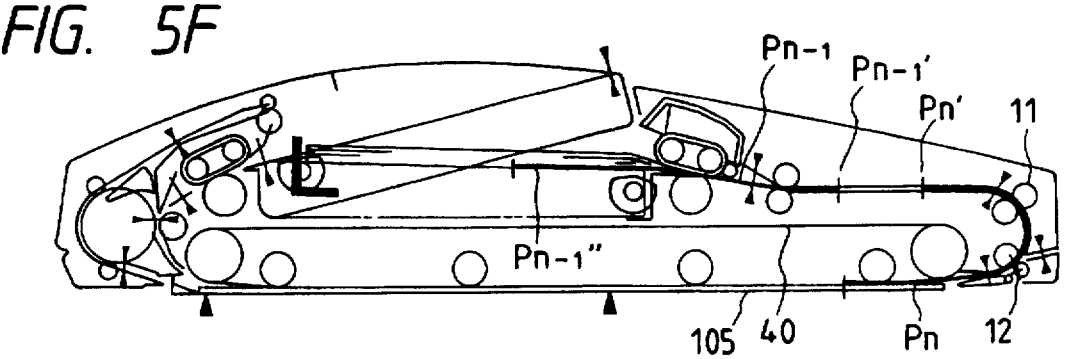
Figure 5G:
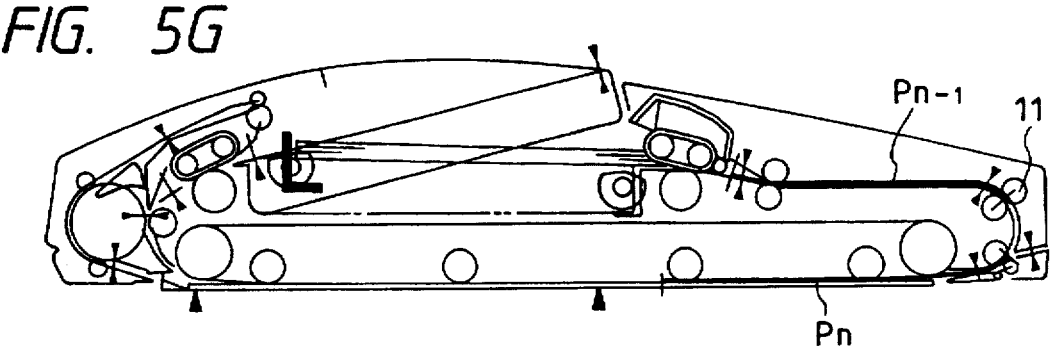
Figure 5H:
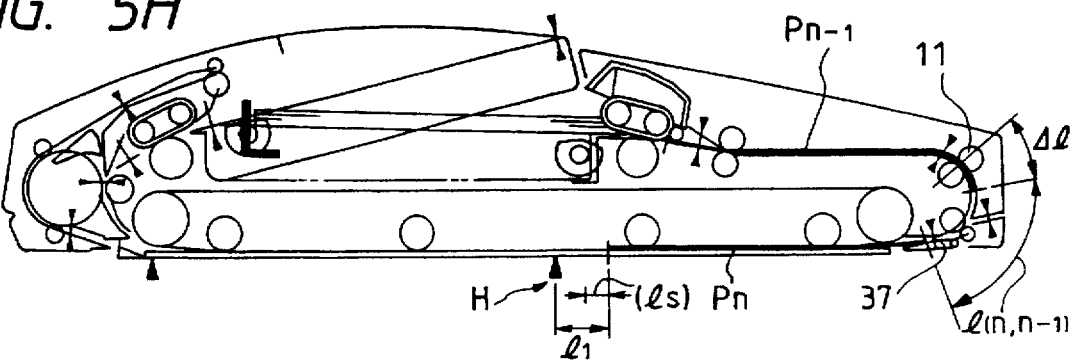

In a condition immediately after the speed equalization control is switched, as shown in FIG. 5H, although the trailing end of the original $P_n$ is being pinched between the convey rollers 10, 10', since a one-way clutch is arranged in the convey roller to permit free rotation of the convey roller in a conveying direction, even if the peripheral speed of the regist rollers is greater than that of the convey roller, the original can be drawn from the convey rollers by the peripheral speed of the regist rollers. FIG. 5E shows a condition that the trailing end $P_{n'}$ of the original leaves the nip between the convey rollers 10, 10'.

In the illustrated embodiment, as shown in FIG. 5E, a sheet path length is selected so that the trailing end $P_{n'}$ of the original $P_n$ is still pinched between the convey rollers 10, 10' when the drive system is started under the belt⇌registration speed equalization control. However, to make the apparatus compact, the sheet path length may be selected so that the trailing end $P_{n'}$ of the original $P_n$ leaves the nip between the convey rollers 10, 10' when the drive system is started under the belt⇌registration speed equalization control, thereby omitting the one-way clutch (not shown) associated with the convey rollers 10, 10' (refer to FIG. 11).

Figure 11:
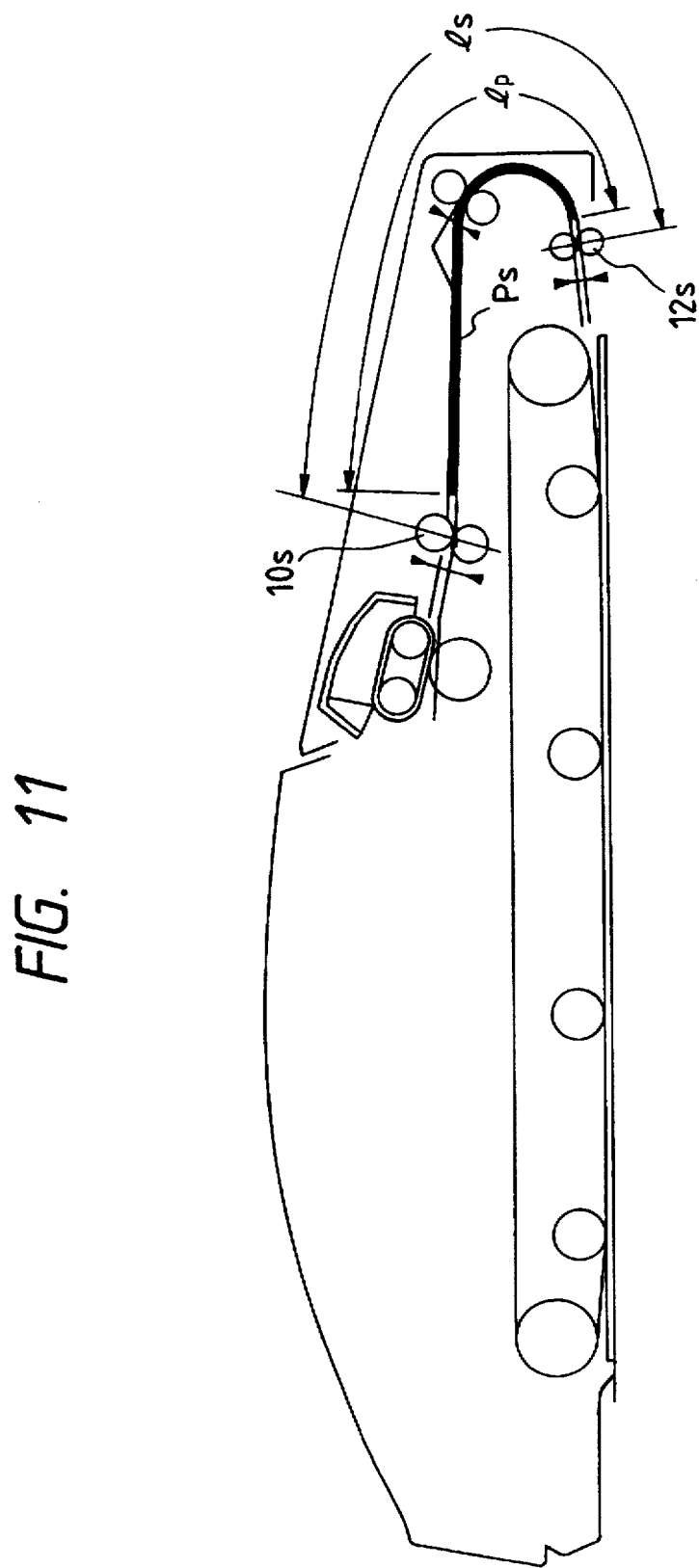
FIG. 11 is an elevational sectional view showing positional relation between the sheet original and convey rollers.

That is to say, in FIG. 11, a length $l_p$ of the maximum available original $P_s$ in a convey direction may be selected to become smaller than a distance $l_s$ between a pair of convey rollers 10S and a pair of turn rollers 12S by a predetermined amount.

In a condition shown in FIG. 5F, the speed equalization between the wide belt 40, back-up roller 12 and the regist rollers 11 is controlled under the belt⇌registration speed equalization control, and the original $P_n$ enters into the platen 105. In this case, a tip end $P_{n-1'}$ of the next original $P_{n-1}$ passes through the nip between the convey rollers 10, 10' and is continuously conveyed at a conveying speed that the tip end $P_{n-1'}$ of the next original $P_{n-1}$ does not catch the trailing end $P_{n'}$ of the first original $P_n$. Further, while the original $P_n$ is being conveyed by the convey rollers 10, 10' driven by the separation motor 52 (FIG. 2), before a trailing end $P_{n-1''}$ of the next original $P_{n-1}$ passes through the nip of the separation and supply means 9, 9', the separation clutch 70 (FIG. 2) is turned OFF, so that the separation and supply means 9, 9', 9'' is stopped (although the convey rollers 10, 10' continue to rotate). As a result, the original $P_{n-1}$ is drawn from the separation and supply means 9 by the convey rollers 10, 10'.

With this arrangement, good separating ability can be obtained. To reduce any load acting on the original when the original is drawn from the separation and supply means, one-way clutches which can be freely rotated in the conveying direction are incorporated into the feed roller 9 and the auxiliary convey roller (semi-circular roller) 9''. FIG. 5G shows a condition that the originals $P_n$, $P_{n-1}$ are further conveyed. Further, similar to the original $P_n$, a loop is formed in the original $P_{n-1}$ by the regist rollers 11, thereby correcting the skew-feed.

FIG. 5H shows a condition that the tip end of the original $P_n$ is temporarily stopped at a position spaced apart from the flow reading image tip position (second image tip position) H by a predetermined distance $l_1$. In this case, the trailing end of the original $P_n$ is not pinched by the upstream pair of convey rollers so that this original is not driven by other drive sources than the wide belt 40. Incidentally, when the original leaves the drive system, the brake and the like are released. In this case, the tip end of the original $P_{n-1}$ is protruded from the nip of the regist rollers 11 by an amount $\Delta l$ under the convey⇌registration speed equalization control. In this case, a distance between the trailing end of the original $P_n$ and the tip end of the original $P_{n-1}$ is $l_{(n, n-1)}$.

Further, tip end position of the original $P_n$ is advanced from the image tip sensor 37 by an amount corresponding to predetermined clocks, and the distance $l_1$ is always monitored by a control circuit (not shown). In the condition shown in FIG. 5H, in response to an image permit signal (stand-by signal) emitted from the copying machine, the original $P_n$ starts to be conveyed. After the original $P_n$ is conveyed by a predetermined running distance $l_s$ ($l_s < l_1$), the conveying speed of the original becomes the same as the process speed of the copying machine (1:1 magnification). In case of variable magnification copy mode, the original is conveyed with a relative flow reading speed corresponding to the magnification with respect to the process speed (difference between the conveying speed of the original and a conveying speed of a transfer sheet).

Figure 6I:
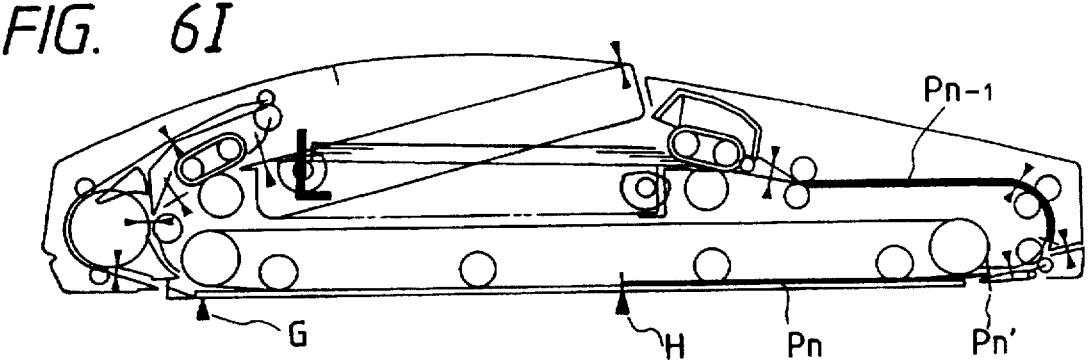

When it is judged that the tip end of the original $P_n$ coincides with the point H (second image tip position) by the control circuit (not shown) for determining the conveying amount of the tip end of the original $P_n$ (i.e. when the total clocks are counted from when the tip end of the original passes through the image tip sensor 37 to when the tip end of the original $P_n$ reaches the position H), an image tip signal is emitted from the original feeding apparatus, so that an image is formed on the photosensitive drum 107 of the copying machine (FIG. 6I). In this case, the conveying speed of the original is the same as the process speed of the copying machine, and the flow reading is effected while the original is being conveyed (the optical system is fixed).

After the original $P_n$ is read by the flow reading mode, when the trailing end $P_{n'}$ of the original $P_n$ passes through the point H (the position of the trailing end of the original is also monitored by the control circuit on the basis of the clocks regarding the convey belt), an optical system return signal is sent from the control circuit (not shown) of the original feeding apparatus to the control circuit of the copying machine, with the result that the exposure portion 133 (FIG. 3) of the optical system starts to be shifted toward the first image tip position G.

Figure 6J:
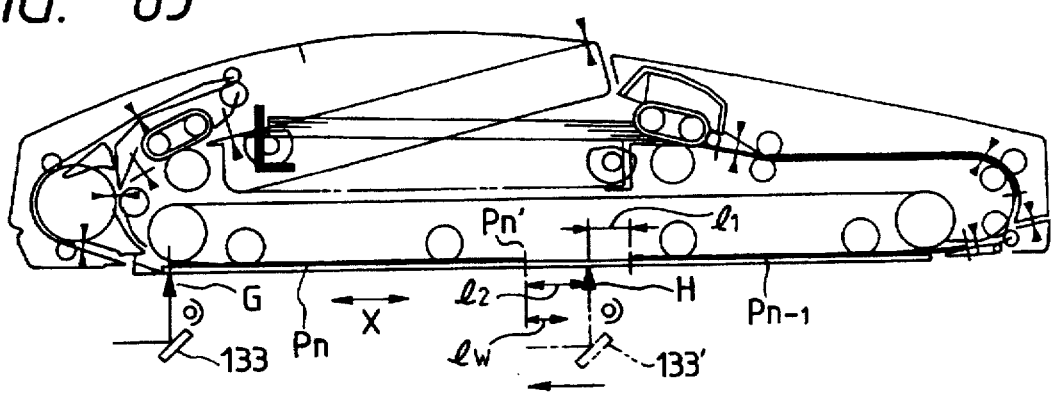
Figure 6K:
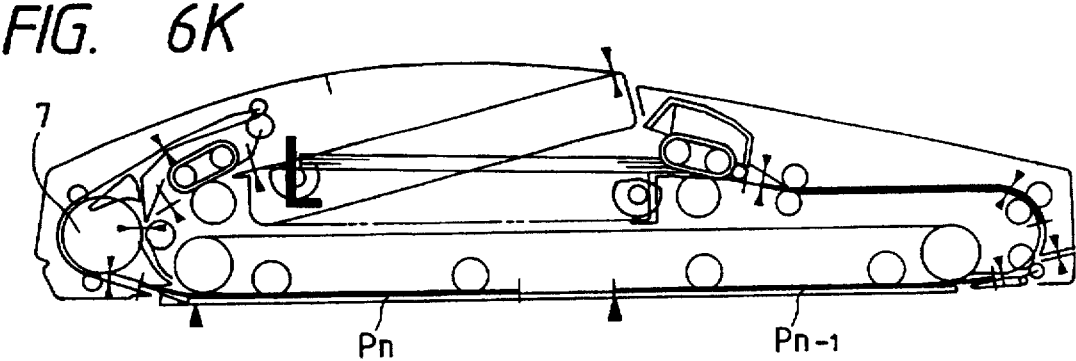

FIG. 6J shows a condition that the exposure portion 133 of the optical system has just reached the position G (from the position H). After the flow reading, when the tip end of the original $P_n$ reaches the first image tip position (stationary reading image tip position) G, the wide belt is stopped to stop the original $P_n$ (and the original $P_{n-1}$) (FIG. 6J). In this case, the positions of the originals $P_n$, $P_{n-1}$ are recognized by the control circuit (not shown) of the original feeding apparatus on the basis of the clocks regarding the convey belt.

In the condition shown in FIG. 6J, when a plurality (m) of sets of same copies are desired, the original $P_n$ is scanned by (m-1) times by reciprocally shifting the exposure portion 133 of the optical system (in directions shown by the arrow X). Of course, when only one set of copies is desired, since a single copy can be obtained by fixing the exposure portion 133 of the optical system at the position H and by flow-reading the original $P_n$ while conveying the original, the exposure portion 133 of the optical system is kept stationary, and the successive originals $P_{n-1}$, $P_{n-2}$, ..., $P_1$ are successively read by the flow reading mode.

With this arrangement, since the flow reading mode and the stationary reading mode can be continuously combined in accordance with the number of sets, for example, so long as the number of sets falls within the capacity of the sorter (i.e. the number of bins of the sorter), during one circulation of the originals, the scanning operations are repeated by times corresponding to the number of sets. That is to say, in the conventional flow reading scan, although the number of circulations of originals corresponding to the number of sets of copies were required, in the illustrated embodiment, by using the combination of the flow reading mode and the stationary reading mode for each original, during only one circulation, all scans can be completed (each scan is effected during the exchange of the original). Further, the original exchanging time may be slower than the scanning speed. Incidentally, the conventional original exchanging time is considerably faster than the scanning speed (1000 to 1300 mm/sec).

Figure 9:
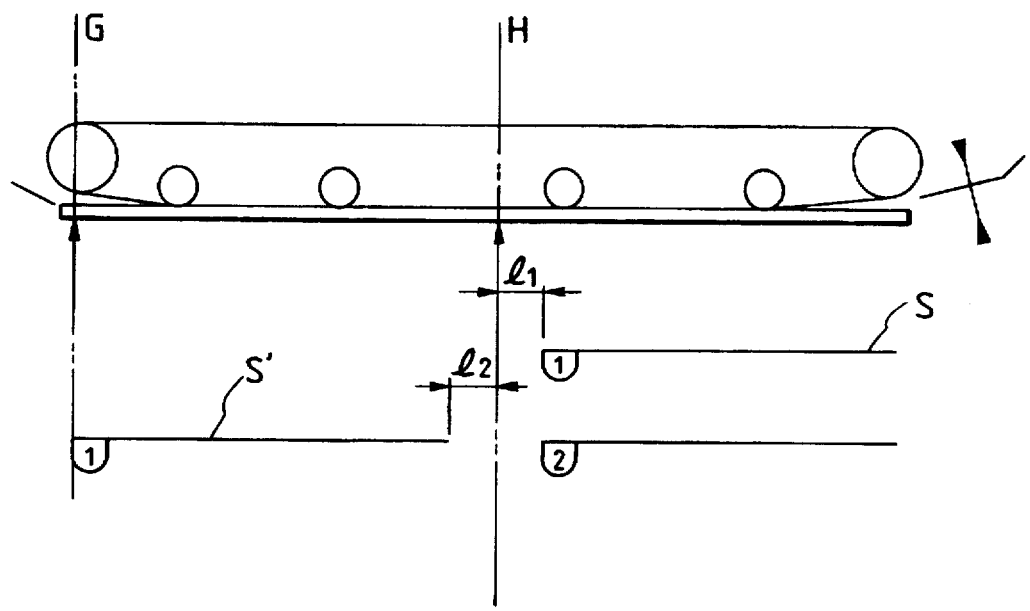
FIG. 9 is a side view showing a relation between flow reading position and a stationary reading position.

Next, the original waiting position in the flow reading mode will be further explained with reference to FIG. 9.

In the waiting position where the original is waiting at a position upstream from the flow reading image tip position H by the distance $l_1$, the belt 40 is driven by the belt drive motor 51. In this case, the rising feature (relation between speed and time) of the belt drive motor (stepping motor) 51 is shown in FIG. 10.

Figure 10:
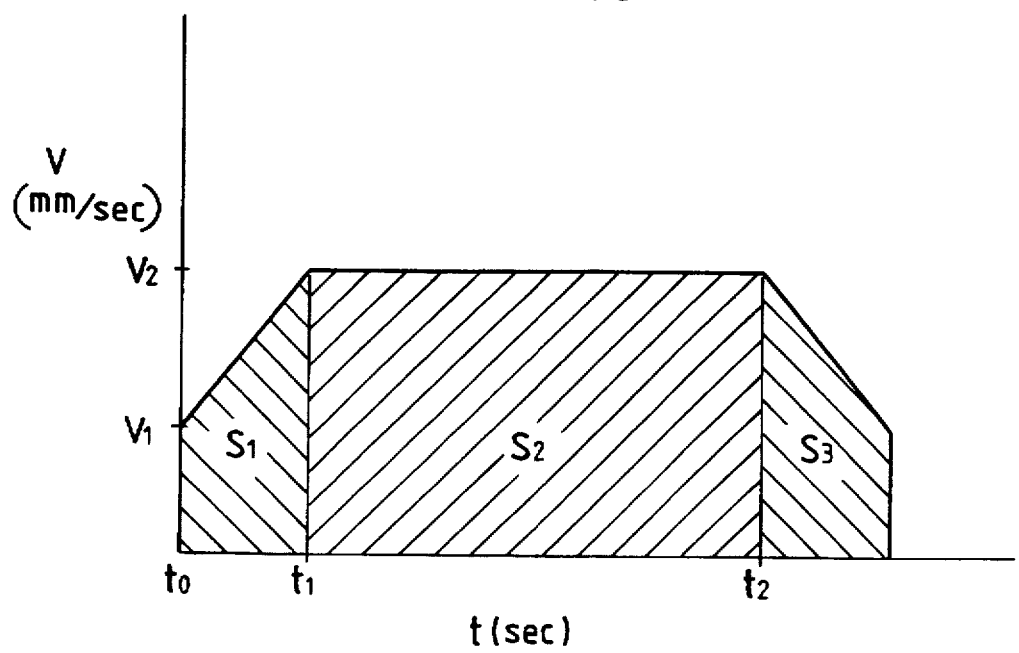
FIG. 10 is a graph showing a rising feature a drive motor.

FIG. 10 is a graph having the abscissa representative of "time" and the ordinate representative of "speed". As shown in FIG. 10, the belt drive motor is rising at a constant speed from the energization $t_0$ (speed $v_1$) to time $t_1$ (speed $v_2$). The speed $v_2$ is the conveying speed of the original in the flow reading mode. In the 1:1 magnification mode, the conveying speed is equal to the process speed of the copying machine. An area $S_1$ shown in FIG. 10 represents a moving distance corresponding to the distance $l_s$ in FIG. 5H. In the illustrated embodiment, a relation $l_1 > l_s$ is is maintained ($l_1$ is a running distance in the flow reading mode).

This relation is determined in consideration of the minimum vibration damping time in order to prevent the deterioration of the image due to the damping of the inherent vibration of the drive system for the belt 40 at its rising phase. It should be noted that the shorter the distance t, the shorter the flow reading start time, thereby improving the productivity of the apparatus. Further, after the flow reading scan, the original is shifted from a position S to a position S' and stopped there. In this case, since the original is conveyed at the constant speed when it passes through the flow reading image tip position H, the distance required for stopping the original becomes $l_2$ (FIG. 6J). A distance $l_w$ shown in FIG. 6J represents a distance through which the original is decelerated and stopped and corresponds to an area $S_3$ in FIG. 10. The reason for selecting $l_2 > l_w$ is that the bad influence upon the image is prevented due to the dispersion in the regist rollers and the like by setting a constant speed zone ($l_2 - l_w$) after the image was read and that the time required to stop the original is shortened.

After the original is stopped at the position S' (FIG. 9), when the inherent vibration of the belt drive system is stabilized, the original is scanned by shifting the optical system.

Further, in FIG. 5H, after the original $P_{n-1}$ is advanced under the convey⇌registration speed equalization control so that the tip end of the original is protruded from the nip of the regist rollers 11 by the amount $\Delta l$, the convey⇌registration speed equalization control is switched to the belt⇌registration speed equalization control. As a result, the original $P_{n-1}$ starts to be conveyed, and after the tip end of the original passes through the image tip sensor 37 the convey clocks for the original $P_{n-1}$ is counted.

When the original Pn−1 is stopped at the position shown in FIG. 6J, the stopped position is determined by the first original Pn. In this case, however, the convey clocks until the next original Pn−1 reaches the position H are counted after the tip end of the original Pn−1 passes through the image tip sensor 37. In this case, since the distance between the position H and the image tip sensor 37 is constant or fixed, when the original Pn−1 is shifted from the position shown in FIG. 6J until the tip end of this original reaches the position H (FIG. 6K), the image tip signal is emitted from the control circuit of the original feeding apparatus to initiate the flow reading mode, thereby ensuring the registration accuracy of the original.

Regarding the other originals 2n−2, . . . , $P_1$, the flow reading and the registration are effected in the similar manner. Incidentally, although the distance $l_1$ (to the position H) regarding the original Pn and the distance $l_1$ (to the position H) regarding the original Pn−1 are slightly changed due to the dispersion in the amount $\Delta l$ produced from the nip of the regist rollers, as mentioned above, since the position to which the tip end of each original is conveyed is determined by the number of clocks from the image tip sensor 37, the fluctuation of the reading start position H in the flow reading mode and the original tip end stop position G in the stationary reading mode can be minimized, thereby providing the stable registration accuracy both in the flow reading mode and the stationary reading mode.

In FIG. 5H, when the stationary reading scans (effected by fixing the original and by shifting the optical system) are completed by times corresponding to the number (m−1) obtained by subtracting one (1) from the desired number (m) of sets, the original Pn is shifted toward the reverse rotation roller 7 to be discharged. The reverse rotation roller 7 is driven by the reverse rotation motor 55 under the PLL control so that the peripheral speed of the reverse rotation-roller becomes the same as the peripheral speed of the wide belt 40. Accordingly, even when the original is conveyed by both the wide belt and the reverse rotation roller, the looseness or tension in the original can be minimized.

Figure 6L:
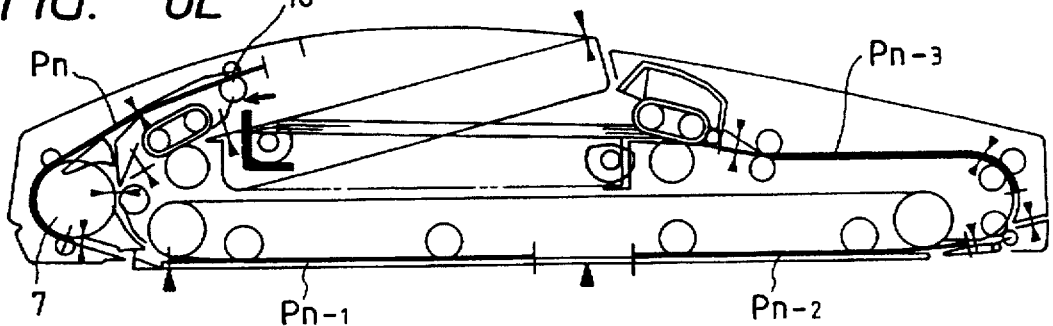
Figure 7M:
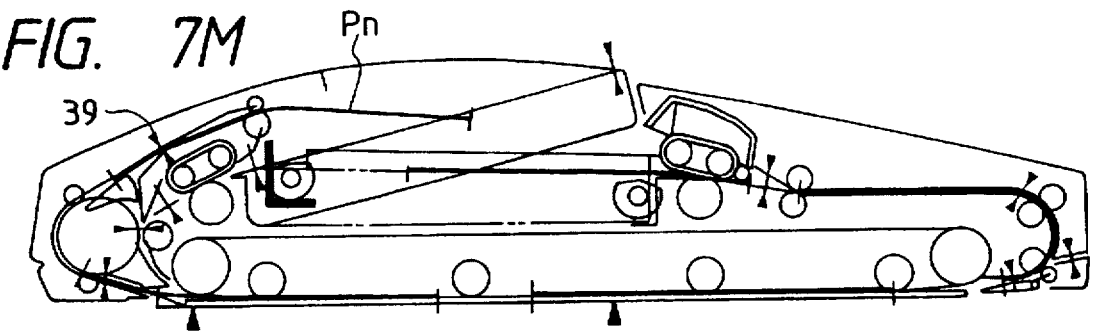

Then, as shown in FIG. 6L, the tip end of the original Pn is pinched between the pair of discharge rollers 16. The discharge rollers 16 are rotated at a speed faster than the peripheral speeds of the wide belt and the reverse rotation roller. When the original is conveyed by both the discharge rollers 16 and the reverse rotation roller 7, the conveyance of the original is governed by the reverse rotation roller 7 having the greater conveying force. However, after the trailing end of the original leaves the reverse rotation roller, the original is conveyed by the inherent peripheral speed of the discharge rollers which provides the optimum stacking ability for the discharged original (FIG. 7M).

More particularly, when the original Pn leaves the nip of the reverse rotation roller 7, since the original is conveyed at the faster speed, the distance between the original Pn and the succeeding original Pn−1 is temporarily increased. However, when the trailing end of the original Pn passes through the discharge sensor 39, the conveying speed of the original Pn is decreased to the speed providing the good stacking ability (in the illustrated embodiment, line speed of 200 to 400 mm/sec.).

Figure 7N:
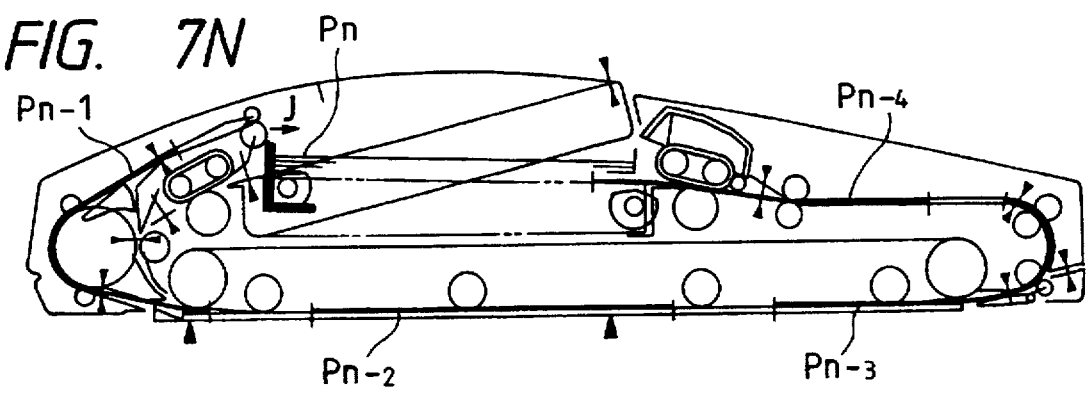
Figure 7O:
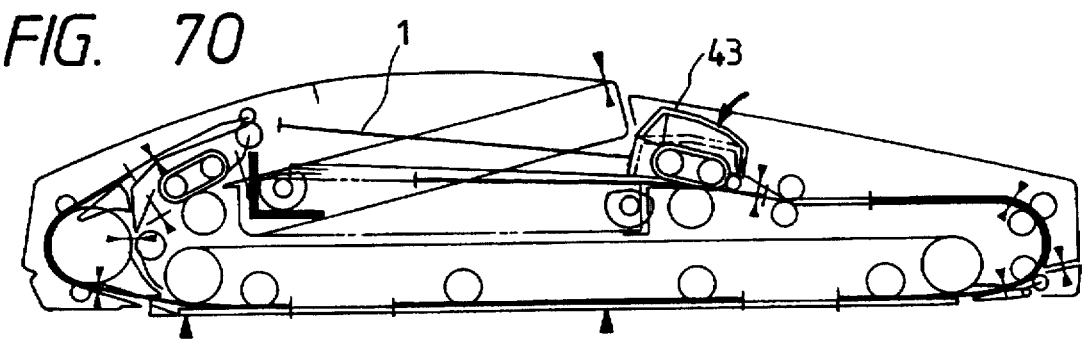

In FIG. 7N, the discharged original Pn is rested on the original bundle which is not yet treated. In this condition, after the predetermined timing, the shutter 41 is driven by the shutter drive stepping motor 60, thereby jogging the discharged original Pn in the direction J to align it with the original bundle (FIG. 7N).

Then, the above-mentioned original handling processes are repeated. For example, after a last original $P_1$ among the set of originals is circulated by designated times (within the limit permitted by the capacity of the sorter) and is discharged, the partition member 43 is lowered on the original bundle P (as shown by the two-dot and chain line in FIG. 7O) before the first original Pn in the next circulation is discharged. The partition member 43 is driven by the solenoid 74 (FIG. 2). That is to say, when the solenoid is turned ON, the partition member 43 is rested on the original bundle P by its own weight, thereby preventing the originals discharged in the next circulation from shifting toward the separation and supply means 9, 9'. In this case, an urging force of the partition member acting on the original bundle is so small that it does not aid the supply of the lowermost original by means of the auxiliary convey roller 9".

The solenoid 75 is operated when it is desired that the partition member positively urges the original bundle P (to aid the original supply). That is to say, if the separation of the original is not detected by the sensor 35 within a time period t determined in the original supply sequence, the solenoid 75 is operated so that the original bundle is urged by the partition member by a predetermined load W, thereby applying the positive force between the auxiliary convey roller 9" and the lowermost original now being separated.

In this way, the urging force can be applied to the original bundle in two stages by using two solenoids 74, 75 (detailed explanation of a mechanism for applying the urging force will be omitted).

Figure 7P:
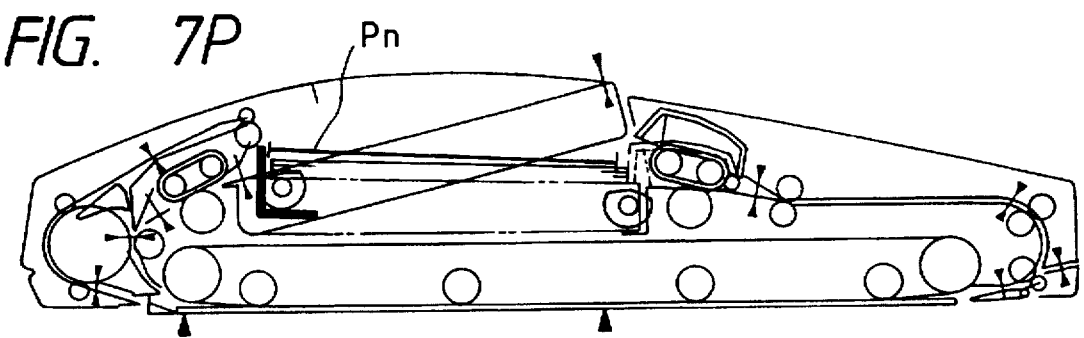
Figure 8Q:
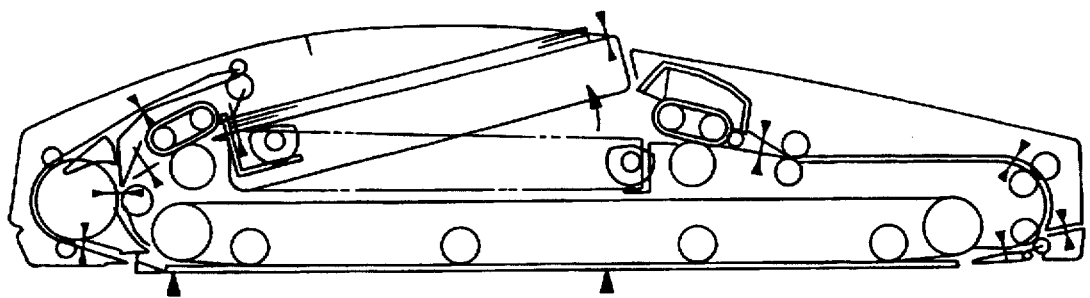

FIG. 7P shows a condition that the last original in the last circulation $P_1$ is discharged. After the last original $P_1$ is discharged, the tray 2 is lifted to the initial condition again (FIG. 8Q).

Figure 8R:
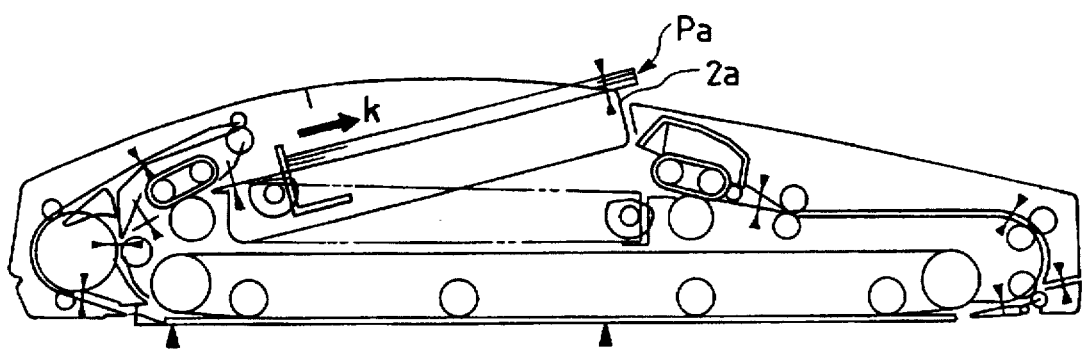

Then, the original bundle P is shifted by the shutter 41 in a direction shown by the arrow k until the tip end Pa of the original bundle is protruded slightly from a tip end 2a of the tray 2, thereby facilitating the removal of the original bundle P (FIG. 8R).

Figure 22:
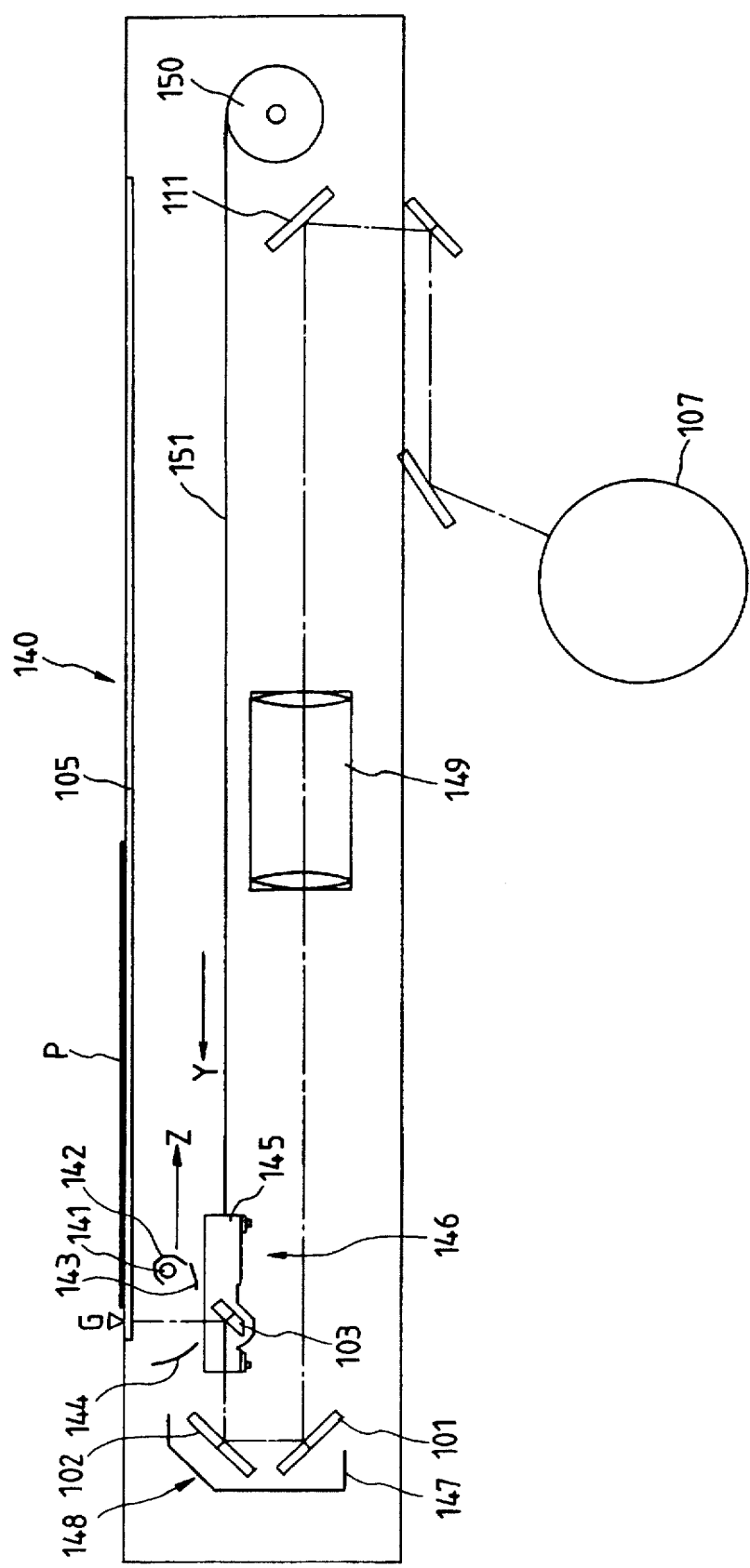
FIG. 22 is a schematic elevational sectional view of the optical system when the sheet original is in a first image tip position (stationary reading position)

Next, an operation of the optical system will be explained. In FIG. 22, an optical device 140 having a light path including reflection mirrors serves to transmit the image of the original positioned on the platen glass 105 to the photosensitive drum through a first mirror support 146 comprising a first mirror 103, a halogen lamp 141, a first reflection hood 142, a second reflection hood 143, a third reflection hood 144 and a first mirror support member 145, a second mirror support 148 comprising a second mirror 102, a third mirror 101 and a second mirror support member 147, a zoom lens 149, and a fourth mirror 111. A drive pulley 150 is reversely rotated by a drive motor (not shown) so that a wire wound around the drive pulley 150 shifts the first and second mirror supports 146, 148 at a predetermined speed along and below the platen glass 105.

In the stationary reading mode, the first mirror support 146 scans the original positioned at and fixed to the platen glass 105 from the first image tip position G in a direction shown by the arrow Z at a constant speed, thereby exposing the original P. When the exposure of the original P is completed, the first mirror support 146 is returned to the first image tip position G in a direction shown by the arrow Y. When a plurality of copies or a plurality sets of copies are required, the first mirror support is shifted in the direction Z again to start the next scan. In the case of the flow reading mode or the mix mode, in addition to the above-mentioned stationary reading operation, it is necessary to stop the first mirror support 146 at the second image tip position H.

Figure 23:
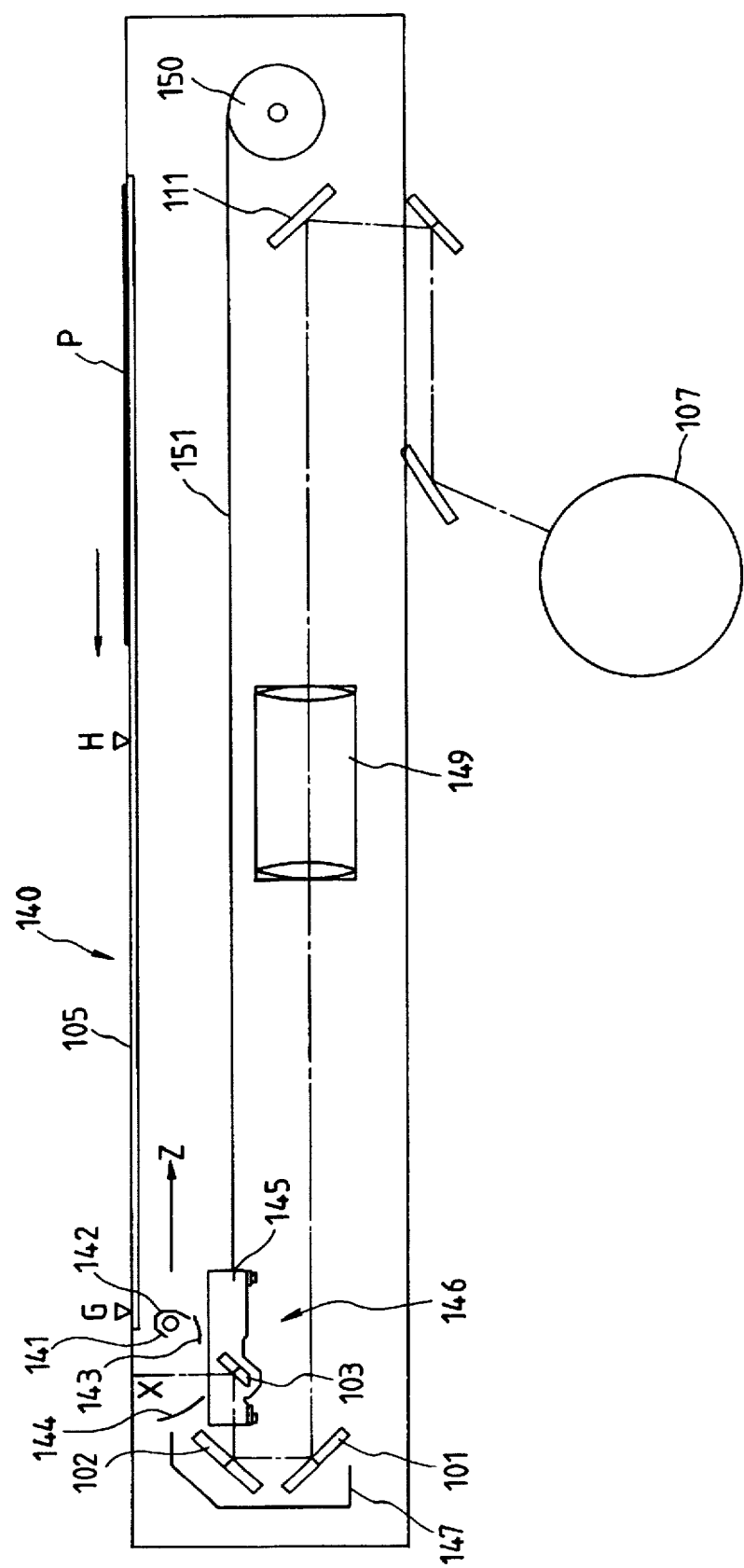
FIG. 23 is a schematic elevational sectional view of the optical system in a home position.
Figure 24:
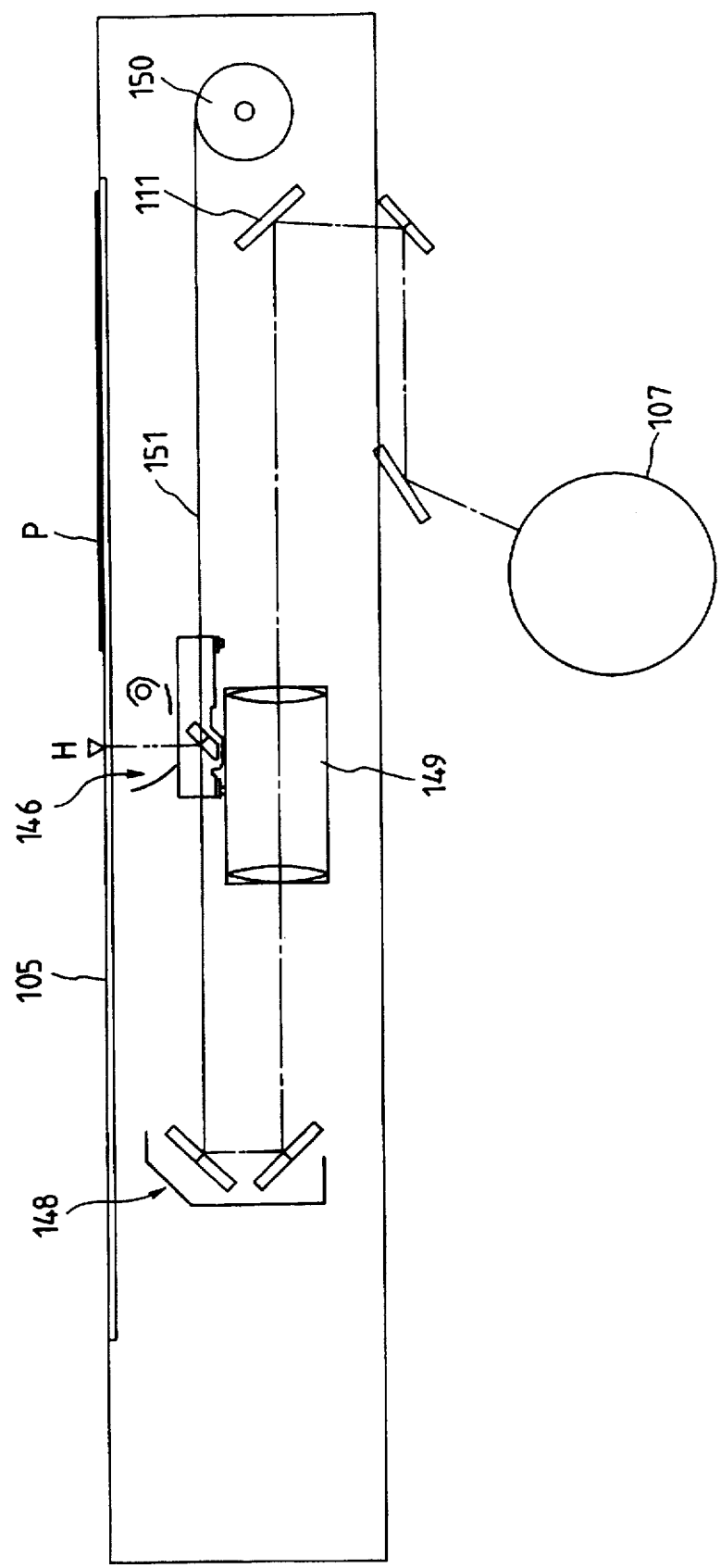
FIG. 24 is a schematic elevational sectional view of the optical system when the sheet original is in a second image tip position (flow reading position)

As shown in FIG. 23, the first mirror support 146 is normally positioned at a home position of the mirror system (exposure position thereof is aligned with the position X), and, when the command for the flow reading mode or the mix mode is emitted, the first mirror support 146 is shifted in the direction Z along and below the platen glass 105 with or without scanning the original and is stopped at the second image tip position H. Thereafter, the original p is shifted on the platen glass 105 to the second image tip position H at a constant speed by means of the RDF 1 (not shown in FIG. 23) and is stopped there. Then, the original is exposed. In the flow reading mode, as mentioned above, in response to the signal emitted from the RDF 1 at the registration timing, the regist rollers of the copying machine are rotated to effect the registration of the transfer sheet. In this case, it is necessary to correctly stop the first mirror support 146 at the second image tip position H (FIG. 24).

Figure 25:
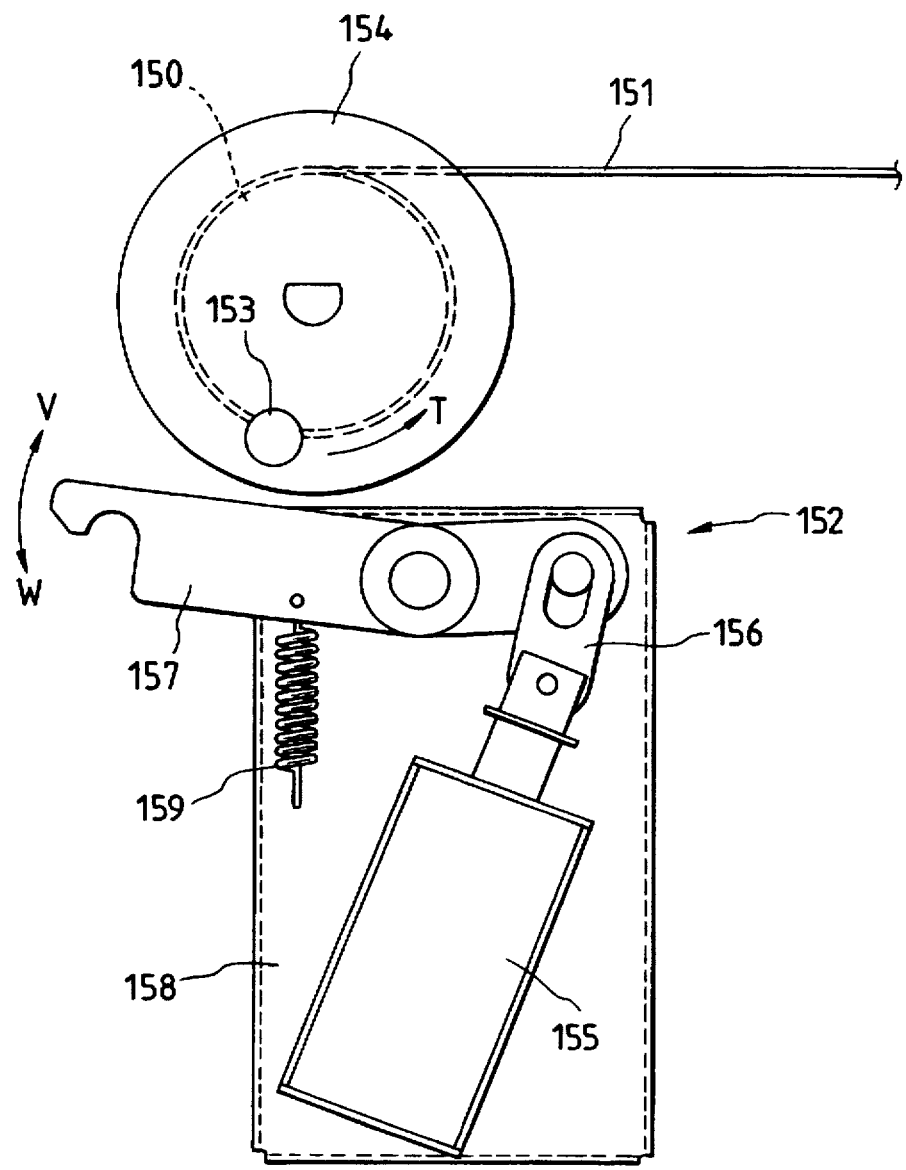
FIG. 25 is a side view of an optical system drive pulley and an optical system rocking mechanism.

To achieve this, in the present invention, as shown in FIG. 25, there is provided a mechanical lock mechanism 152 for positioning the first and second mirror supports 146, 148. A rotatable disc 154 having an engagement pin 153 is attached to a central shaft of the drive pulley 150 for shifting the first and second mirror supports 146, 148. Below the rotatable disc 154, a rock arm 157 is mounted on a support 158, which rock arm can be rocked in directions W, V through a solenoid 155 and a connection arm 156. Normally, the rock arm 157 is positioned at a retard position shown in FIG. 25 by a tension spring 159 in a solenoid OFF condition.

Figure 26:
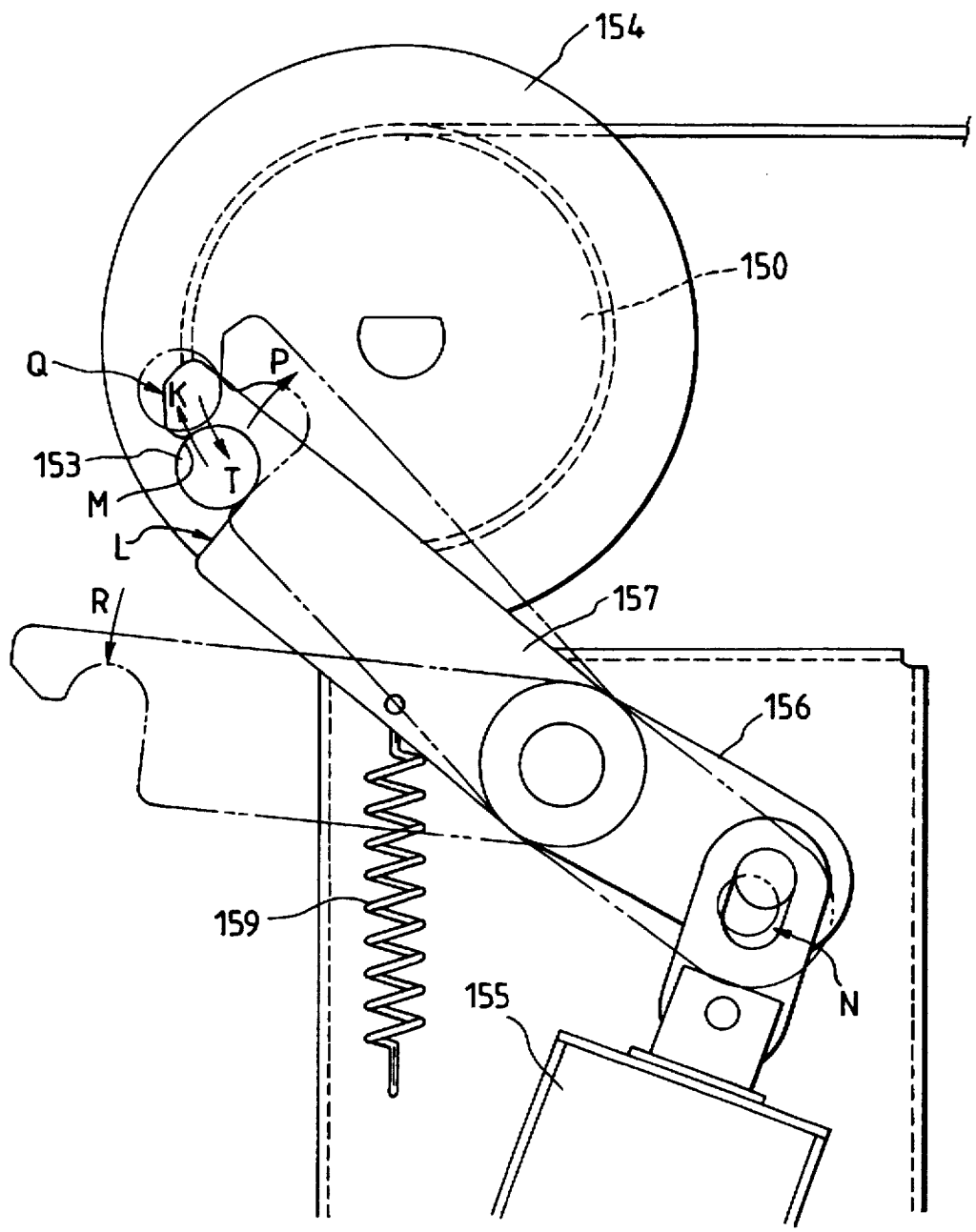
FIG. 26 is a view showing a movement of a pin lever when the optical system is rocked.

In the flow reading mode, the drive pulley 150 is rotated in a direction shown by the arrow T to direct the first mirror support 146 to the second image tip position H. In order to correctly stop the first mirror support at the second image tip position H, as shown in FIG. 26, the solenoid 155 is displaced toward the direction V to rock the rock arm 157 via the connection arm 156 to a position shown by the solid line (operation position). When the rotatable disc 154 attached to the shaft of the drive pulley 150 is rotated, the engagement pin 153 is advanced toward the rock arm 157 positioned at the operating position from the direction T. As a result, the engagement pin 153 is urged against a chamfered surface Q of the rock arm 157, thereby pushing the rock arm upwardly in a direction shown by the arrow P.

A connection portion N between the connection arm 156 and the rock arm 157 includes an elongated slot and a pin received in the slot so that the rock arm 157 can be shifted from the operating position toward the direction P. After the pin 153 pushes the rock arm 157 upwardly in the direction P, it continues to be rotated in the direction T until it is abutted against a wall M of the rock arm 157.

On the other hand, the rock arm 157 is returned to the operating position shown by the solid line under the action of the tension spring 159 to engage by the pin 153, thereby stopping the drive pulley 150. As a result, the first mirror support 146 is stopped at the predetermined position. Further, in consideration of shock due to the engagement between the engagement pin 153 and the rock arm 157, the pin 153 is controlled so that it is well decelerated before the engagement.

When the first mirror support 146 is returned from the second image tip position H to the first image tip position G to effect the flow reading, as shown in FIG. 26, the engagement pin 153 is rotated in a direction shown by the arrow K while urging an inner chamfered portion M of the rock arm 157 upwardly. Thereafter, when the engagement pin 153 is completely disengaged from the rock arm 157, the solenoid 155 has already been turned OFF, and, thus, the rock arm 157 is returned to the retard position under the action of the tension spring 159.

Next, movements of the original, optical system and original feeding apparatus will be briefly described.

Figure 12A:
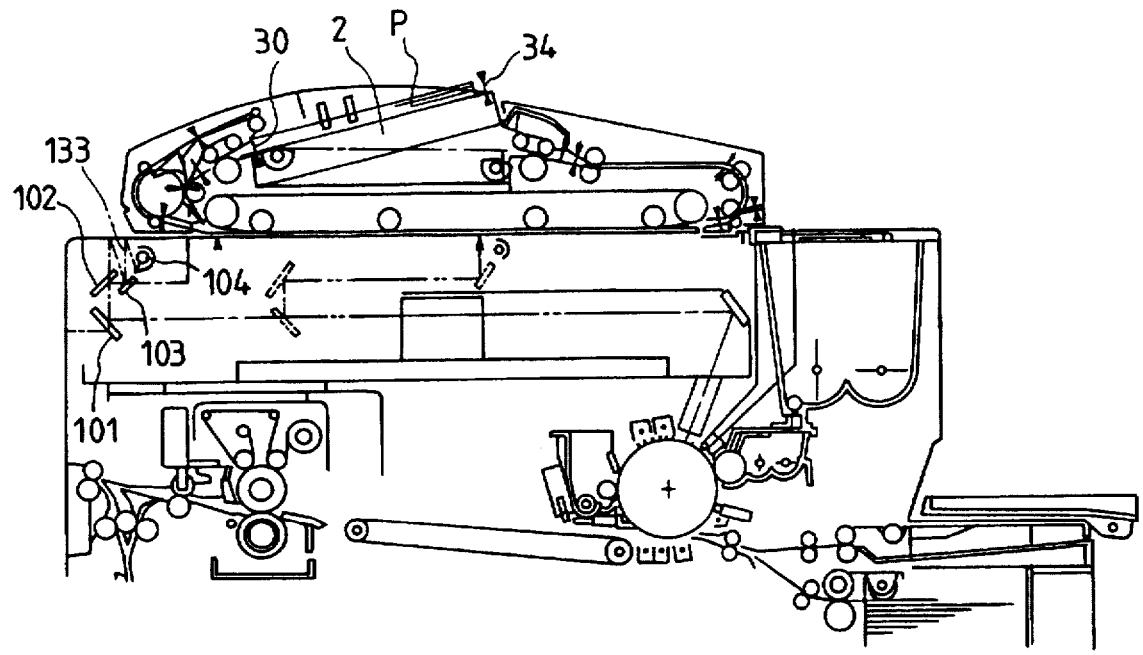
FIGS. 12A and 12B, FIGS. 13C and 13D, FIGS. 14E and 14F, FIGS. 15G and 16H, FIGS. 16I and 16J and FIGS. 17K and 17L are schematic views showing an operational relation between the sheet original, an optical system and a copy sheet in the mix mode.
Figure 12B:
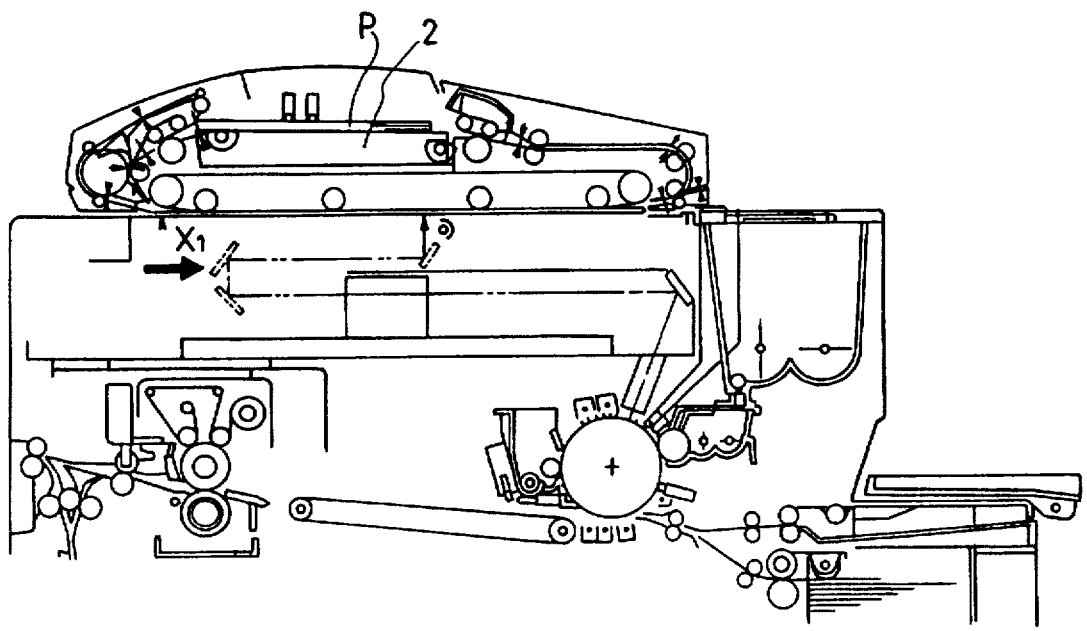
Figure 13C:
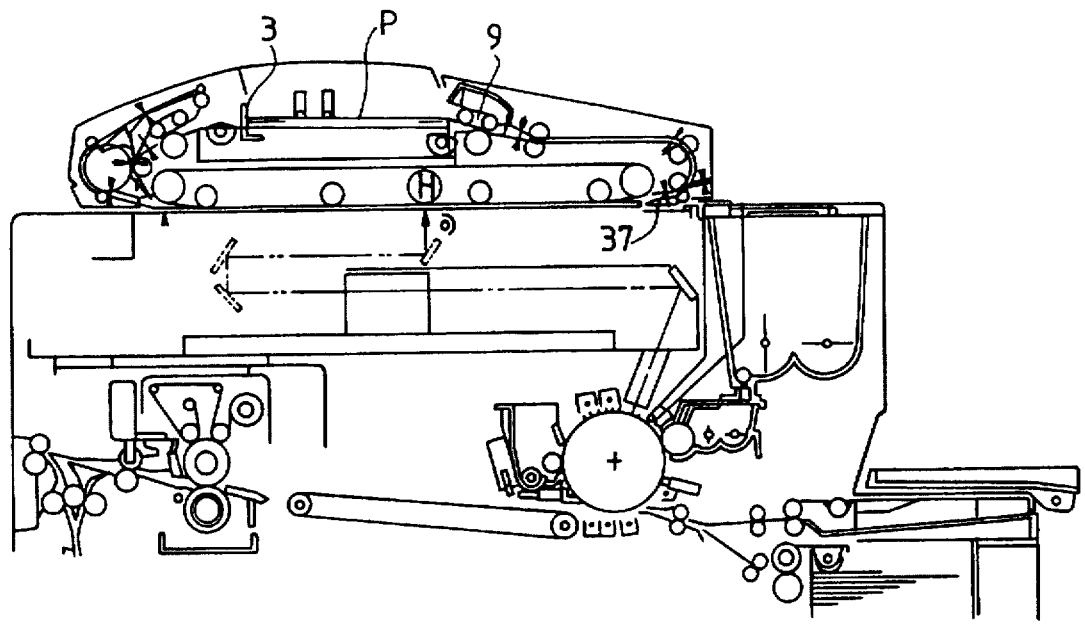

FIG. 12A shows a condition that the sheet originals P are stacked on the tray 2. When the copy start button is turned ON, the empty sensor 30 is turned ON, the original size sensor 34 is turned OFF and the flow reading mode is selected on the basis of information regarding the width of the original (obtained from a width detection means arranged inside of the regulating plate 4 of FIG. 1), the tray 2 is rotated in a counterclockwise direction around its left end (FIG. 12B). Then, the original bundle is conveyed by a rear end bundle pushing member toward the right separation and supply means 9 (FIG. 13C).

When the flow reading mode is selected, the optical system 101, 102, 103, 104, 133 starts to be shifted in a direction shown by the arrow $X_1$ (FIG. 12B) until the exposure portion 133 reaches the flow reading image tip position H (FIG. 13C) and is stopped there.

Figure 13D:
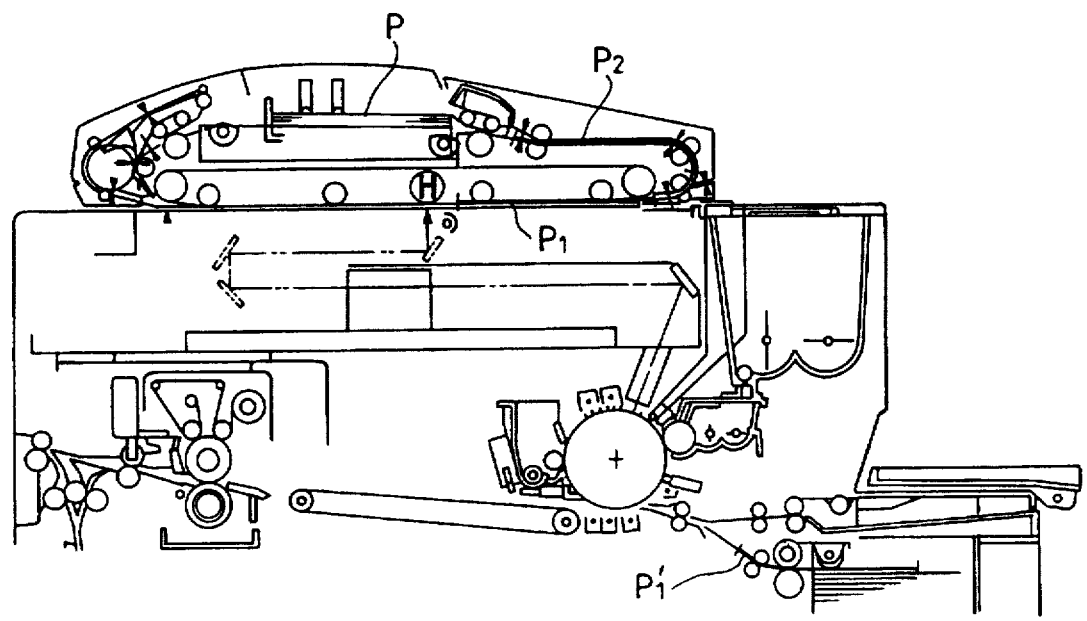
Figure 14E:
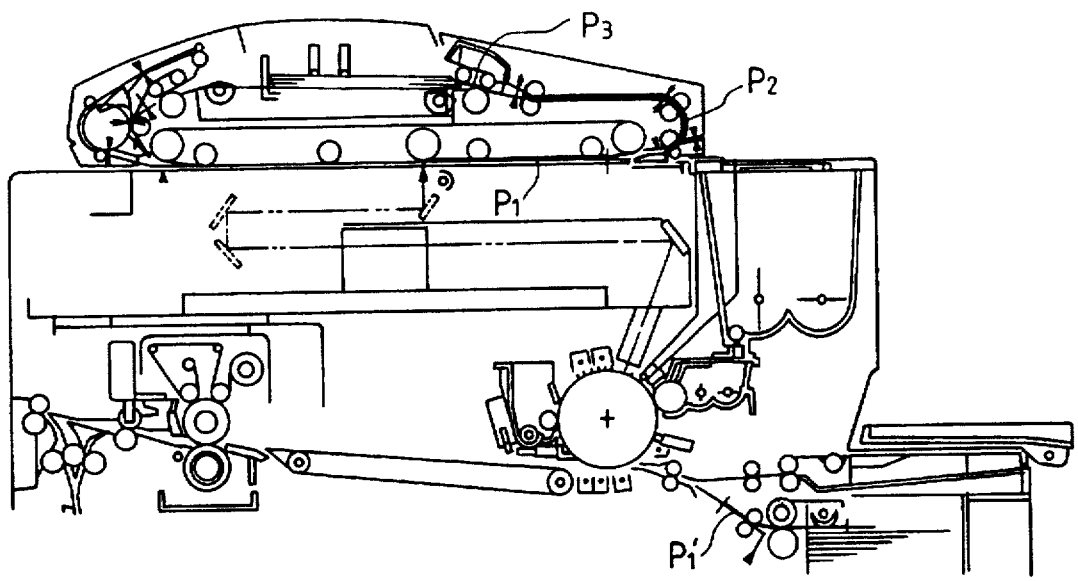

Further, when the lowermost original $P_1$ reaches a position (flow reading waiting position) as shown in FIG. 13D, the transfer sheet $P_1$, starts to be supplied. The fact that the original $P_1$ has reached the position of FIG. 13D is recognized by the RDF 1 by counting the number of clocks after the original passes through the image tip sensor 37, as mentioned above. At this point, a waiting position reach signal is sent to the copying machine. When the copying machine receives such a signal, a CPU of the copying machine emits an exposure start permit signal to the RDF. As a result, the original $P_1$ is started by the RDF. When the tip end of the original reaches the flow reading image tip position H, the image tip signal is sent from the RDF to the copying machine, with the result that the image forming exposure is started (FIG. 14E).

The timing when the original has reached the image tip position is also recognized by counting the number of clocks after the tip end of the original passes through the image tip sensor 37.

Figure 14F:
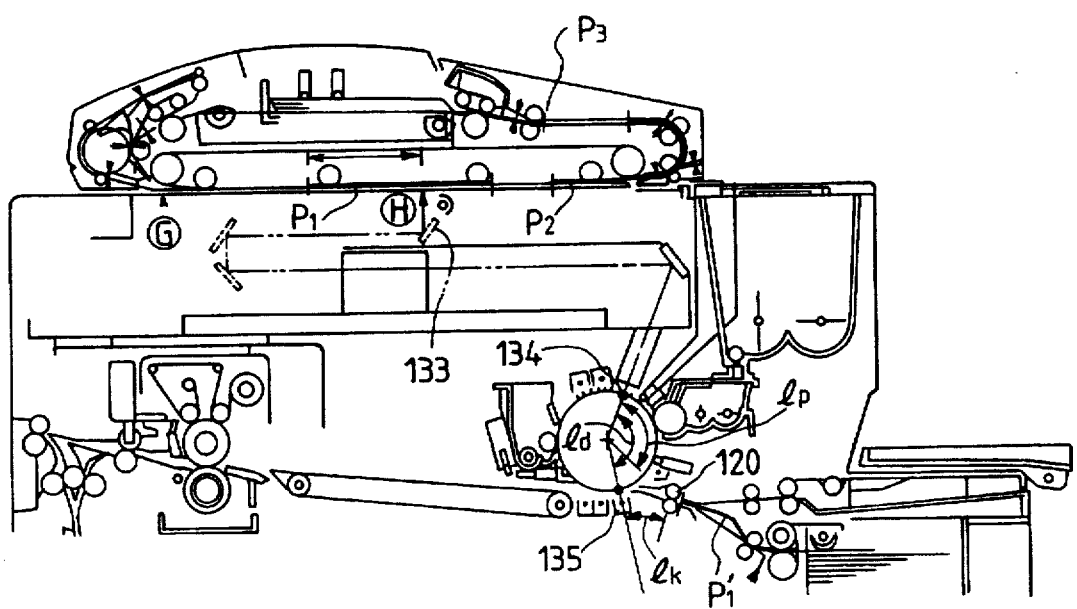
Figure 15G:
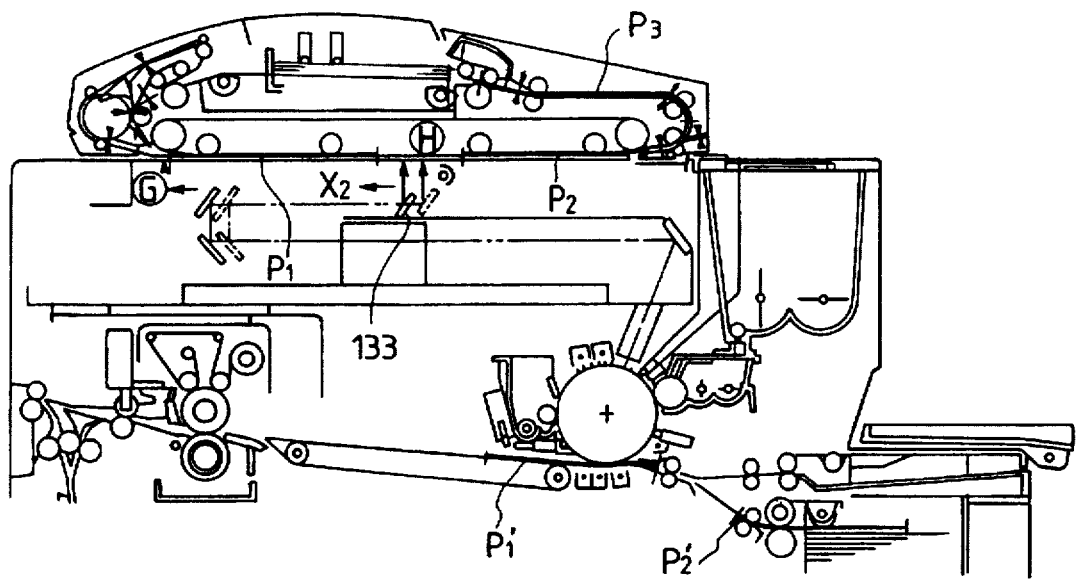

FIG. 14F shows a condition that the original $P_1$ is being read by the flow reading mode. In this case, the regist rollers 120 are activated at the timing which satisfies a relation ld−lp≃lk (where, ld is a distance between an exposure position 134 and a transfer position 135, lk is a distance between the regist rollers 120 and the transfer position, and lp is an exposure distance), so that the tip end of the original is aligned with the tip end of the transfer sheet (FIG. 14F). When the trailing end of the original $P_1$ leaves the exposure position, in response to a back signal from the RDF, the optical system is returned to the first image tip position toward a direction shown by the arrow $X_2$ (FIG. 15G).

A distance between the preceding original and the succeeding original is smaller than a distance between the adjacent transfer sheets.

Figure 16H:
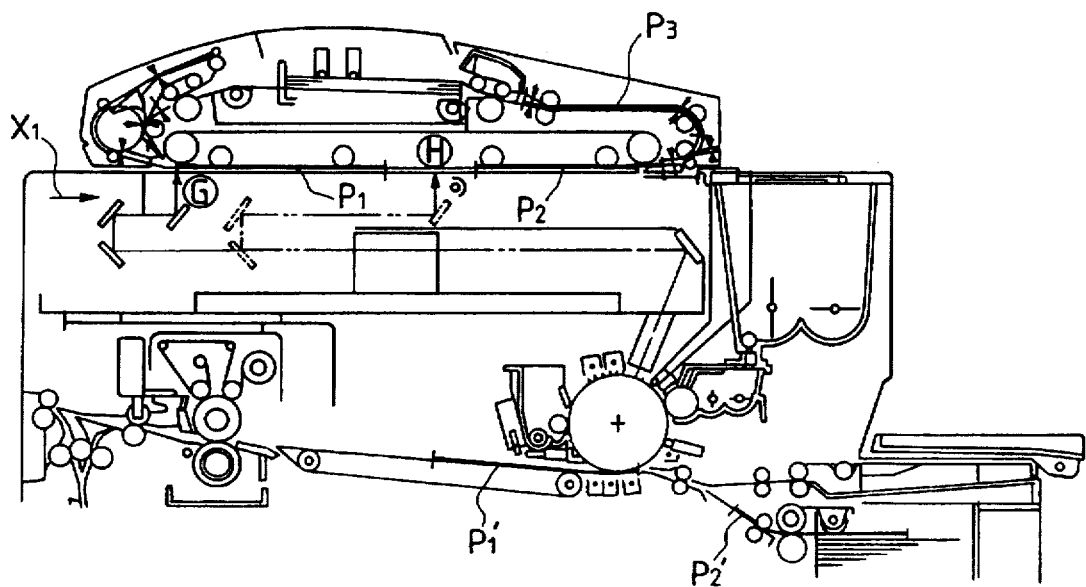
Figure 16I:
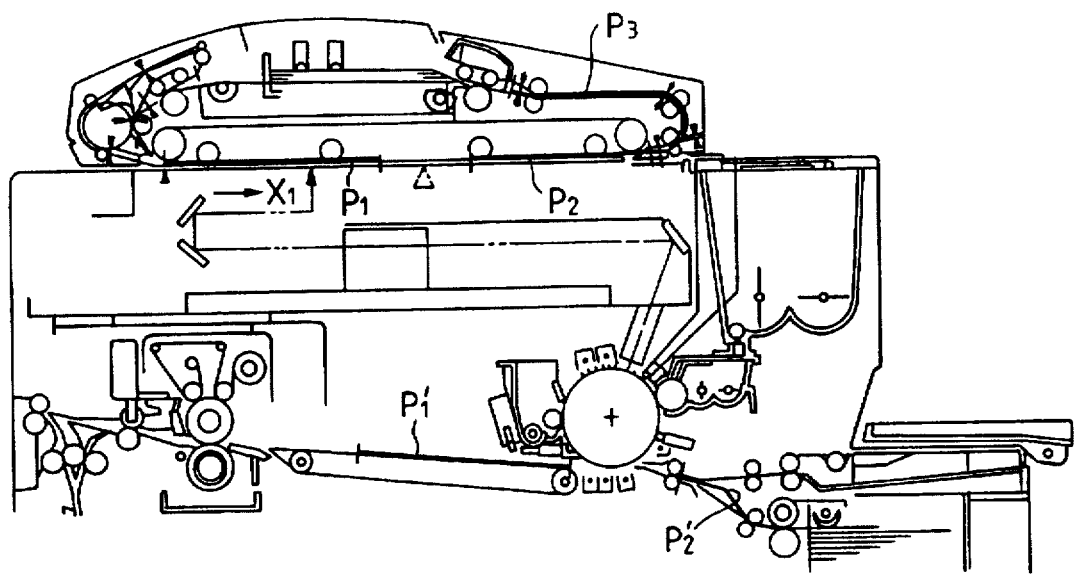
Figure 16J:
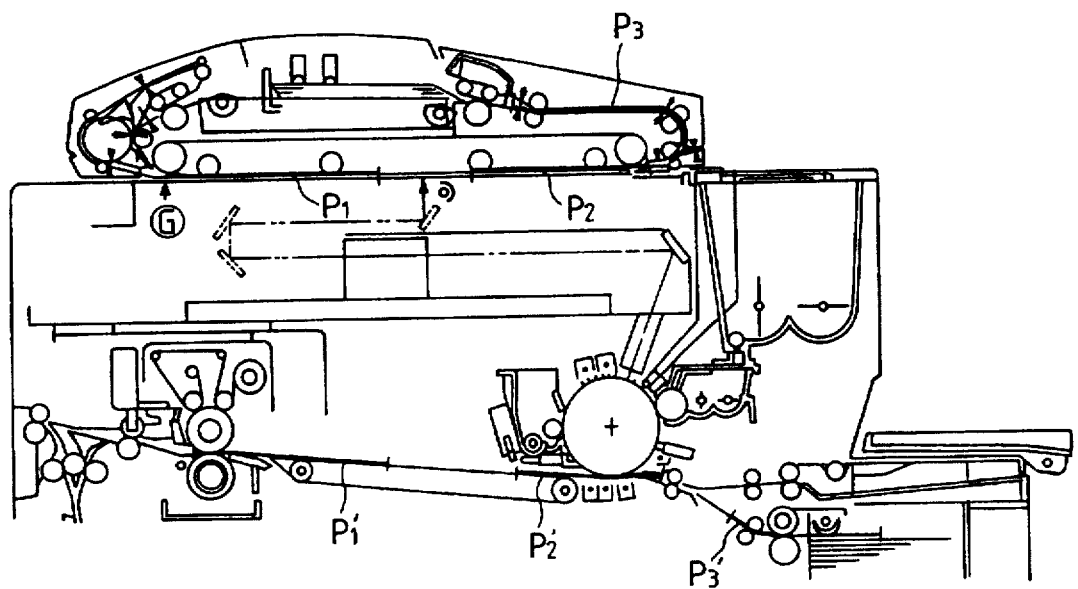

When the original reaches the home position (first image tip position) of the optical system (detected by a home position sensor (not shown)), the optical system is shifted (the original $P_1$ is fixed), thereby effecting the exposure (i.e., the stationary reading mode is started). In this case, the original $P_1$ has already reached the first image tip position (stationary reading image tip position) G. FIG. 16H shows a condition that the exposure portion 133 of the optical system reaches the first image tip position G. FIG. 16I shows a condition that the exposure is being effected by shifting the optical system.

Thereafter, in case where a plurality (m) of sets of copies are desired, the exposure operations are repeated by (m−1) times by reciprocally shifting the optical system (in this case, since the exposure operation is effected once in the flow reading mode, the exposure operations by shifting the optical system may be repeated by (m−1) times).

Since the timing relation between the original and the transfer sheet in the exposure operation effected by shifting the optical system is already known, explanation thereof will be omitted.

FIGS. 12A to 17L show a condition that two sets of copies are formed, and, thus, the flow reading scan and the stationary reading scan are effected once, respectively. On the other hand, when one set of copies are desired, since the stationary reading mode can be omitted, the optical system is stopped at the flow reading image tip position H, and the flow reading scan alone may be effected.

Figure 17K:
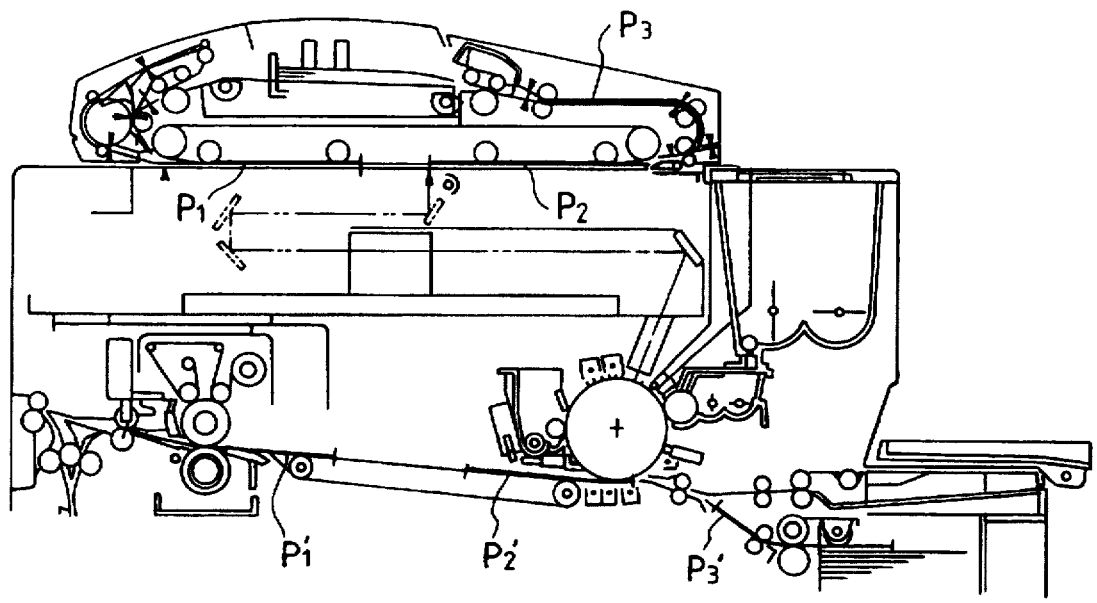
Figure 17L:
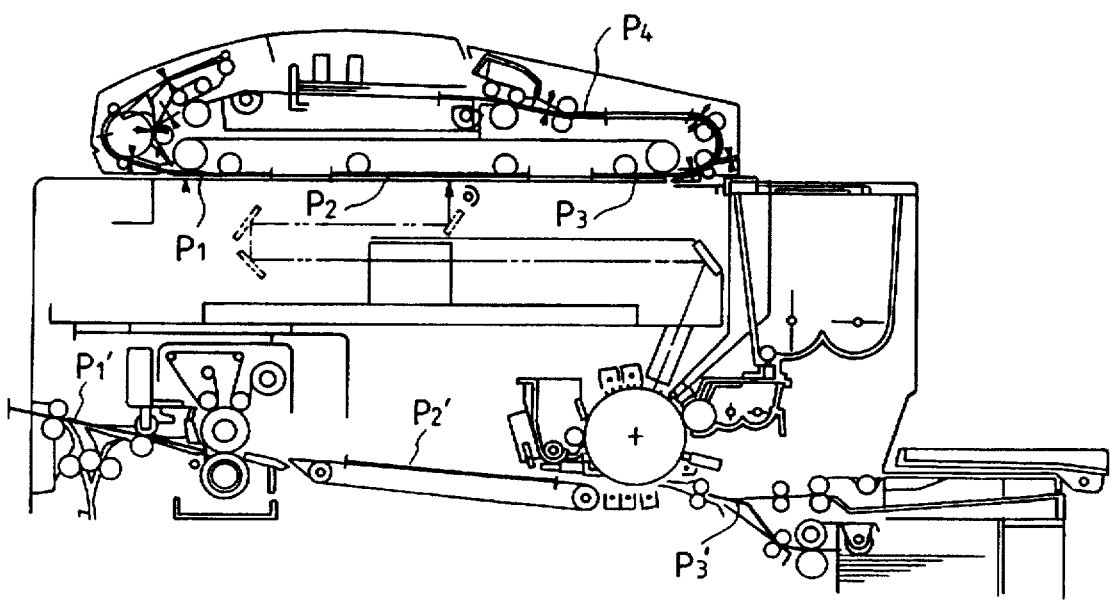

After the stationary reading operation is finished, in order to effect the flow reading regarding the next original $P_2$, the optical system is not returned to the first image tip position G but is shifted toward the direction $X_1$ by a predetermined distance (deceleration and stop distance) so that the exposure portion 133 of the optical system is brought to the flow reading image tip position H and is stopped there (FIG. 16I). Then, the flow reading operation regarding the next original $P_2$ is started. During the flow reading operation regarding the next original, the original $P_1$ passes through the left end of the platen glass 105 and is discharged onto the tray 2. Since the timing of the original $P_2$ is the same as that of the original $P_1$, explanation thereof will be omitted (FIGS. 17K and 17L).

Thereafter, the same operations are repeated by times corresponding to the number of originals, and then the copying operation is finished.

Next, the control device of the RDF will be explained with reference to FIG. 27.

Figure 27:
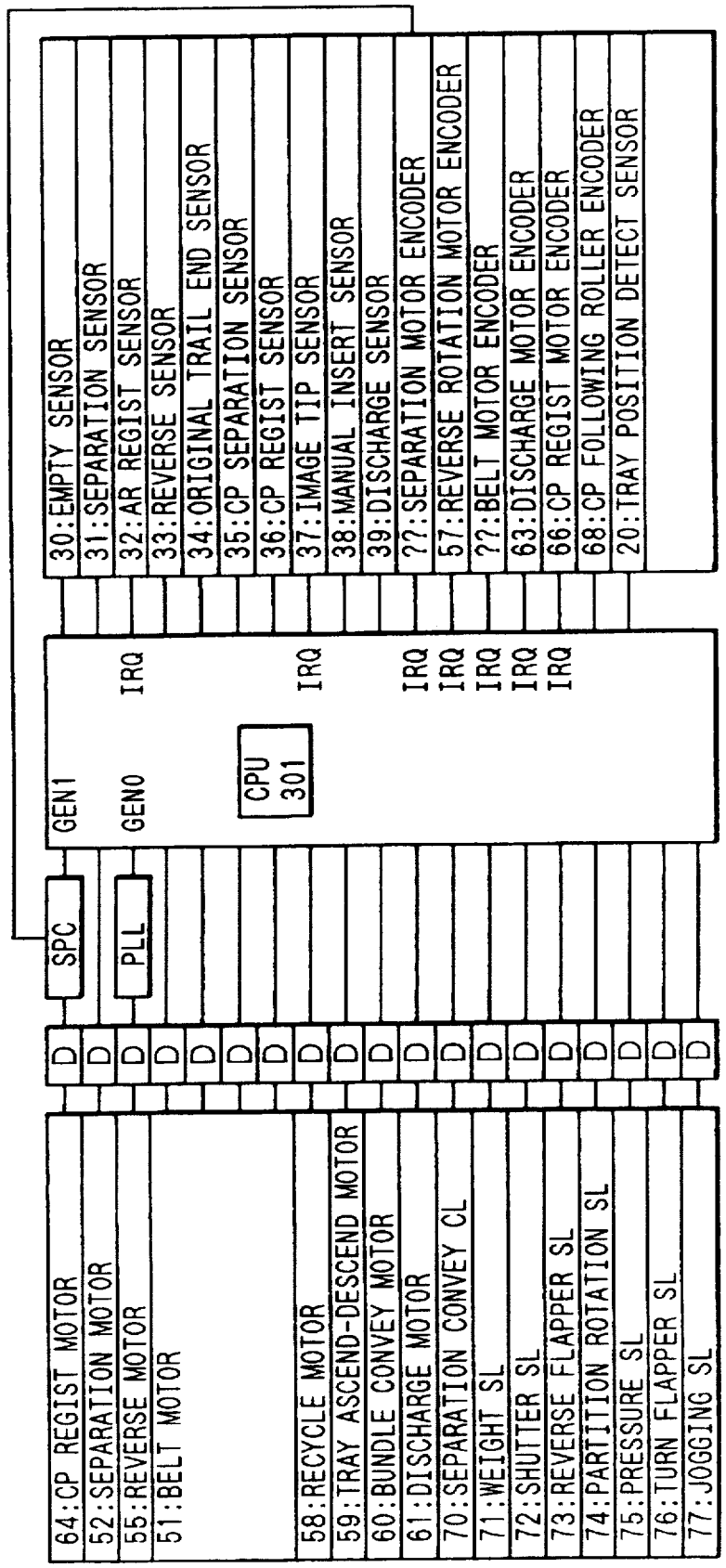
FIG. 27 is a control block diagram of the RDF applied to the image forming apparatus according to the present invention.

FIG. 27 is a block diagram showing the control circuit of the RDF. The control circuit includes a one-chip microcomputer (CPU) 301 incorporating therein a ROM and a RAM and the like, and the above-mentioned various sensor are connected to input ports of the CPU 301. Further, a slide volume for detecting the width of the original is connected to an A/D converter terminal of the CPU 301 so that values of the slide volume can be continuously detected in 255 steps.

Further, the above-mentioned various loads are connected to output ports of the CPU 310 via drivers. Particularly, the reverse rotation motor 55 is connected to the output port of the CPU via a conventional PLL circuit and the driver. A rectangular wave signal having any frequency is inputted to the PLL circuit from a rectangular wave output terminal GENO of the CPU 301. By changing the frequency of this signal, it is possible to effect the speed equalization control between the reverse rotation motor and the belt motor 51.

Further, a CP regist motor 64 is connected to its driver through a stepping motor pattern controller (SPC). A rectangular wave signal having a variable frequency is inputted to the SPC from a rectangular wave output terminal GENI of the CPU 301 through a selector. By changing the frequency of this signal, it is possible to effect the speed equalization control between the CP regist motor and the belt motor 51. Further, the separation motor encoder 54 is connected to the other side of the selector. By switching the selector this side, it is possible to effect the speed equalization control between the CP regist motor and the separation motor 52.

Further, control data is communicated between the RDF and the copying machine through a communication IC 302. Receiving data include flow reading speed data (V), original convey mode data regarding one-face/both-face/flow reading modes, original supply trigger, original exchange (flows reading start) trigger, and original discharge trigger, and, transmitting data include original supply/exchange/discharge completion signals, original size data, last original signal for informing of the end of circulation, and image tip signal for the flow reading mode.

Figure 28:
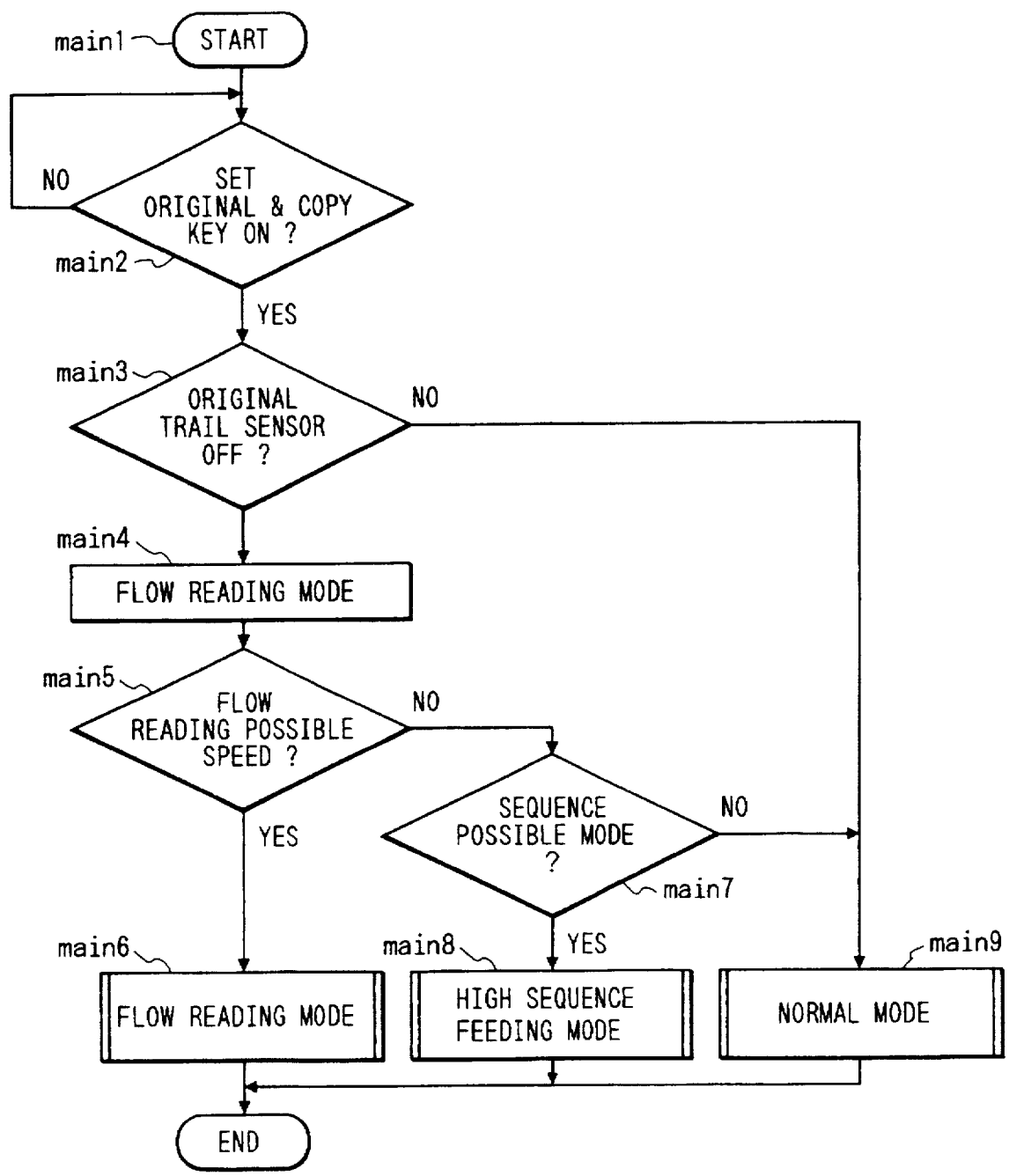
FIG. 28 is a main flow chart showing an operation of the image forming apparatus.

Further, control sequence (control program) as shown in FIGS. 28 and so on is previously stored in the ROM of the CPU. The various inputs and outputs of the CPU are controlled in accordance with the control sequence.

(Main Flow Chart)

Next, the operation in the illustrated embodiment will be explained with reference to a main flow chart shown in FIG. 28.

When empty sensor 30 detects the fact the originals are set and the copy start button of the copying machine 100 is depressed, the operation is started (main 1, 2). In this case, it is judged whether the original trailing end sensor 34 is turned OFF (main 3). If affirmative (YES), it is judged whether the copy mode sent from the copying machine is the flow reading mode or not (main 4). If affirmative (flow reading mode), the program goes to main 5, whether it is judged whether the flow reading speed data (V) sent from the copying machine 100 can be performed in the RDF of the present invention. If affirmative, in main 6, the series copying processes are effected in the flow reading mode, and then the operation is ended. In the main 4, if negative, the program goes to main 7, where it is judged whether it is possible to perform the high sequence feeding mode in which the copying process is effected while resting two originals on the platen 105 (in the illustrated, the one-face copy mode corresponds to the high sequence feeding mode). If affirmative, in main 8, the series copying processes are effected in the high sequence feeding mode which will be described later, and then the operation is ended. In the main 3, if negative (NO), the program goes to main 9, where the series copying processes are effected in the normal switch back mode which will be described later, and then the operation is ended.

In the illustrated embodiment, while the selection of mode on the basis of the size of the original was regulated only by the feeding direction of the original depending upon ON/OFF of the original trailing end sensor 34, as mentioned above, the mode selection on the basis of the size of the original may be regulated by the combination of the original trailing end sensor and the original width detection means (slide volume) provided below the original tray.

(Flow Reading Mode)

Figure 29:
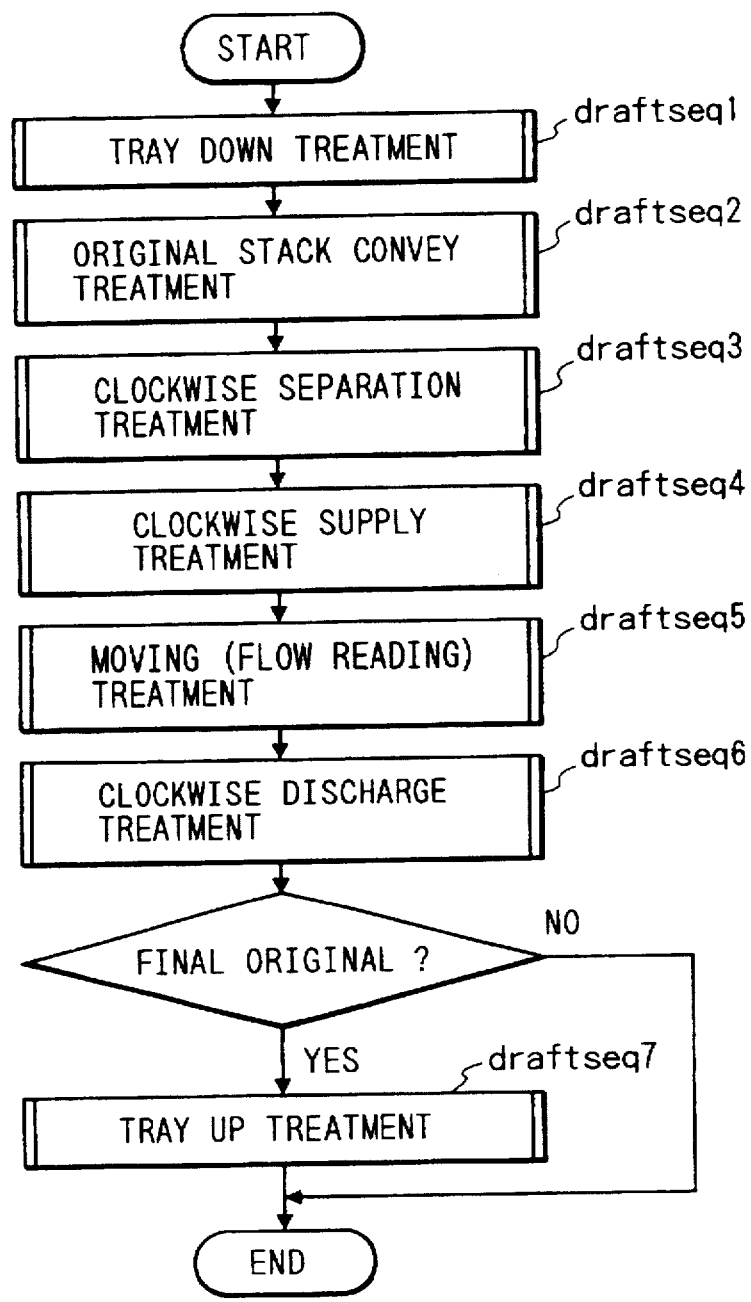
FIG. 29 is a flow chart regarding a flow reading mode (including the mix mode)

Next, the flow reading mode will be explained with reference to FIG. 29.

Since the operation of the flow reading mode includes the operation of the mix mode in the RDF 1, the mix mode will also be explained.

A tray down treatment which will be described later is effected to shift the original tray 2 to a lower limit position (draftseq 1), and an original stack (bundle) convey treatment which will be described later is effected to shift the original stack P to the right (draftseq 2). Thereafter, a clockwise separation treatment which will be described later is effected to separate only the lowermost original from the original stack (draftseq 3). Then, a clockwise supply treatment which will be described later is effected to position the original at a position spaced apart from the flow reading image tip position H upstreamly by the distance 1 (draftseq 4). When the original exchange trigger (flow reading start trigger) is sent from the copying machine 100, an original flow reading treatment is effected to read the original while fixing the optical system 100 of the copying machine 100 (draftseq 5), so that the original is shifted to the stationary reading image tip position G at the constant speed. Then, a clockwise discharge treatment is effected to discharge the original onto the original tray 2 (draftseq 6).

During the clockwise separation treatment (draftseq 3) which will be described later, when it is judged that the original is not a last original, in the next step, i.e., clockwise supply treatment (draftseq 4), a left side separation treatment for the next original is started, thereby permitting the continuous original conveyance. After the clockwise discharge treatment (draftseq 6) is finished, if it is judged that the original is the last original, a tray up treatment which will be described later (draftseq 7) is effected to return the original tray 2 to the initial position.

Further, after the original flow reading treatment (draftseq 5) is finished, when a plurality of image forming operations are desired, the optical system 133 of the copying machine 100 is returned to the home position at the side of the stationary reading image tip position G, and, then, the stationary reading can be effected by reciprocally shifting the optical system 133 by the desired number of times.

(High Sequence Feeding Mode)

Figure 30:
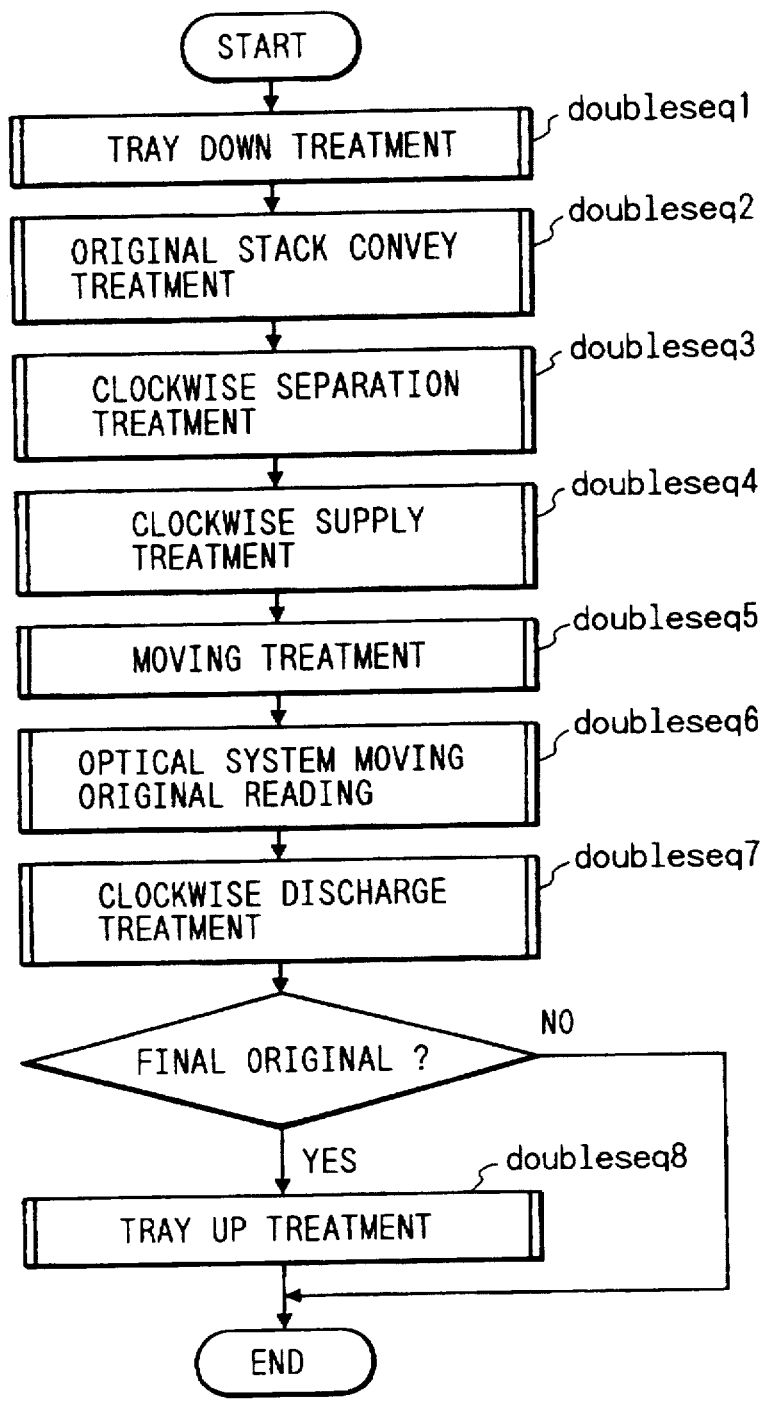
FIG. 30 is a flow chart regarding a high sequence feeding mode.

Next, the high sequence feeding mode will be explained with reference to FIG. 30.

A tray down treatment which will be described later is effected to shift the original tray 2 to a lower limit position (doubleseq 1), and an original stack (bundle) convey treatment which will be described later is effected to shift the original stack P to the right (doubleseq 2). Thereafter, a clockwise separation treatment which will be described later is effected to separate only the lowermost original from the original stack (doubleseq 3). Then, a clockwise supply treatment is effected to position the original at the right end of the platen 105 (doubleseq 4). Then, an original moving treatment is effected to shift the original on the platen 105 to the stationary reading image tip position G (doubleseq 5). Thereafter, the stationary original reading is effected while shifting the optical system 133 of the copying machine 100 (doubleseq 6), and then a clockwise discharge treatment is effected to return the original to the original tray 2 (doubleseq 7).

During the clockwise separation treatment (doubleseq 3) which will be described later, when it is judged that the original is not a last original, in the next step, i.e., clockwise supply treatment (doubleseq 4), a left side separation treatment for the next original is started, thereby permitting the continuous original conveyance. Further, after the intermittent discharge treatment (doubleseq 7) is finished, if it is judged that the original is the last original, a tray up treatment which will be described later (doubleseq 8) is effected to return the original tray 2 to the initial position.

(Normal Switch Back Mode)

Figure 31:
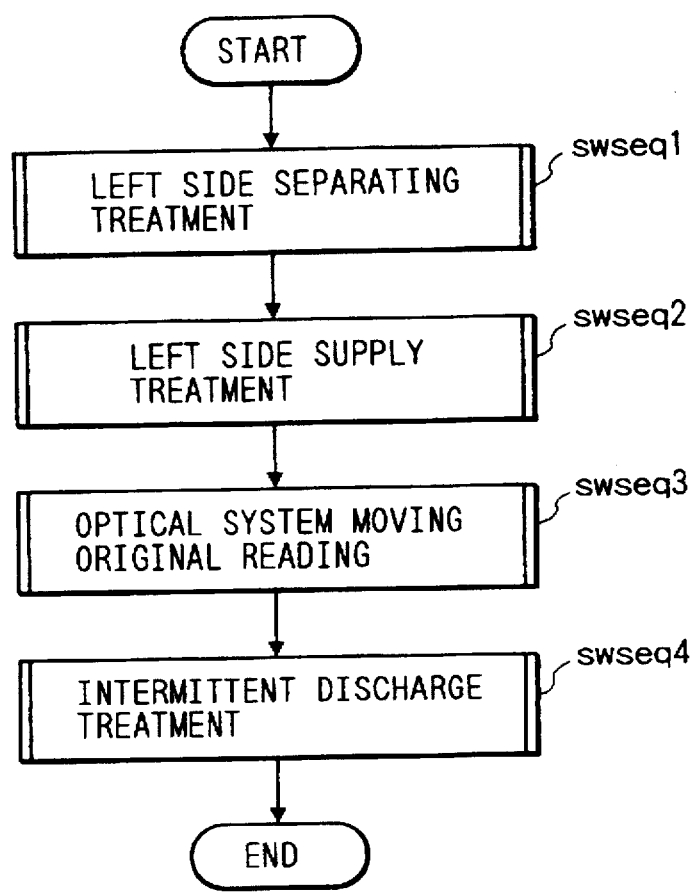
FIG. 31 is a flow chart regarding a normal switch back mode.

Next, a normal switch back mode will be explained with reference to FIG. 31.

A switch back separation treatment (swseq 1) which will be described later is effected to separate only the lowermost original from the original stack P on the original tray 2, and then a switch back supply treatment (swseq 2) which will be described later is effected to rest the original on the platen 105. Thereafter, the stationary original reading is effected while shifting the optical system of the copying machine 100 (swseq 3), and then an intermittent discharge treatment is effected to return the original to the original tray 2 (swseq 4).

Since this mode does not directly relate to the gist of the present invention, detailed explanation thereof will be omitted.

Next, the above-mentioned various treatments will be fully described.

(Tray Up Treatment)

Figure 32:
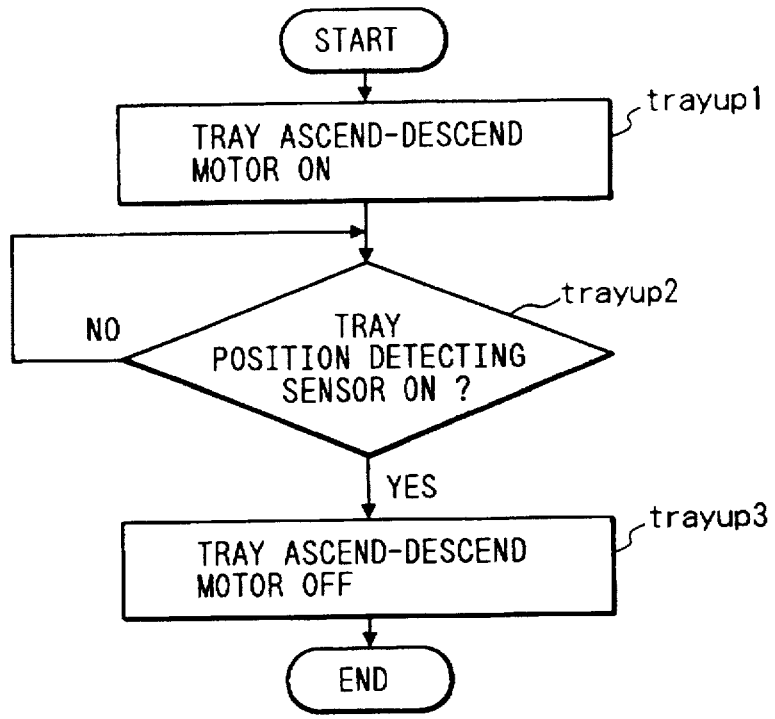
FIG. 32 is a flow chart regarding a tray up treatment.

Now, the tray up treatment in the RDF 1 will be explained with reference to FIG. 32.

In order to lift the original tray 2 to the position shown by the solid line in FIG. 1, the tray ascend/descend motor 59 is driven until the tray position detection sensor 20 is turned ON. When the tray position detection sensor 20 is turned ON, the tray ascend/descend motor 59 is stopped.

(Tray Down Treatment)

Figure 33:
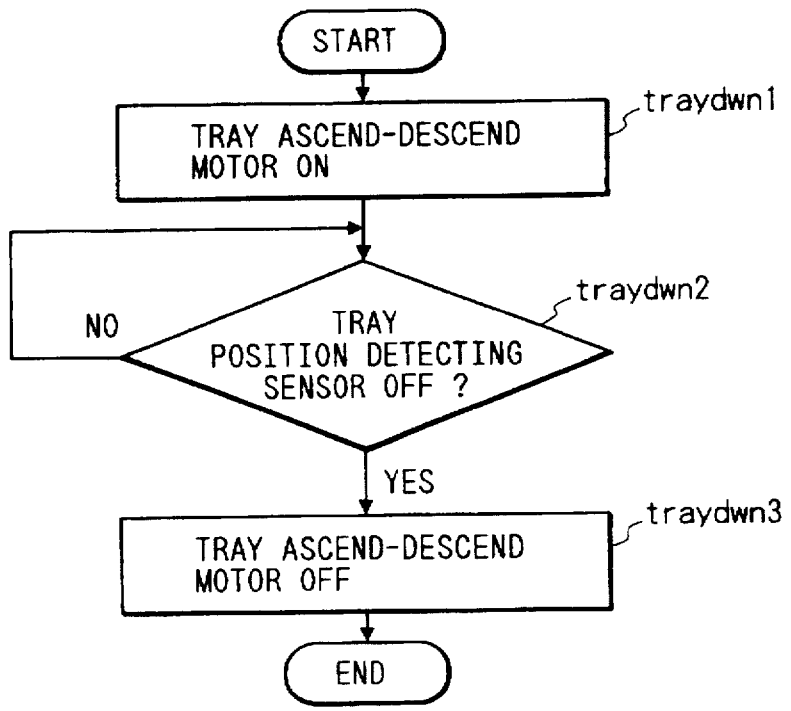
FIG. 33 is a flow chart regarding a tray down treatment.

Next, the tray down treatment in the RDF 1 will be explained with reference to FIG. 33.

In order to lower the original tray 2 to the position shown by the broken line in FIG. 1, the tray ascend/descend motor 59 is driven until the tray position detection sensor 20 is turned OFF. When the tray position detection sensor 20 is turned OFF, the tray ascend/descend motor 59 is stopped.

(Bundle Convey Treatment)

Figure 34:
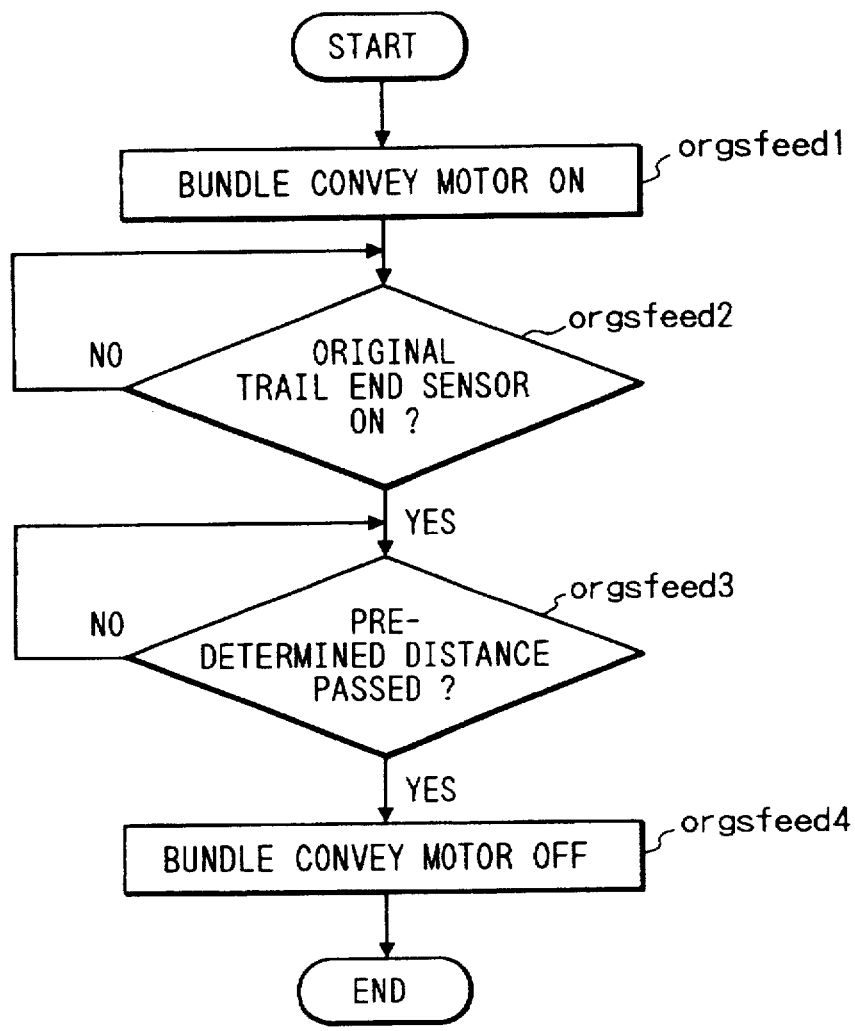
FIG. 34 is a flow chart regarding a bundle convey treatment.

Next, the bundle convey treatment will be explained with reference to FIG. 34.

In the bundle convey treatment, the bundle convey motor 60 is driven to convey the original bundle P on the original tray 2 toward the direction F in FIG. 1 (orgsfeed 1). Thereafter, the tip end of the original bundle P is detected by the original trailing end sensor 34 (orgsfeed 2), and then, the original bundle is conveyed by a stopper unit until the original bundle advances by a predetermined distance (orgsfeed 3). In this case, the moving distance through which the original bundle is conveyed by the bundle convey motor 60 is monitored by an inner timer of the CPU 301. Thereafter, the bundle convey motor 60 is turned OFF (orgsfeed 4), and the bundle convey treatment is ended.

(Clockwise Separation Treatment)

Next, the clockwise separation treatment will be explained with reference to FIG. 35.

In the clockwise separation treatment, if the original is a first original (rsepa 1), the recycle motor 58 is activated to drive the recycle lever 3 for detecting the circulation of the original bundle P (rsepa 2). Thereafter, the separation motor 52 is turned ON to separate only the lowermost original from the original bundle (rsepa 3). In this case, the speed of the separation motor 52 is controlled so that such a speed becomes substantially the same as the flow reading speed (v) designated by the copying machine 100. On the other hand, the above-mentioned control is not required in the high sequence feeding mode, and, thus, the high sequence feeding mode may be controlled at any speed. When the tip end of the original conveyed in the sheet path PH3 is detected by the closed-loop regist sensor 36 (rsepa 4), the speed control for driving the separation motor 58 at a low speed is started and the separation loop timer is started (rsepa 5). When the timer set time is elapsed (rsepa 6), the CP regist motor 64 is driven in synchronous with the separation motor, and at the same time a heading timer for protruding the tip end of the original downwardly from the closed-loop regist rollers 11 by a predetermined amount is started (rsepa 7). After the timer set time is elapsed (rsepa 8), the separation motor 58 is turned OFF and the CP motor 64 is stopped in the lock mode (rsepa 9).

With this treatment, the original is conveyed by the closed-loop regist rollers 11 to the position where the tip end of the original is protruded from the regist rollers by the predetermined amount. The predetermined amount $\Delta l$ is any distance which satisfies the following relation (1):

$$\Delta l \leq L2 - L1 \tag{1}$$

Where, L1 is a distance through which the peripheral speed of the closed-loop regist rollers is stabilized when the CP motor 63 is rised in synchronous with the belt motor in the clockwise supply treatment which will be described later, and L2 is a distance between the image tip sensor 37 and the closed-loop regist rollers 11.

In the flow reading mode, if there is the preceding original, since the shifting amount of the present original in the clockwise supply treatment (which will be described later) belongs to the shifting amount of the preceding original in a preceding original moving treatment (which will be described later), when a distance between the stationary reading image tip position G and the flow reading image tip position H is L, a distance between the flow reading image tip position H and the flow reading waiting position is $l_1$ and a distance between the stationary reading image tip position G and the nip of the closed-loop regist rollers 11 is L5, the above predetermined amount $\Delta l$ may be any value which satisfies the above relation (1) and the following relation (2):

$$\Delta l \leq L5 - (L + l_1) \times 2 \tag{2}$$

(Clockwise Supply Treatment)

Figure 36:
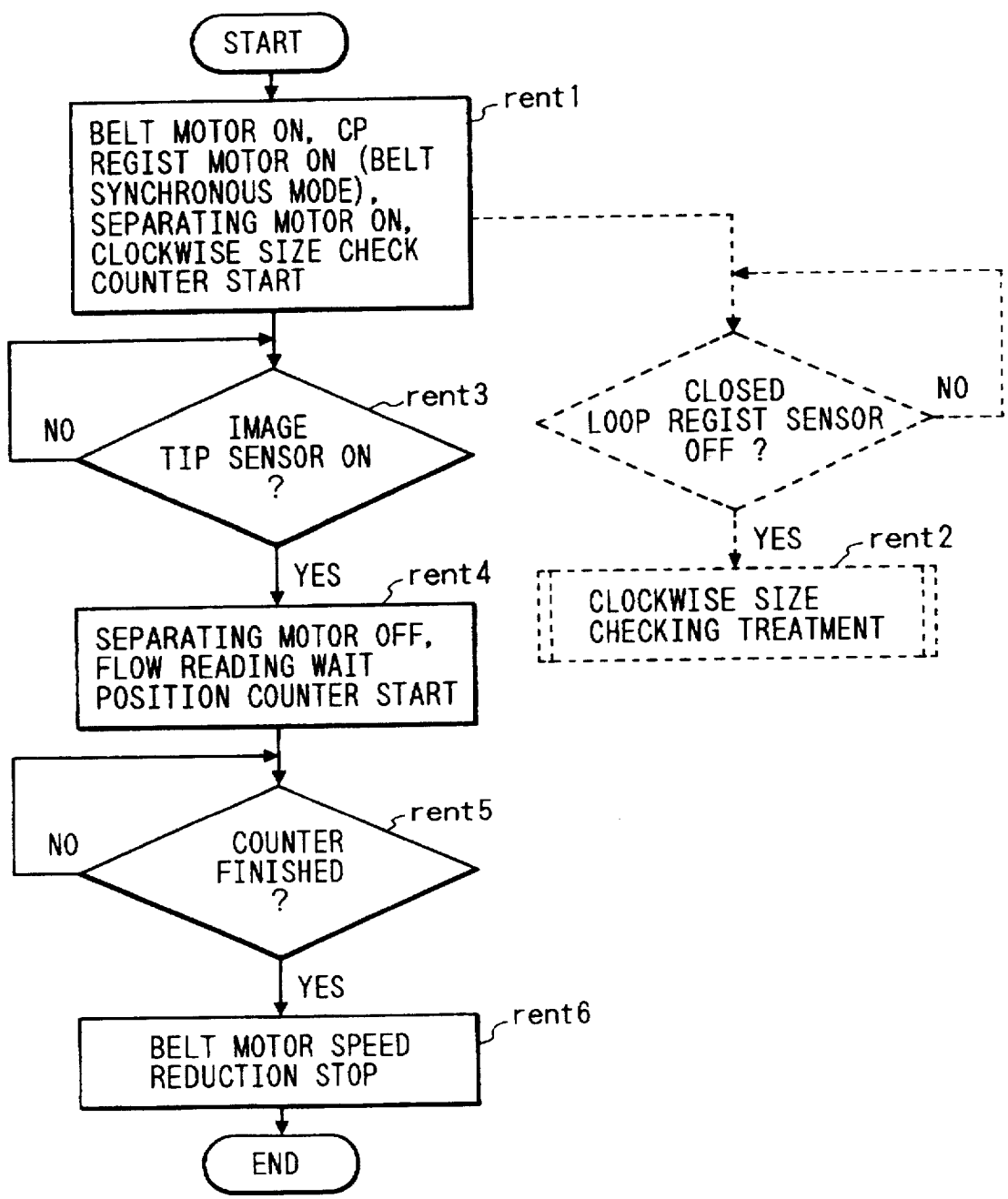
FIG. 36 is a flow chart regarding a clockwise supply treatment.

Next, the clockwise supply treatment will be explained with reference to FIG. 36.

In the clockwise supply treatment, in order to convey the original through the sheet path PH3, the belt motor 51 is driven at any speed (in case of the first original or in the high sequence feeding mode) or at the flow reading speed (v) designated by the copying machine 100 in association with a clockwise moving (flow reading) treatment (in case of the second original, third original and so on in the flow reading mode (including the mix mode)), and at the same time the CP regist motor 64 is turned ON synchronously with the belt motor. Further, in this case, the separation motor 52 is turned ON and is controlled so that the pair of closed-loop convey rollers 10, 10' are driven at the same speed as that of the CP regist motor 64. Further, at the same time, a clockwise re-size check counter is started for counting the clock signals from the CP regist motor encoder detection sensor 66 (rent 1) to hold the count amount until the trailing end of the original passes through the closed-loop regist sensor 36, and, on the basis of such data, the size of the original is judged in the clockwise size check treatment shown in FIG. 36 (rent 2). Then, when the tip end of the original is detected by the image tip sensor 37 (rent 3), the separation motor 52 is turned OFF and at the same time a flow reading waiting position counter for counting the belt motor drive clocks generated in the CPU 301 driving the belt motor 51 is started to stop the original at the flow reading image tip waiting position (upstream from the flow reading image tip position H by the distance $l_1$) (rent 4). When the flow reading waiting position counter is finished, the belt motor is decelerated and then is stopped (rent 5). In this case, the distance used in the deceleration is subtracted from the flow reading waiting position counter.

The distance $l_1$ between the flow reading image tip position H and the flow reading waiting position may be any distance which satisfies the following relation (3):

$$l_1 \geq L3 \tag{3}$$

Where, L3 is a distance through which the peripheral speed of the wide belt 40 is stabilized when the belt motor 51 is risen at the speed (v) designated by the copying machine 100 in the clockwise moving treatment which will be described later.

However, this limitation is not required in the high sequence feeding mode.

(Moving Treatment, including Flow Reading Treatment)

Figure 37:
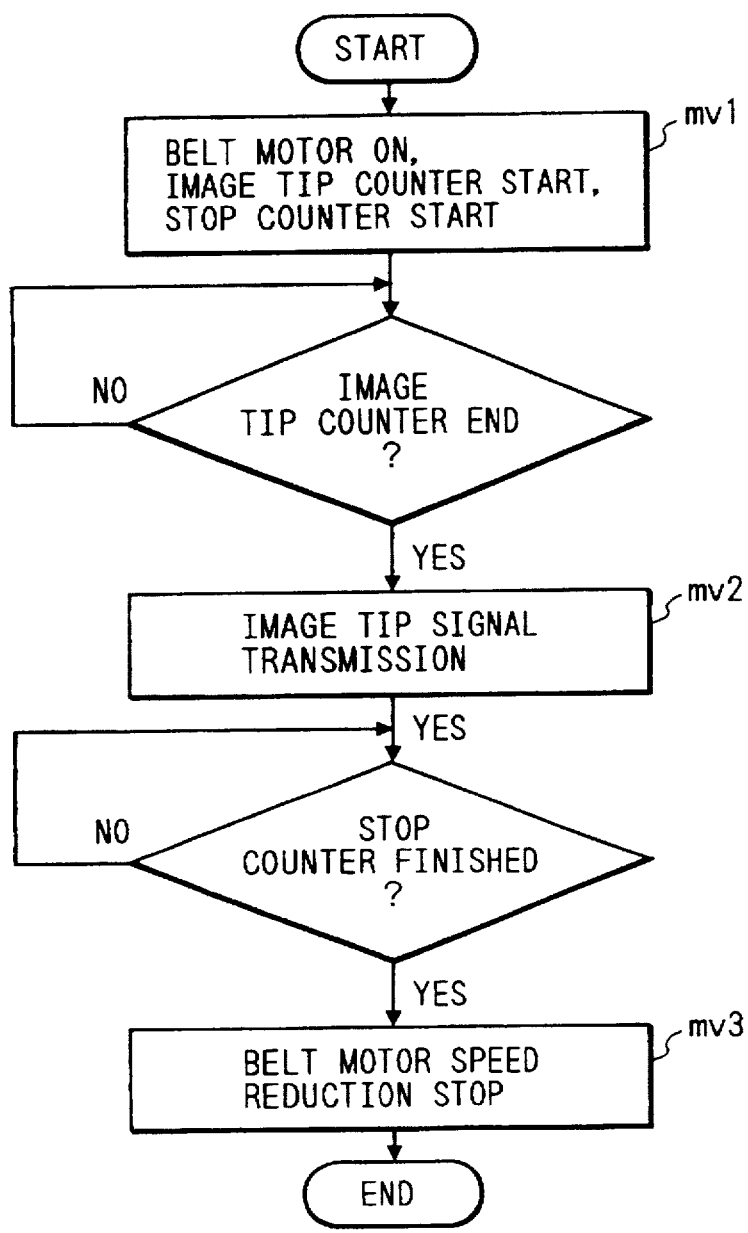
FIG. 37 is a flow chart regarding a moving treatment (including a flow reading treatment in the low reading mode)

Next, the moving treatment (including the flow reading treatment) will be explained with reference to FIG. 37.

In the moving treatment (including the flow reading treatment), in order to drive the wide belt 40 to convey the original along the sheet path PH3, the belt motor 51 is driven at the flow reading speed (v) designated by the copying machine 100 in the flow reading mode (including the mix mode) or at any speed in the high sequence feeding mode, and the belt motor drive clocks generated in the CPU 301 driving the belt motor 51 are counted. In this case, the image tip counter corresponding to the distance $l_1$ between the flow reading image tip position H and the flow reading waiting position, and the stop counter corresponding to an amount obtained by subtracting the deceleration/stop loss from the distance between the stationary reading image tip position G and the flow reading waiting position are started (mv 1). When the image tip counter is finished, the image tip signal is sent to the copying machine 100 (mv 2). Then, when the stop counter is finished, the belt motor 51 is decelerated and then is stopped (mv 3).

With this sequence, since the original passes through the flow reading image tip position H at the predetermined speed (v) (designated by the copying machine 100), the flow reading image formation can be effected by the copying machine 100 and the original can be shifted to the stationary reading image tip position G. Thereafter, as mentioned above, the stationary original reading can be performed by shifting the optical system 133 of the copying machine 100, if necessary.

(Clockwise Discharge Treatment)

Figure 38:
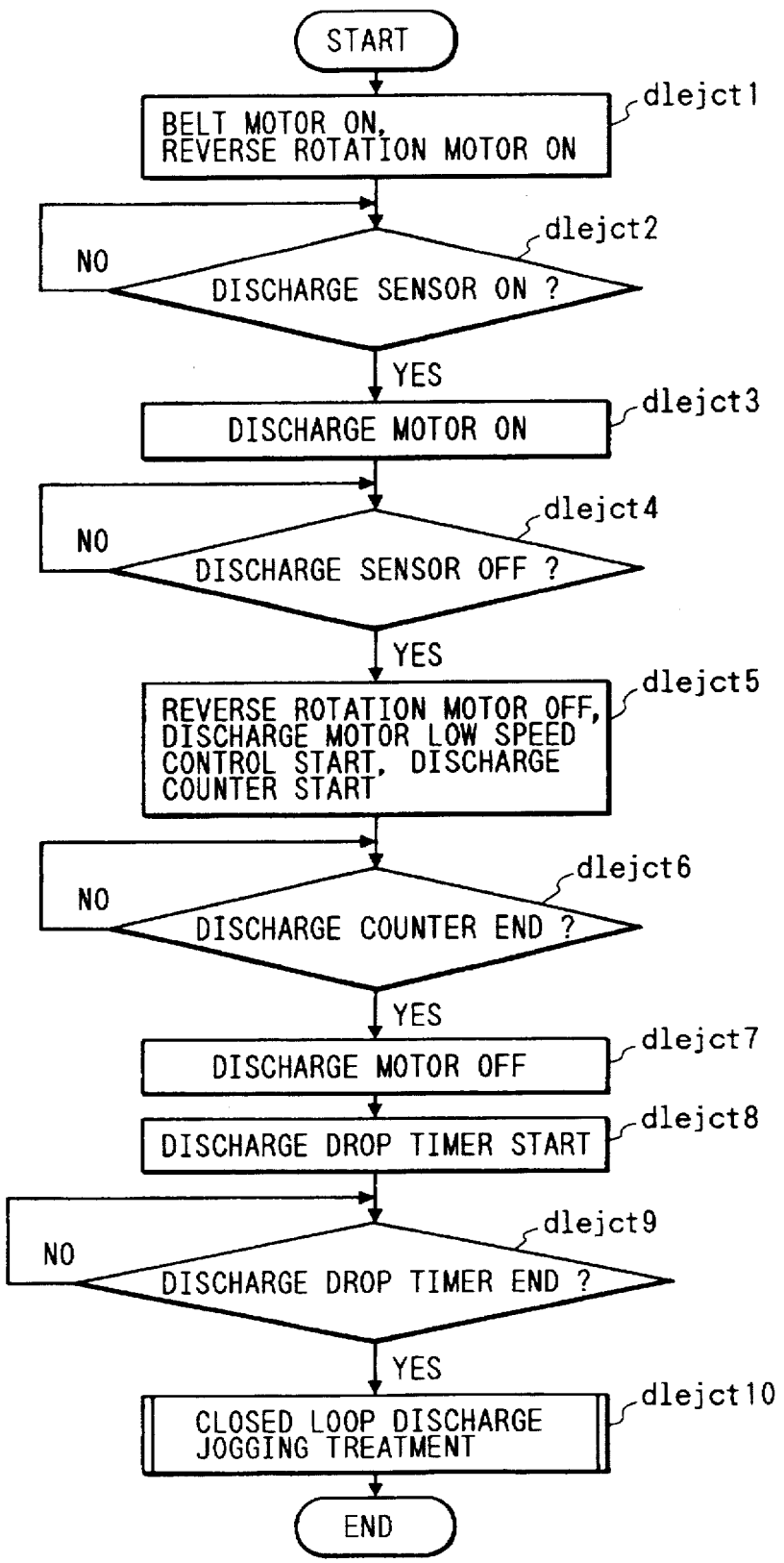
FIG. 38 is a flow chart regarding a clockwise discharge treatment.

Next, the clockwise discharge treatment will be explained with reference to FIG. 38.

In the clockwise discharge treatment, in order to discharge the original from the platen 105, the belt motor 51 and the reverse rotation motor 55 are driven at the speed (v) designated by the copying machine 100 in the flow reading mode (including the mix mode) or at any speed in the high sequence feeding mode (dlejct 1), and the original is conveyed from the sheet path PH3 to the sheet path PH2. When the tip end of the original is detected by the discharge sensor 39 (dlejct 2), the discharge motor 61 is driven at any speed greater than the speed of the reverse rotation motor 55 (dlejct 3). Then, when the trailing end of the original is detected by the discharge sensor 39 (dlejct 4), the reverse rotation motor 55 is turned OFF, and the discharge motor 61 is driven under the slow speed control optimum to discharge the original, and the discharge counter for determining a distance through which the original is discharged onto the original tray 2 is started (dlejct 5). When the discharge counter is finished (dlejct 6), the discharge motor 61 is turned OFF (dlejct 7), and a discharge drop timer for determining an interval during which the original is dropped on the original tray 2 is started (dlejct 8). When the discharge drop timer is finished (dlejct 9), the closed-loop discharge jogging treatment is effected (dlejct 10) to align the discharged originals with each other, and then the clockwise discharge treatment is ended.

(Switch Back Separation Treatment)

Figure 39:
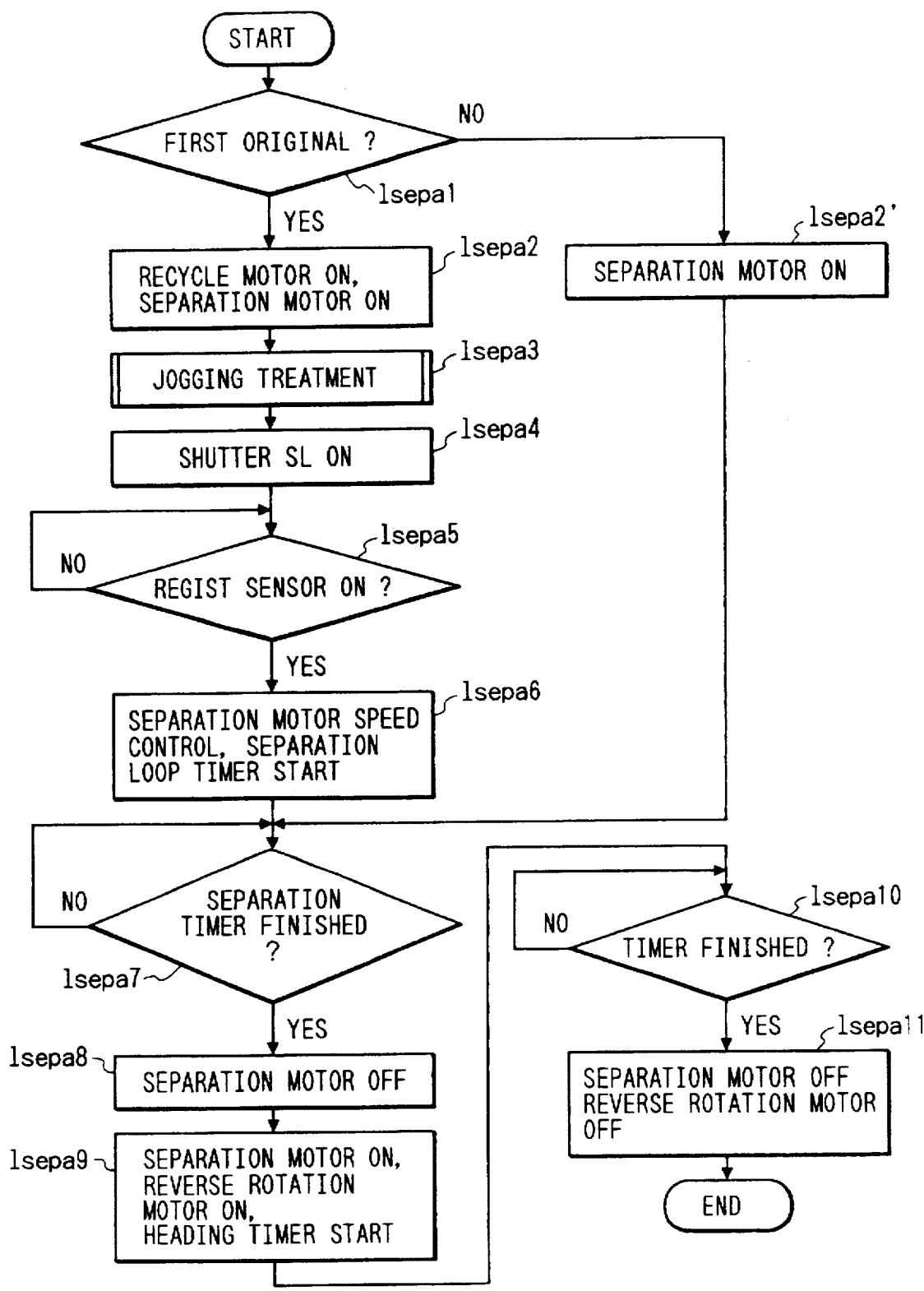
FIG. 39 is a flow chart regarding a switch back sort treatment.

Next, the switch back separation treatment will be explained with reference to FIG. 39.

In the switch back separation treatment, if the original is a first original (lsepa 1), the recycle motor 58 is turned ON to drive the recycle lever 3 for detecting the circulation of the original stack P, and at the same time the separation motor 52 is turned ON (lsepa 2) to handle the original stack P. Then, a jogging treatment which will be described later is effected (lsepa 3) to align the originals in a widthwise direction. Thereafter, when the jogging treatment is finished, the shutter solenoid 72 is turned ON (lsepa 4) to lower the shutter 41, thereby separating only the lowermost original from the original stack P. When the tip end of the original conveyed in the sheet path is detected by the switch back regist sensor 32 (lsepa 5), the speed control for reducing the speed of the separation motor 52 is started, and the separation loop timer is also started (lsepa 6). When the timer is finished (lsepa 7), the separation motor 52 is turned OFF (lsepa 8). As a result, since the original is abutted against the nip of the pair of regist rollers 6, 6' at a low speed, it is possible to prevent the damage of the tip end of the original and to reduce noise. Then, the original is stopped after a predetermined loop is formed in the original. In this way, the skew-feed of the original can be corrected.

Further, in order to reduce the original exchange time, the separation motor 52 and the reverse rotation motor 55 are driven at any speed, and at the same time the heading timer having any value is started (lsepa 9). When the timer is finished (lsepa 10), the separation motor 52 and the reverse rotation motor 55 are turned OFF (lsepa 11), thereby completing the heading.

(Switch Back Supply Treatment)

Figure 40:
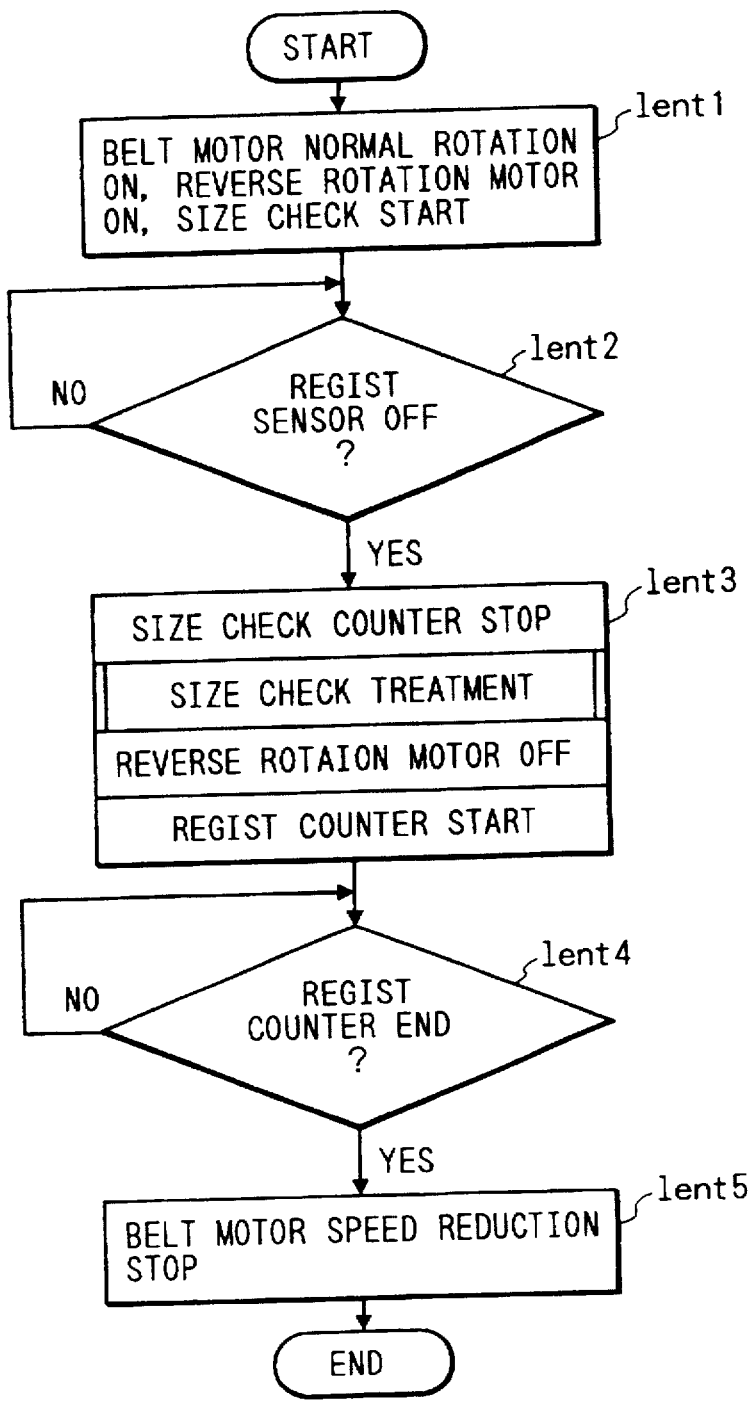
FIG. 40 is a flow chart regarding a left side supply treatment.

Next, the switch back supply treatment will be explained with reference to FIG. 40.

Figure 43:
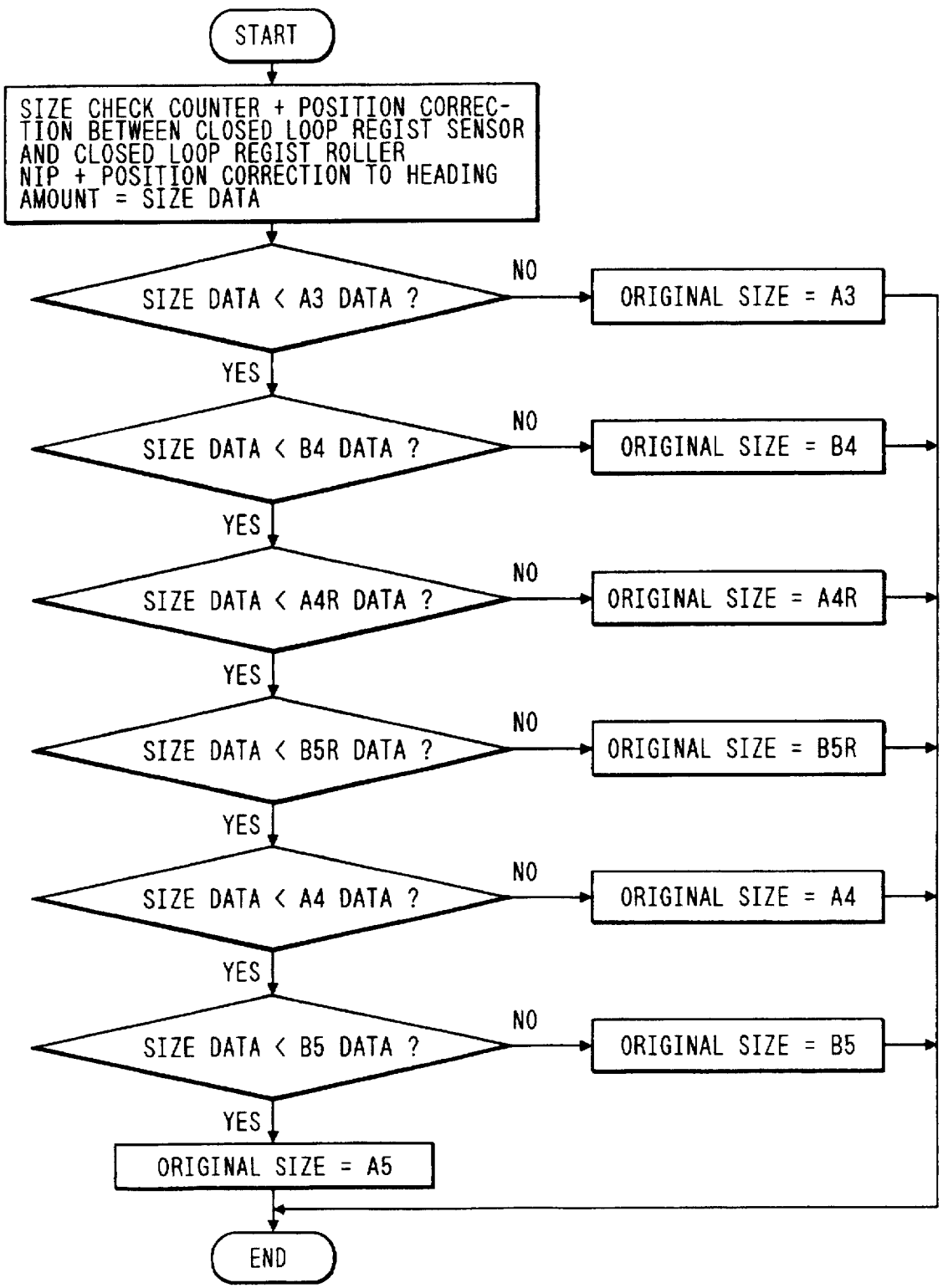
FIG. 43 is a flow chart regarding a clockwise size check sub-routine.

In the switch back supply treatment, the pair of regist rollers 6, 6' and the wide belt 40 are driven, and the belt motor 51 and the reverse rotation motor 55 are turned ON to convey the original in the sheet path PH1, and at the same time the size check counter for counting the clock signals from the reverse rotation motor encoder detection sensor 57 is started (lent 1). And, at the same time when the trailing end of the conveyed original passes through the regist sensor 32 (lent 2), the size check counter is stopped (lent 3), and, on the basis of such data, the size of the original is judged under the size check treatment as shown in FIG. 43. Further, the regist counter for counting the belt motor drive clocks generated in the CPU 301 driving the belt motor 51 is started (lent 3) to stop the original at the predetermined position on the platen 105. When the regist counter is finished (lent 4), the belt motor is decelerated and then is stopped, thereby stopping the original with high accuracy (lent 5). In this case, the value of the regist counter includes the substraction of the deceleration/stop loss.

(Intermittent Discharge Treatment)

Figure 41:
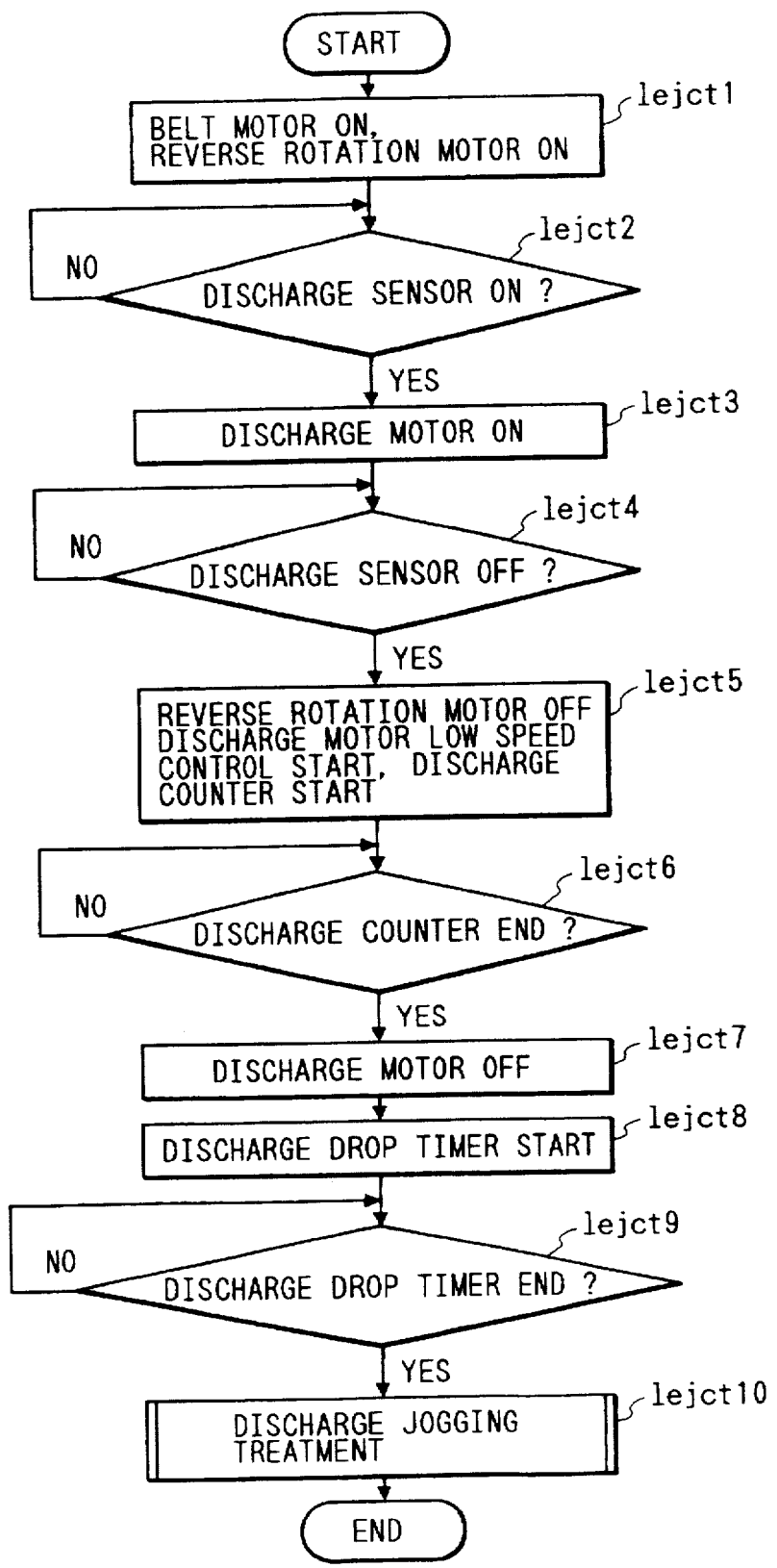
FIG. 41 is a flow chart regarding an intermittent discharge treatment.

Next, the intermittent discharge treatment will be explained with reference to FIG. 41.

In the intermittent discharge treatment, the belt motor 51 and the reverse rotation motor 55 are driven at any speed (lejct 1) to discharge the original from the platen 105. When the tip end of the original conveyed from the sheet path PH1 into the sheet path PH2 is detected by the discharge sensor 39 (lejct 2), the discharge motor 61 is driven at any speed greater than the speed of the reverse rotation motor 55 (lejct 3). Thereafter, when the trailing end of the original is detected by the discharge sensor 39 (lejct 4), the reverse rotation motor 55 is turned OFF, and the discharge motor 61 is driven under the slow speed control optimum to discharge the original, and the discharge counter for determining a distance through which the original is discharged onto the original tray 2 is started (lejct 5). When the discharge counter is finished (lejct 6), the discharge motor 61 is turned OFF (lejct 7), and a discharge drop timer for determining an interval during which the original is dropped on the original tray 2 is started (lejct 8). When the discharge drop timer is finished (lejct 9), the discharge jogging treatment is effected (lejct 10) to align the discharged originals with each other, and then the intermittent discharge treatment is ended.

(Jogging Treatment)

Figure 44:
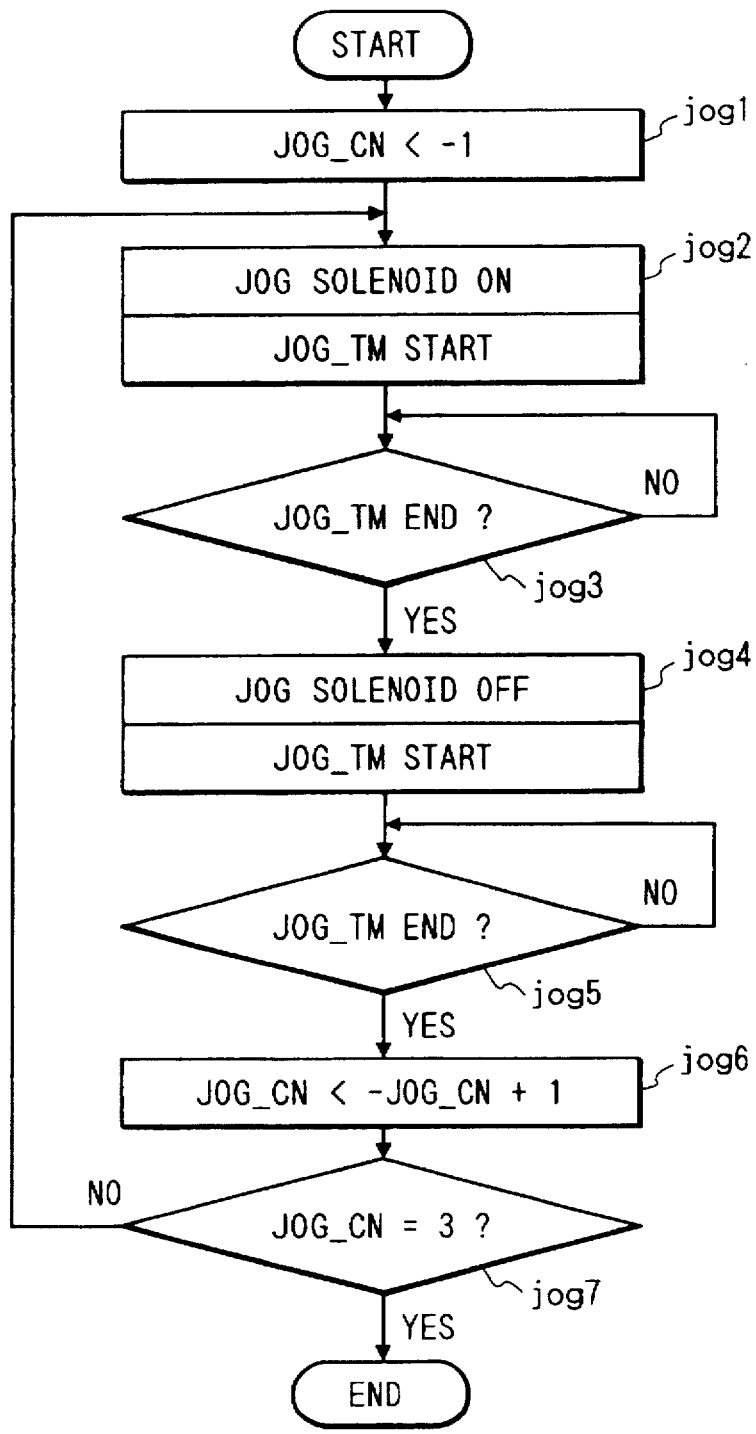
FIG. 44 is a flow chart regarding a jogging treatment.

Next, the jogging treatment will be explained with reference to a flow chart shown in FIG. 44. In the jogging treatment, first of all, a JOG-CN for determining the number of jogging operations is initialized (jog 1). Then, the jogging solenoid 77 for pushing out a jogging guide of the width regulating member is turned ON, and at the same time a timer JOG-TM which can be freely set is started (jog 2). When the set time of the timer JOG-TM is elapsed (jog 3), the jogging solenoid 77 is turned OFF to return the jogging guide to the initial condition and the timer JOG-TM is re-started (jog 4). When the timer is finished (jog 5), the number of jogging operations is increased (jog 6), so that the program is returned to the jog 2, where the treatment is repeated until the reciprocal movements of the jogging guide are effected by three times (jog 7). With this treatment the originals P are aligned with each other in the widthwise direction, thereby preventing the skew-feed and lateral registration.

(Discharge Jogging Treatment)

Figure 45:
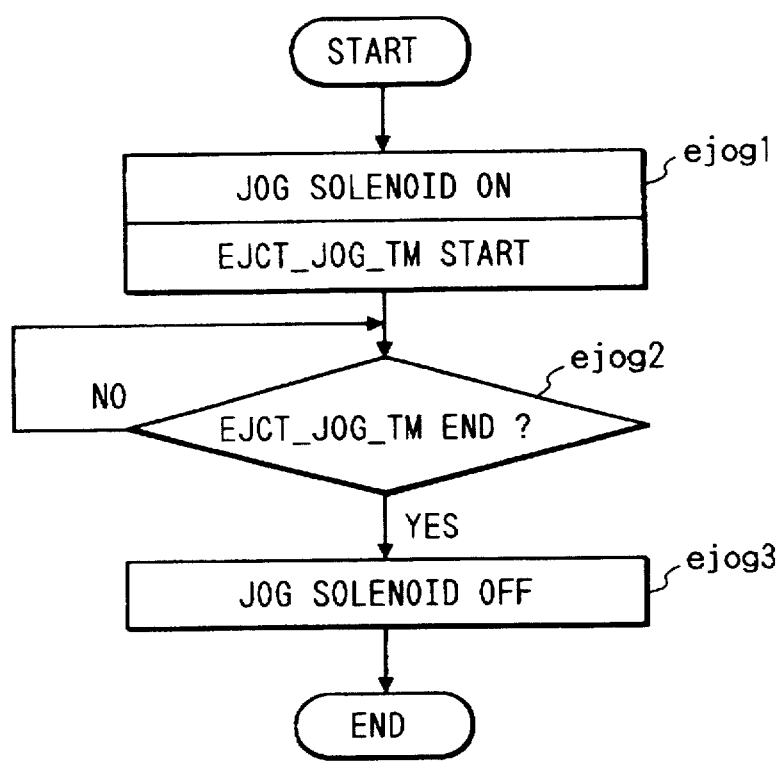
FIG. 45 is a flow chart regarding a discharge jogging treatment.

Next, the discharge jogging treatment will be explained with reference to a flow chart shown in FIG. 45.

In the discharge jogging treatment, the jogging solenoid 77 for pushing out a jogging guide of the width regulating member is turned ON, and at the same time a timer EJCT-JOG-TM which can be freely set is started (ejog 1). When the set time of the timer EJCT-JOG-TM is elapsed (ejog 2), the jogging solenoid 77 is turned OFF to return the jogging guide to the initial condition (ejog 3). With this treatment, the originals P are aligned with each other in the widthwise direction, thereby preventing the skew-feed and lateral registration.

(Closed-loop Discharge Jogging Treatment)

Figure 46:
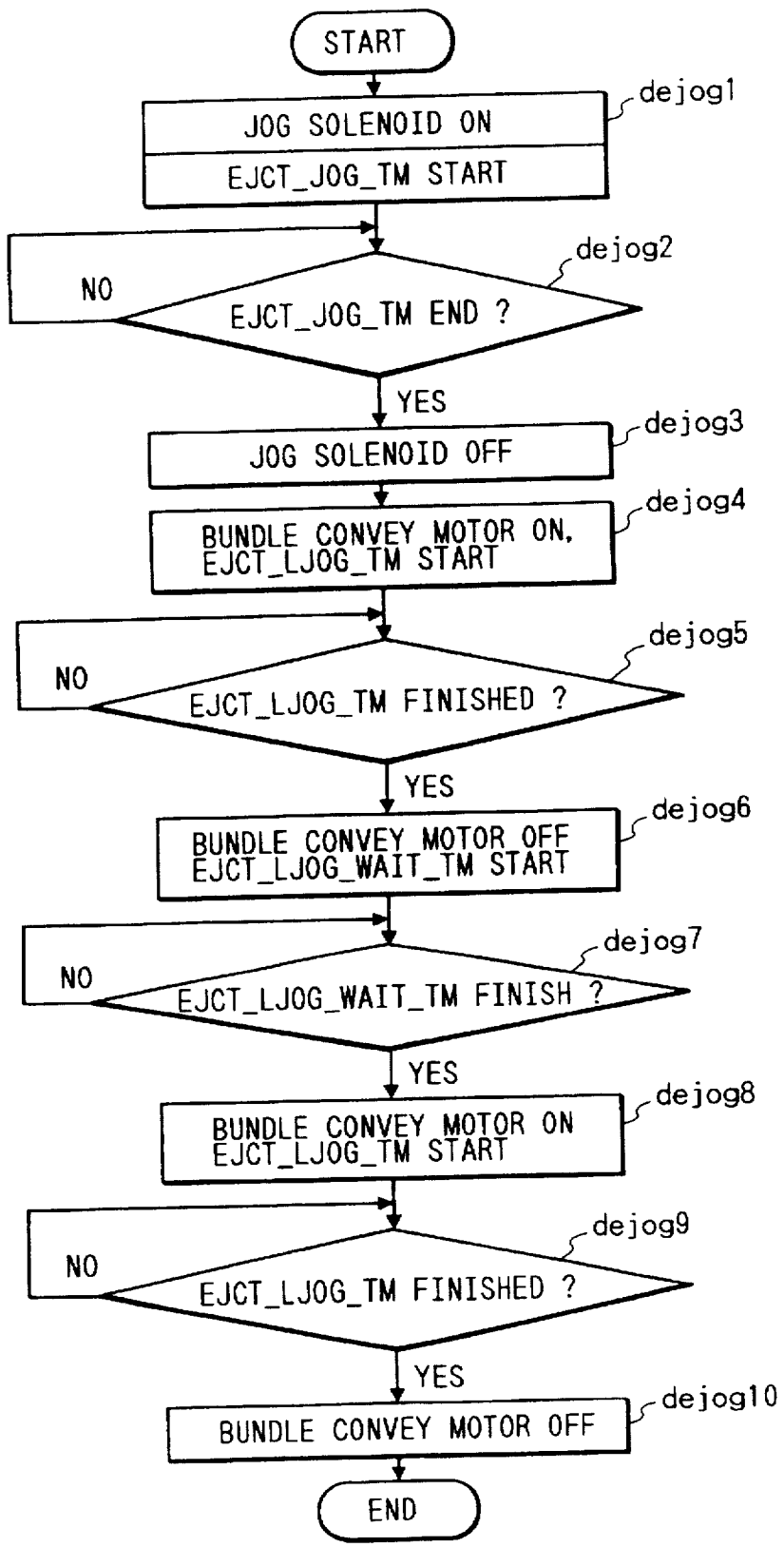
FIG. 46 is a flow chart regarding a closed-loop discharge jogging treatment.

Next, the closed-loop discharge jogging treatment will be explained with reference to a flow chart shown in FIG. 46.

In the closed-loop discharge jogging treatment, the jogging solenoid 77 for pushing out a jogging guide of the width regulating member is turned ON, and at the same time a timer EJCT-JOG-TM which can be freely set is started (dejog 1). When the set time of the timer EJCT-JOG-TM is elapsed (dejog 2), the jogging solenoid 77 is turned OFF to return the jogging guide to the initial condition (dejog 3). With this treatment, the originals P are aligned with each other in the widthwise direction, thereby preventing the skew-feed and lateral registration.

Then, the bundle convey motor 60 is rotated in the direction F and at the same time a timer EJCT-LJOG-TM which can be freely set is started (dejog 4). When the set time of the timer EJCT-JOG-TM is elapsed (dejog 5), the bundle convey motor 60 is stopped, and at the same time a timer EJCT-LJOG-WAIT-TM which can be freely set is started (dejog 6). When the set time of the timer EJCT-LJOG-WAIT-TM is elapsed (dejog 7), the bundle convey motor 60 is rotated in a direction opposite to the direction F, and at the same time the timer EJCT-LJOG-TM which can be freely set is started (dejog 8). When the set time of the timer EJCT-LJOG-TM is elapsed (dejog 9), the bundle convey motor 60 is stopped (dejog 10).

(Size Check Treatment)

Figure 42:
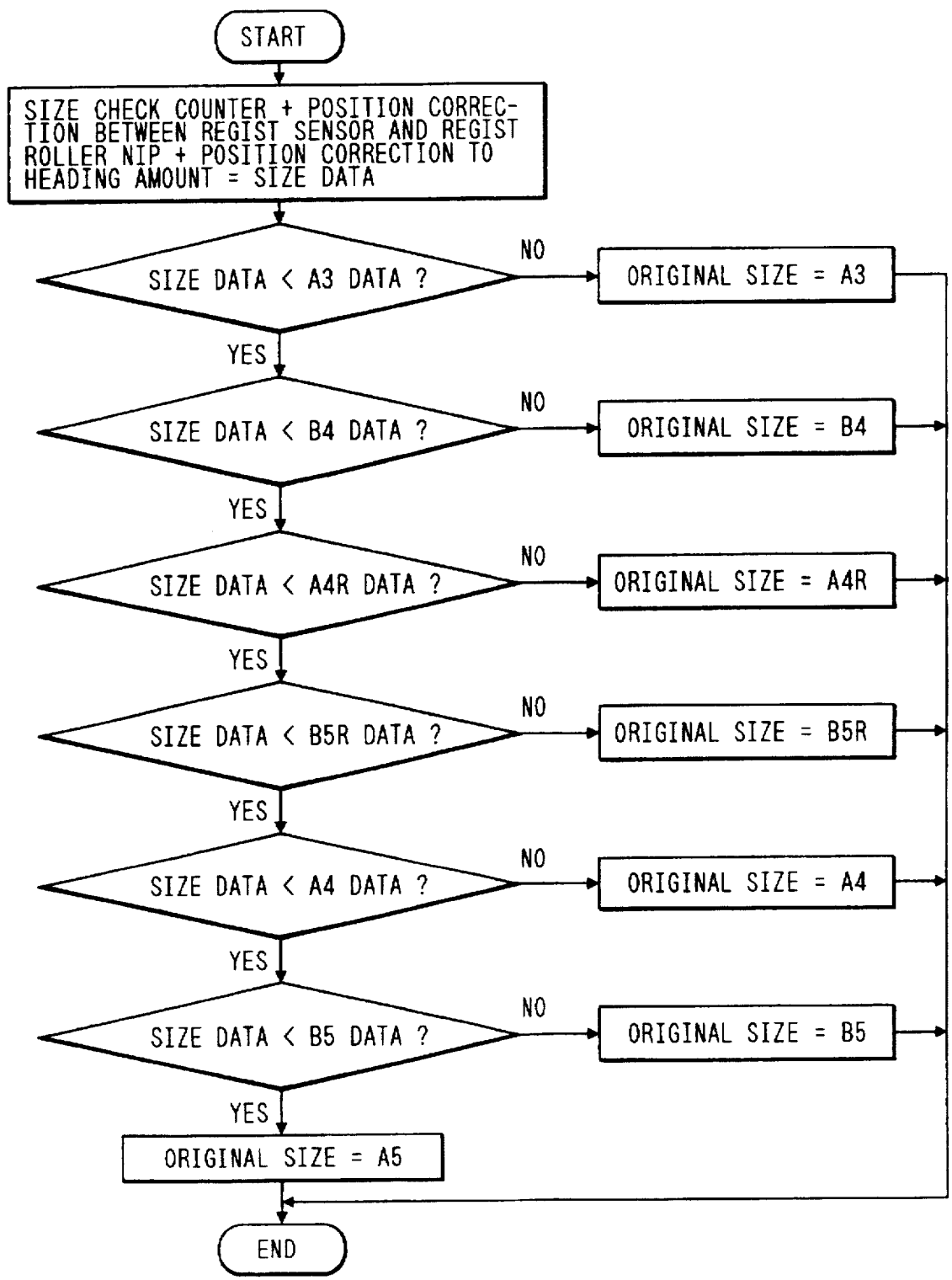
FIG. 42 is a flow chart regarding a size check sub-routine.

Next, the size check sub-routine will be explained with reference to FIG. 42.

In the size check sub-routine, the actual original size is determined by adding the distance between the nip of the regist rollers 6, 6' and the regist sensor 32 and the protruded amount (of the original from the regist rollers) obtained in the left side separation treatment to the data of the size check counter. In this case, the original is being conveyed by the pair of regist rollers 6, 6', and the conveying amount of the original is exactly equal to the count value of the clocks from the reverse rotation motor encoder detection sensor 57. Thereafter, on the basis of the actual original size (corrected data), it is judged whether the original size is A5, B5, A4, B5R, A4R, B4, A3 or the like.

(Clockwise Size Check Treatment)

Next, the clockwise size check sub-routine will be explained with reference to FIG. 43.

In the clockwise size check sub-routine, the actual original size is determined by adding the distance between the nip of the closed-loop regist rollers 11 and the regist sensor 36 and the protruded amount (of the original from the regist rollers) obtained in the clockwise separation treatment to the data of the size check counter. In this case, the original is being conveyed by the closed-loop regist rollers 11, and the conveying amount of the original is exactly equal to the count value of the clocks from the CP resist motor encoder detection sensor 66. Thereafter, on the basis of the actual original size (corrected data), it is judged whether the original size is A5, B5, A4, B5R, A4R, B4, A3 or the like.

(Other Embodiments)

In the above-mentioned embodiment, when the original is copied in the mix mode, while an example that the scans corresponding to the number of sets of each original are effected by flow reading the first original while conveying the original and then by reading the original in the stationary mode by reciprocally shifting the optical system (while fixing the original) by remaining times was explained, for example, when it is desired to effect the scans by n times, first of all, the stationary reading scans may be effected by reciprocally shifting the optical system (while fixing the original) by (n−1) times, and then the last one scan may be effected in the flow reading mode while exchanging the originals. Also in this case, the same advantage can be obtained.

Figure 18A:
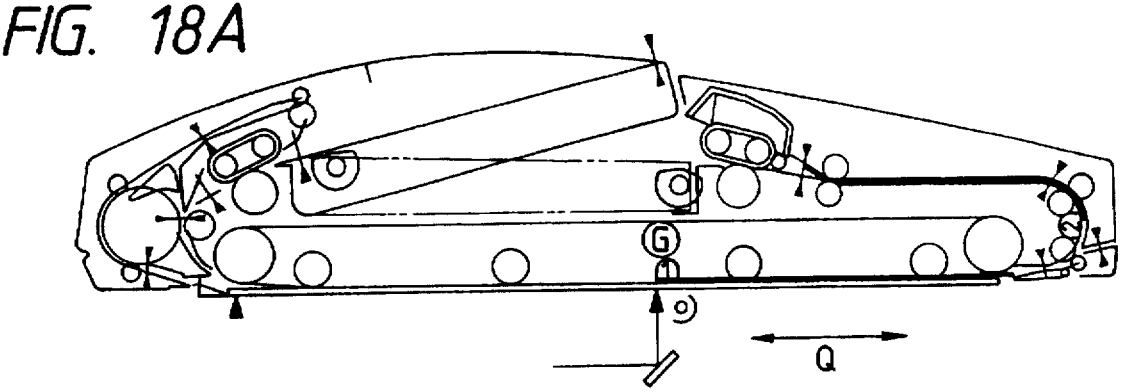
FIGS. 18A to 18D are elevational sectional views of an RDF applied to an image forming apparatus according to another embodiment of the present invention.
Figure 18B:
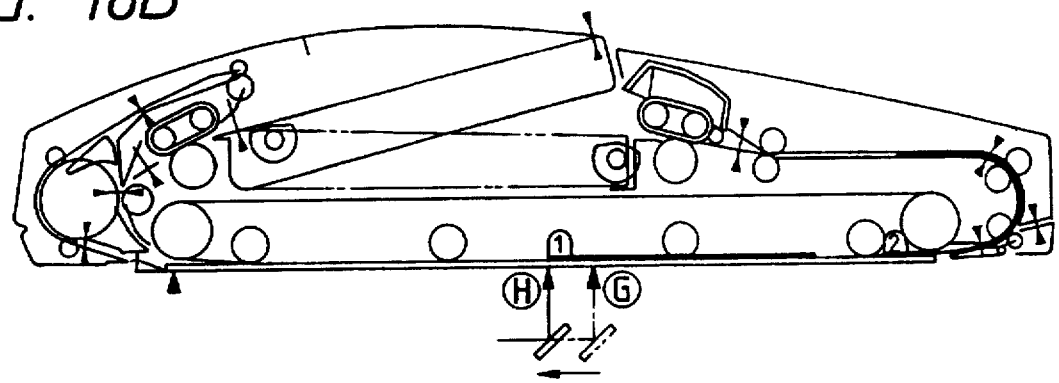
Figure 18C:
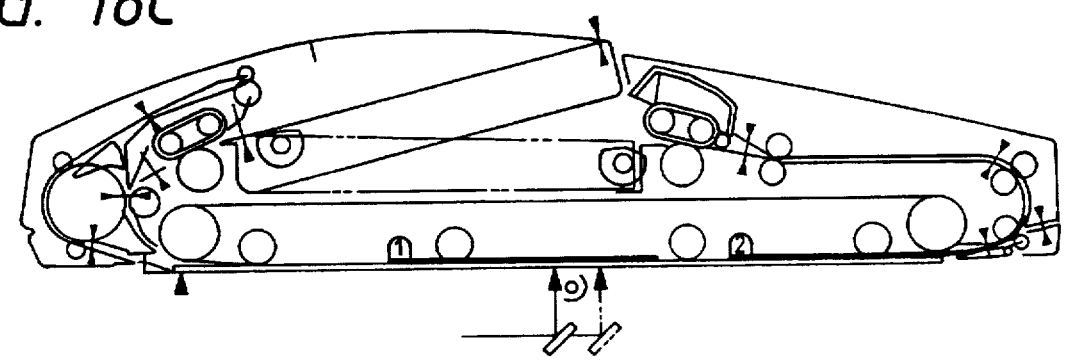
Figure 18D:
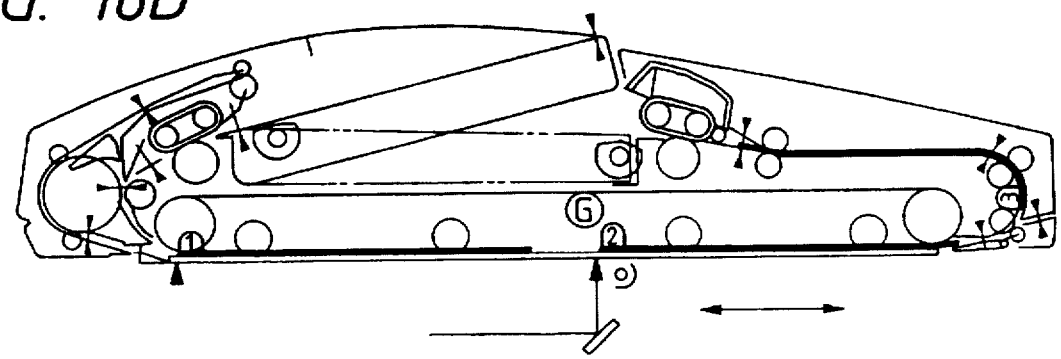
Figure 19:
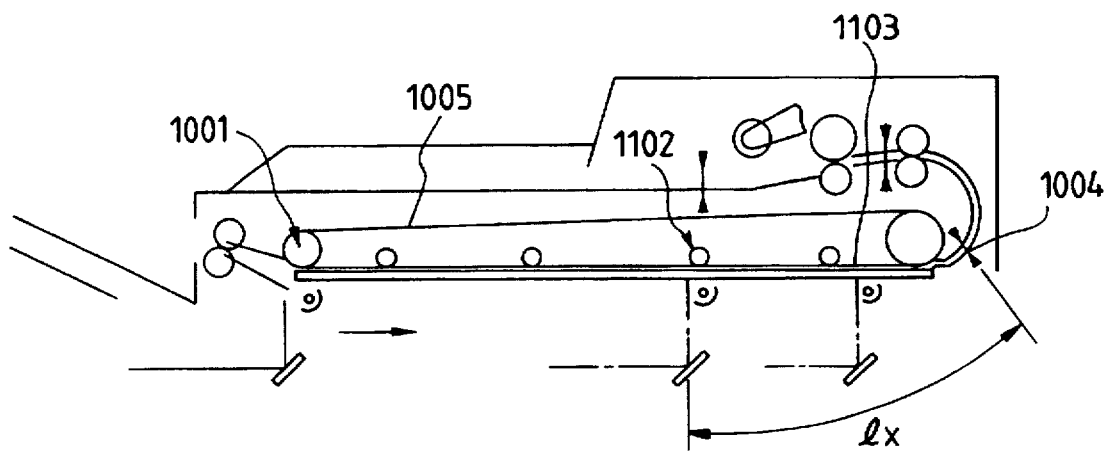
FIG. 19 is an elevational sectional view of a conventional ADF.
Figure 20:
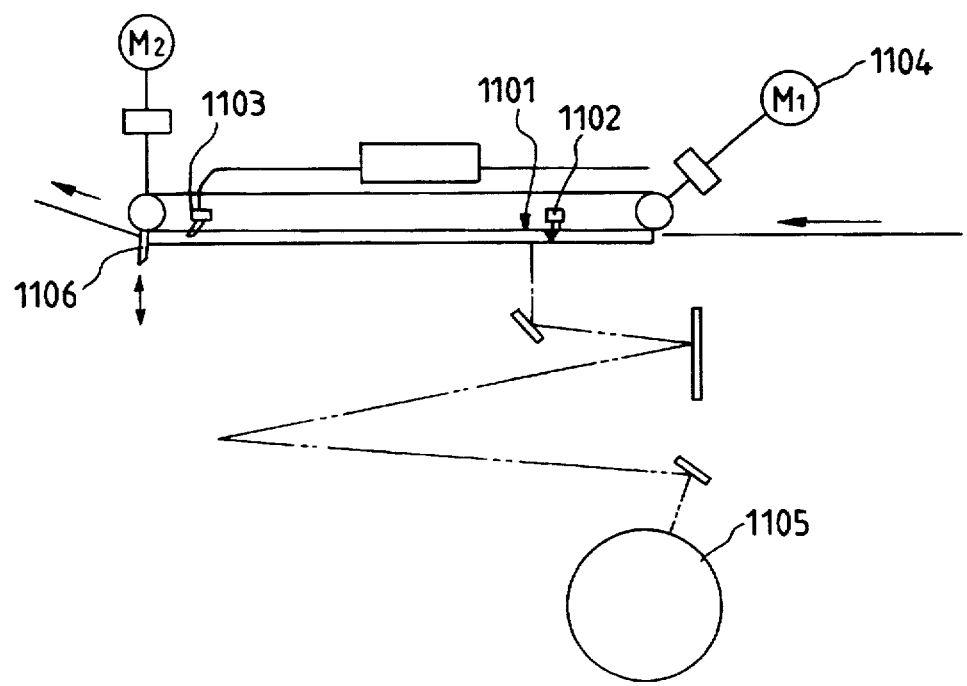
FIG. 20 is an elevational sectional view of another conventional ADF.
Figure 21:
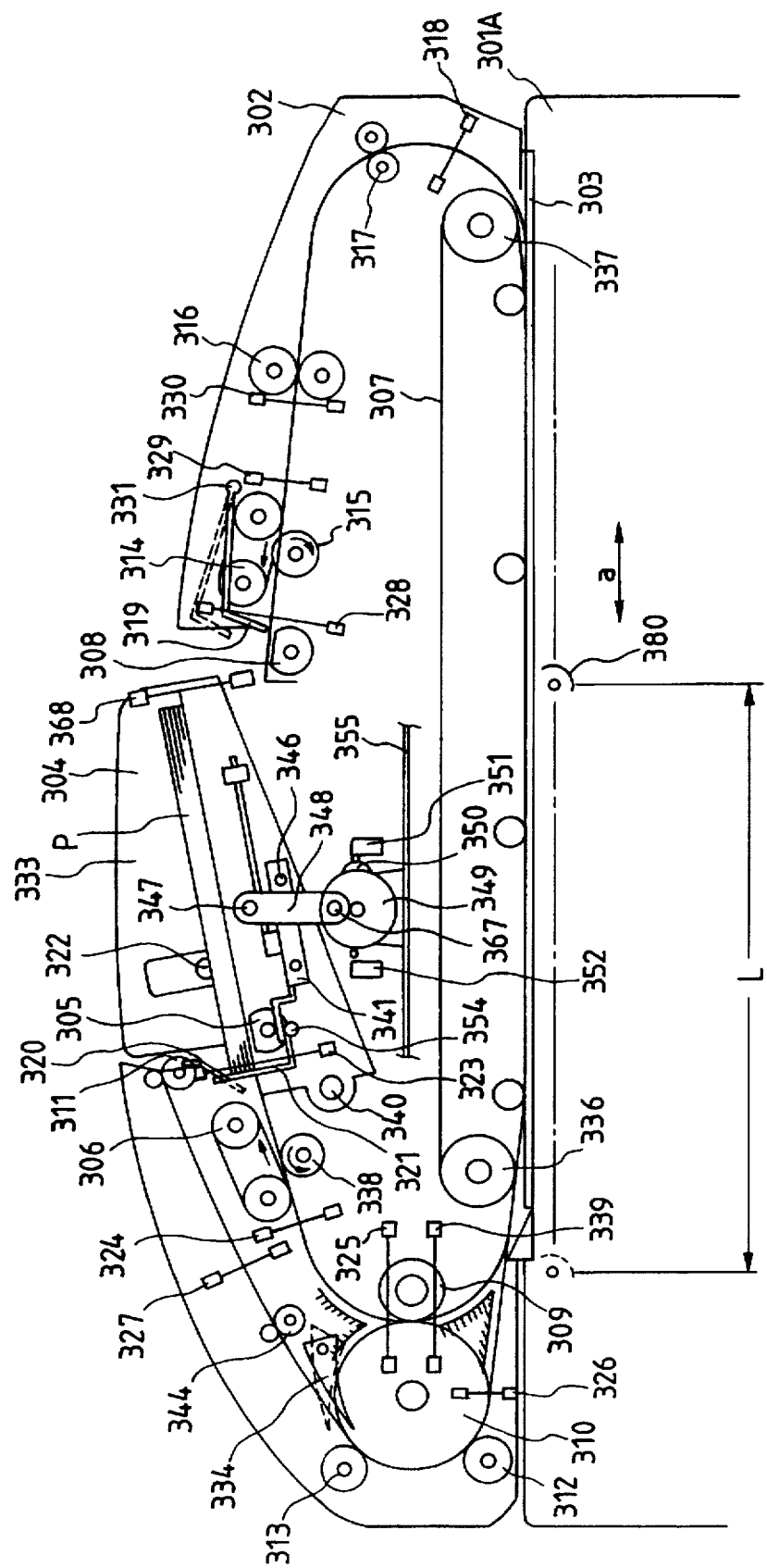
FIG. 21 is an elevational sectional view of a conventional RDF.

Such an arrangement is shown in FIGS. 18A to 18D In FIGS. 18A to 18D, the symbol G denotes a first image tip position when the statinary reading scan is effected by reciprocally shifting the optical system. In this case, the original is fixed, and the optical system is reciprocally shifted in direction shown by the arrow Q. In this condition, first of all, the stationary reading scans are effected by (n−1) times (FIG. 18A). After the stationary reading is finished, the optical system is shifted from the first image tip position G toward the flow reading image tip position H to the left by a running distance through which the speed of the original becomes constant (flow reading speed) (corresponding to the distance $l_1$ in FIG. 5H) and is locked there (FIG. 18B). In this condition, the last (n-th) scan of the first original is effected in the flow reading mode while conveying the original to the left of the platen (FIG. 18C). At the same time, the second original is positioned and stopped at the stationary reading image tip position G. In this case, the exposure portion of the optical system is shifted again from the position H to the position G when the flow reading regarding the first original is finished, thereby continuing the scan. By repeating the above-mentioned operations, the same advantage as that of the first embodiment can be achieved.

What is claimed is:

1. A reading apparatus including an image reading means for reading a sheet original positioned at a reading position and an automatic sheet convey means for conveying the sheet original onto the reading position, and the sheet original can be read through an image flow-reading mode while the sheet original is being conveyed by said automatic sheet convey means by fixing said image reading means, characterized by that:

a convey path for directing the sheet original to the reading position; and a control means for initiating conveyance of the sheet original waiting at a predetermined position in the convey path in response to a flow-reading mode start signal during the image flow-reading mode, and for initiating the image flow-reading when a tip end of the sheet original reaches a flow-reading position, wherein a distance between a tip end of the sheet original waiting at the predetermined position and the flow-reading position is set to have a predetermined running distance so that a convey speed of the sheet original when the tip end of the sheet original reaches the flow-reading position reaches substantially a flow-reading speed.

2. A reading apparatus according to claim 1, wherein the image-flow reading mode and a stationary reading mode effected by shifting said image reading means after the sheet original is positioned at a predetermined position on the reading position can be performed continuously.

3. A reading apparatus according to claim 2, wherein convey and stop of the sheet originals are controlled while keeping a distance between a tip end of a preceding sheet original an image of which is being read and a tip end of a succeeding sheet original constant.

4. A reading apparatus according to claim 2, wherein a waiting position for a sheet original to be flow-read is positioned on said reading position.

5. A reading apparatus according to claim 1, wherein convey and stop of the sheet originals are controlled while keeping a distance between a tip end of a preceding sheet original an image of which is being read and a tip end of a succeeding sheet original constant.

6. A reading apparatus according to claim 1, wherein the stationary reading follows the flow reading.

7. A reading apparatus according to claim 1, wherein the flow reading follows the stationary reading.

8. A reading apparatus according to claim 1, wherein the predetermined waiting position for the sheet original to be flow-read is positioned on said reading position.

9. A reading apparatus according to claim 8, wherein said reading position is on the platen glass.

10. A reading apparatus including an image reading means for reading a sheet original positioned at a reading position and an automatic sheet convey means for conveying the sheet original onto the reading position, and the sheet original can be read through an image flow-reading mode while the sheet original is being conveyed by said automatic sheet convey means by fixing said image reading means characterized by that:

a convey path for directing the sheet original to the reading position; and a control means for initiating the image flow-reading mode when a tip end of the sheet original reaches a flow-reading position, wherein the image flow-reading mode and a stationary-reading mode effected by shifting said image reading means after the sheet original is positioned at a predetermined position on the reading position can be performed continuously, and wherein a distance of a flow-reading position and a reading start position of said reading means in the stationary-reading mode is determined by adding a maximum length of an available sheet original to a deceleration/stop running distance of a drive system.

11. A reading apparatus including an image reading means for reading a sheet original positioned at a reading position and an automatic sheet original convey means for conveying the sheet original onto said reading position, and the sheet original can be read through an image flow-reading mode while the sheet original is being conveyed by said automatic sheet original convey means by fixing said image reading means, characterized by that:

a convey path for directing the sheet original to the reading position; and a control means for initiating conveyance of the sheet original waiting at a predetermined position in said convey path in response to a flow-reading mode start signal during the image flow-reading mode, and for initiating the image reading when a tip end of the sheet original reaches a flow-reading position, wherein the image flow-reading mode and a stationary-reading mode effected by shifting said image reading means after the sheet original is positioned at a predetermined position on the reading position can be performed continuously, wherein a preceding sheet original to be flow-read and a succeeding sheet original are conveyed while keeping a distance between a tip end of the preceding sheet original to be flow-read and a tip end of the succeeding sheet original constant, and wherein the flow-reading position, the predetermined position for stationary-reading and a running distance between a tip end of the sheet original waiting at the predetermined position and the flow-reading position are set so that, after the flow-reading of the preceding sheet original is finished, when the preceding sheet original is positioned to the predetermined position for stationary-reading, the succeeding sheet original is stopped at the predetermined position for waiting.

12. An image forming apparatus comprising:

a reading apparatus according to any one of claims 1, 2, 4, 5, 6, 7, 10 and 11;

an image forming apparatus for forming an image of the read sheet original on a sheet.

13. A reading apparatus including an image reading means for reading a sheet original positioned at a reading position and an automatic sheet convey means for conveying the sheet original onto the reading position, and the sheet original can be read through an image flow-reading mode while the sheet original is being conveyed by said image reading means, characterized by that:

a convey path for directing the sheet original to the reading position; and a control means for initiating conveyance of the sheet original waiting at a predetermined position in the convey path in response to a flow-reading mode start signal during the image flow-reading mode, and for initiating the image flow-reading when a tip end of the sheet original reaches a flow-reading position, wherein a distance between a tip end of the sheet original waiting at the predetermined position and the flow-reading position is set to have a predetermined running distance so that a conveying speed of the sheet original when the tip end of the sheet original reaches the flow-reading position reaches substantially a flow-reading speed, wherein the image flow-reading mode and a stationary-reading mode effected by shifting said image reading means after the sheet original is positioned at a predetermined position on the reading position can be performed continuously, wherein a distance of a flow-reading position and a stationary-reading start position of said reading means in the stationary-reading mode is determined by adding a maximum length of an available sheet original to a deceleration/stop running distance of a drive system, wherein a preceding sheet original to be flow-read and a succeeding sheet original are conveyed while keeping a distance between a tip end of the preceding sheet original to be flow-read and a tip end of the succeeding sheet original constant, and wherein the flow-reading position, the stationary-reading start position and the running distance are set so that, after the flow-reading of the preceding sheet original is finished, when the preceding sheet original is positioned to a stationary-reading start position, the succeeding sheet original is stopped at the predetermined position for waiting.

14. A reading apparatus including an image reading means for reading a sheet original positioned at a reading position and an automatic sheet convey means for conveying the sheet original onto the reading position, and the sheet original can be read through an image flow-reading mode while the sheet original is being conveyed by said automatic sheet convey means by fixing said image reading means, characterized by that:

a convey path for directing the sheet original to the reading position; and a control means for initiating conveyance of the sheet original waiting at a predetermined position in the convey path in response to a flow-reading mode start signal during the image flow-reading mode, and for initiating the image reading mode when a tip end of the sheet original reaches a flow-reading position, wherein a distance between a tip end of the sheet original waiting at the predetermined position and the flow-reading position is set to have a predetermined running distance so that a conveying speed of the sheet original when the tip end of the sheet original reaches the flow-reading position reaches substantially a flow-reading speed, wherein the image flow-reading mode and a stationary-reading mode effected by shifting said image reading means after the sheet original is positioned at a predetermined position on the reading position can be performed continuously, and wherein a distance of a flow-reading position and a reading start position of said reading means in the stationary-reading mode is determined by adding a maximum length of an available sheet original to a deceleration/stop running distance of a drive system.

15. A reading apparatus including an image reading means for reading a sheet original positioned at a reading position and an automatic sheet convey means for conveying the sheet original onto the reading position, and the sheet original can be read through an image flow-reading mode while the sheet original is being conveyed by said automatic sheet convey means by fixing said image reading means, characterized by that:

a convey path for directing the sheet original to the reading position; and a control means for initiating conveyance of the sheet original waiting at a predetermined position in the convey path in response to a flow-reading mode start signal during the image flow-reading mode, and for initiating the image flow-reading when a tip end of the sheet original reaches a flow-reading position, wherein a distance between a tip end of the sheet original waiting at the predetermined position and the flow-reading position is set to have a predetermined running distance so that a conveying speed of the sheet original when the tip end of the sheet original reaches the flow-reading position reaches substantially a flow-reading speed, wherein the image flow-reading mode and a stationary-reading mode effected by shifting said image reading means after the sheet original is positioned at a predetermined position on the reading position can be performed continuously, wherein a preceding sheet original to be flow-read and a succeeding sheet original are conveyed while keeping a distance between a tip end of the preceding sheet original to be flow-read and a tip end of the succeeding sheet original constant, and wherein the flow-reading position, the predetermined position for stationary-reading and said running distance are set so that, after the flow-reading of the preceding sheet original is finished, when the preceding sheet original is positioned to the predetermined position for stationary-reading, the succeeding sheet original is stopped at the predetermined waiting position.

16. A reading apparatus including an image reading means for reading a sheet original and an automatic sheet convey means for conveying the sheet original, and the sheet original can be read through an image flow-reading mode while the sheet original is being conveyed by said automatic sheet convey means by fixing said image reading means, characterized by that:

a convey path for directing the sheet original to the reading means; and a control means for initiating conveyance of the sheet original waiting at a predetermined position in the convey path in response to flow-reading mode start signal, and for initiating the image reading mode when a tip end of the sheet original reaches a flow-reading position of the reading means;

wherein a distance between a tip end of the sheet original waiting at the predetermined position and the flow-reading position is set to have a predetermined running distance so that a conveying speed of the sheet original when the tip end of the sheet original reaches the flow-reading position reaches substantially a flow-reading speed.

17. A reading apparatus according to claim 16, wherein convey and stop of the sheet originals are controlled while keeping a constant distance between a tip end of a preceding sheet original, an image of which is being read, and a tip end of a succeeding sheet original.

18. A reading apparatus according to claim 16, wherein the predetermined position for waiting for a sheet original to be flow-read is positioned on a platen.

19. An image reading apparatus according to claim 16, wherein said image reading means is shiftable between the flow-reading position and a start position for stationary-reading, and shifts to the flow-reading position after completion of stationary-reading by a distance substantially equal to the predetermined running distance.

20. An image reading apparatus comprising an image reading means for reading a sheet original, and an automatic sheet convey means for conveying the sheet original, said image reading apparatus capable of performing a flow-reading, to read an image on the sheet original during conveyance by said sheet convey means and a stationary-reading, to read the image by fixing the sheet original at a predetermined position, wherein, when reading a single sheet original by a predetermined plurality of times the sheet original is read once through the flow-reading mode, and then is read through the stationary-reading mode by fixing the sheet original and shifting said image reading means by the remaining plurality of times, and after completion of stationary-reading of the preceding sheet original, the preceding and the succeeding sheet originals are simultaneously conveyed, wherein the succeeding sheet original is flow-read during the conveyance thereof.

21. An image reading apparatus according to claim 20, wherein, upon stationary-reading of a preceding sheet original, a succeeding sheet original is waiting at an upstream position of a flow-read position.

22. An image reading apparatus according to claim 20, wherein single image reading means is commonly used for the stationary-reading and the flow-reading.

23. An image reading apparatus comprising an image reading means for reading a sheet original, and an automatic sheet original convey means for conveying the sheet original along a convey path, and capable of performing a flow-reading to read an image on the sheet original during conveyance by said sheet original convey means, and a stationary-reading to read the image on the sheet original by fixing the sheet original, wherein, when reading a single sheet original by n-times, the sheet original is stationary-read by fixing it and shifting said image reading means by (n−1) times, and then the sheet original is flow-read once, and, while the preceding sheet original is being flow-read, a succeeding sheet original is conveyed to an upstream side thereof, and after completion of flow-reading of the preceding sheet original, fixing and stationary-reading of the succeeding sheet original are started.

24. An image reading apparatus according to claim 23, wherein when the stationary-reading of the succeeding sheet original is completed, the preceding and succeeding sheet originals are conveyed along the convey path, and during the conveyance the succeeding sheet original is flow-read.

25. An image reading apparatus comprising an image reading means for reading a sheet original on a platen, and an automatic sheet conveying means for conveying the sheet original to the platen, said image reading apparatus capable of performing a flow-reading, to read an image on the sheet original during conveyance by said sheet conveying means and a stationary-reading, to read the image by fixing the sheet original at a predetermined position, wherein when reading a single sheet original by a predetermined plurality of times, the sheet original is read once through a flow-reading mode, and then is read through a stationary-reading mode by fixing the sheet original on the platen and shifting said image reading means by the remaining plurality of times, and upon stationary-reading of a preceding sheet original, a succeeding sheet original is waiting at a waiting position on the platen, and after completion of reading of the preceding sheet original, the flow-reading of the succeeding sheet original is started.

26. An image reading apparatus according to claim 25, wherein the waiting position of the succeeding sheet original is located at an upstream position of the flow-reading position by a distance corresponding to a predetermined running distance so that when the succeeding sheet original tip end reaches the flow-reading position it reaches substantially a flow-reading speed.

27. An image reading apparatus according to claim 25, wherein said image reading means can be shifted to be commonly used for stationary-reading and flow-reading.

28. An image reading apparatus according to claim 27, wherein said image reading means is normally disposed at a stationary-reading position, and is shifted to a flow-reading position to perform flow-reading.

29. An image reading apparatus according to claim 27, wherein said image reading means is shifted to a stationary-reading position when a trail end of a sheet original undergoing flow-reading passes a flow-reading position.

30. An image reading apparatus according to claim 27, wherein said image reading means is shifted to a stationary-reading start position when a trail end of the sheet original undergoing flow-reading passes a flow-reading position thereby, and a distance between the positions corresponds to a length determined by adding a deceleration/stop running distance to the sheet original length.

31. An image reading apparatus according to claim 27, wherein upon stationary-reading said image reading means shifts reciprocally to scan the sheet original, and upon completion said image reading means shifts to a flow-reading position by forward shifting in the last stationary-reading scan.

32. An image reading apparatus according to claim 25, wherein the sheet original in the stationary-reading position and the sheet original in the waiting position are shifted to the next positions along the convey path simultaneously.

33. An image reading apparatus according to claim 25, wherein a stationary-reading position and a flow-reading position are located at one end and the other end of the platen respectively, and the convey path further comprises a first convey path for guiding the sheet original on a sheet original mounting platen from the end of the platen corresponding to the flow-reading position.

34. An image reading apparatus according to claim 33, further comprising a second convey path for guiding the sheet original from the end of the platen corresponding to the stationary-reading position.

35. An image reading apparatus according to claim 34, wherein the sheet original is conveyed through the first convey path or the second convey path according to the size thereof.

36. An image reading apparatus according to claim 34, wherein the sheet original guided by said second convey path is read only through the stationary-reading mode.

37. An image reading apparatus including an image reading means for reading a sheet original on a platen, and an automatic sheet conveying means for conveying the sheet original to the platen, and capable of performing a flow-reading to read an image on the sheet original during conveyance by said sheet conveying means, and capable of performing a stationary-reading to read the image by fixing the sheet original at a position on the platen, wherein, when reading a single sheet original by n-times, the sheet original is stationary-read by fixing the sheet original on the platen and shifting said image reading means by (n−1) times, and then the sheet original is flow-read once, and, while flow-reading the preceding sheet original, a succeeding sheet original is supplied to the platen, and after completion of flow-reading of the preceding sheet original, the fixing and stationary-reading of the succeeding sheet original is started.

38. An image reading apparatus according to claim 37, wherein said image reading means is shifted from a position for stationary-reading to a position for flow-reading.

39. An image reading apparatus according to claim 37, wherein said image reading means is normally disposed at a stationary-reading position, and is shifted to a flow-reading position to perform flow-reading.

40. An image reading apparatus according to claim 39, wherein said image reading means is returned to a start position for stationary-reading when a trail end of the sheet original under the flow-reading passes flow-reading position.

41. An image reading apparatus according to claim 39, wherein a distance between the position for the stationary-reading and the position for the flow-reading correspond to a running distance necessary for the sheet original to reach the flow-reading speed of conveyance by the conveying means.

42. An image reading apparatus according to claim 37, wherein when the succeeding sheet original is stopped at the stationary-reading position, the preceding sheet original having finished flow-reading is stopped on the glass in a waiting position.

43. An image reading apparatus according to claim 42, wherein the sheet original located at the stationary-reading position and the sheet original located at the waiting position are shifted to the next position simultaneously.

44. An image reading apparatus according to claim 37, wherein the stationary-reading position and the flow-reading position are located at one end of the platen, and further comprising a first convey path for guiding the sheet original on a sheet original mounting platen from the one end.

45. An image reading apparatus according to claim 44, wherein a second stationary-reading position is located at another end of the platen, and further comprising a second convey path for guiding the sheet original on a sheet original mounting platen from the another end.

46. An image reading apparatus according to claim 45, wherein the sheet original is conveyed through the first convey path or the second convey path according to the size thereof.

47. An image reading apparatus according to claim 45, wherein the sheet original guided from the other end is read only through the stationary-reading mode.

48. An image reading apparatus comprising image reading means located at a flow-reading position for reading a sheet original, and automatic sheet conveying means for conveying the sheet original, and capable of performing a flow-reading to read an image of the sheet original during conveying by said automatic sheet conveying means, characterized by that:

upon flow-reading, a distance between a waiting position for a sheet original tip end and the flow-reading position is a predetermined distance so that a moving speed of the sheet original, when the tip end of the sheet original waiting at the waiting position reaches the flow-reading position, is equal to a scan speed of the image reading means when performing flow-reading.

49. An image reading apparatus comprising image reading means for reading a sheet original, automatic sheet conveying means for conveying the sheet original, and capable of performing a flow-reading to read an image of the sheet original during conveying to a flow-reading position by said automatic sheet conveying means, and capable of performing a stationary-reading to read an image of the sheet original by locating the sheet original at a stationary-reading position, characterized by that:

upon flow-reading, a distance between the stationary-reading position for a sheet original tip end and the flow-reading position has a predetermined running distance so that a moving speed of the sheet original, when the tip end of sheet original waiting at the stationary-reading position reaches to the flow-reading position, is equal to a scan speed of the image reading means performing flow-reading.

50. An image reading apparatus comprising image reading means for reading a sheet original, automatic sheet conveying means for conveying the sheet original, and capable of performing a flow-reading, to read an image of the sheet original at a flow-reading position during conveying by said automatic sheet conveying means, and a stationary-reading to read an image of the sheet original by stopping the sheet original at a stationary-reading position, characterized by that:

a distance between the flow-reading position and a reading start position of said image reading means performing stationary-reading is selected as a sum of a maximum length of the scannable size of the sheet original and a deceleration/stop running distance of a driving system of said convey means.

51. An image reading apparatus according to claim 50, wherein upon flow-reading, a conveyance for the succeeding sheet original is stopped at a waiting position in synchronism with a stoppage of conveyance for the preceding sheet original for flow-reading, and the preceding and succeeding sheet originals are conveyed while keeping a predetermined interval between a tip end of the sheet original undergoing flow-reading and a tip end of the succeeding sheet original, and the flow-reading position and the running distance are selected in a relation so that the succeeding sheet original is stopped at the waiting position to perform the scanning for flow-reading, after the completion of flow-reading of the preceding sheet original and upon stopping at the waiting position.

52. An image reading apparatus comprising image reading means for reading a sheet original on a platen, automatic sheet original conveying means for conveying the sheet original to the platen, and capable of performing a flow-reading to read an image of the sheet original during conveying of the sheet original by said automatic sheet conveying means, and a stationary-reading to read the image of the sheet original by fixing the sheet original, characterized by that:

when reading a single sheet original by n times, the sheet original is one time read through a flow-reading mode, and is read by (n−1) times through a stationary-reading mode by shifting said image reading means by (n−1) times and fixing the sheet original on the platen, and wherein a preceding and a succeeding sheet original are set on the platen side by side, wherein the preceding sheet original, having finished the reading, is discharged from the platen, and a succeeding sheet original is conveyed along the platen, and a next succeeding sheet original is conveyed onto the platen.

53. An image reading apparatus according to claim 52, wherein the sheet original is first read by the stationary-reading mode, and then is read in the flow-reading mode.

54. An image reading apparatus according to claim 52, wherein the sheet original is first read by the flow-reading mode, and then is read by the stationary-reading mode.

55. An image reading apparatus according to claim 53 or claim 54, wherein the sheet original is read through the flow-reading mode during an exchange of sheet originals.

56. An image reading apparatus according to any one of claims 52, 53, or 54, wherein said image reading means is commonly used for flow-reading and stationary-reading, and is moved between the flow-reading position and the stationary-reading position.

* * * * *

UNITED STATES PATENT AND TRADEMARK OFFICE
CERTIFICATE OF CORRECTION

PATENT NO. : 5,799,237
DATED : August 25, 1998
INVENTOR(S) : Noriyoshi Ueda et al.

It is certified that error appears in the above-identified patent and that said Letters Patent is hereby corrected as shown below:

Column 1,
Line 3, "AND" should read -- AN --; and
Line 32, "to" should be deleted.

Column 6,
Line 9, "upon" should be deleted; and
Line 59, "feature" should read -- feature of --

Column 9,
Line 14, "high" should read -- highly --.

Column 15,
Line 22, "distance $t_1$" should read -- distanc $\ell_1$ --.

Column 19,
Line 60, "are" should read -- is --.

Column 20,
Line 19, "sensor" should read -- sensors --.

Column 21,
Line 14, "illustrated," should read -- illustrated embodiment --; and
Line 47, "upstreamly" should read -- upstream --.

Column 23,
Line 36, "synchronous" should read -- synchronism --; and
Line 52, "rised in sychronous" should read -- risen synchronously --.

Column 28,
Line 25, "statinary" should read -- stationary --; and

Column 29,
Line 47, "position" should read -- position, --; and

UNITED STATES PATENT AND TRADEMARK OFFICE
CERTIFICATE OF CORRECTION

PATENT NO. : 5,799,237      Page 2 of 2
DATED : August 25, 1998
INVENTOR(S) : Noriyoshi Ueda et al.

Figure 35:
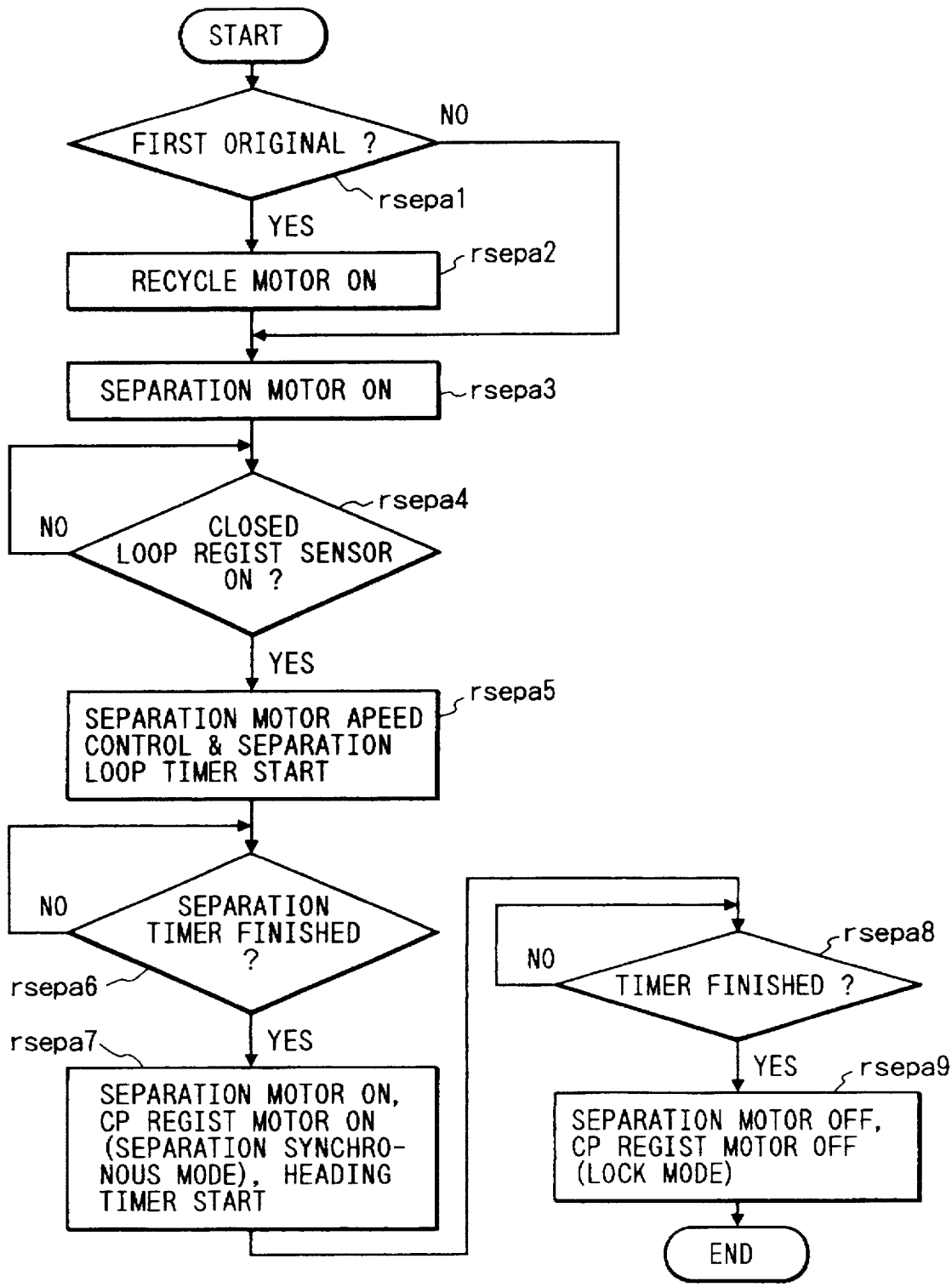
FIG. 35 is a flow chart regarding a clockwise separation treatment.

It is certified that error appears in the above-identified patent and that said Letters Patent is hereby corrected as shown below:

Figure 35,
"APEED" should read -- SPEED --.

Signed and Sealed this

Twenty-eighth Day of May, 2002

Attest:

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 5,799,237
DATED : August 25, 1998
INVENTOR(S) : Ueda et al.

Page 1 of 1

It is certified that error appears in the above-identified patent and that said Letters Patent is hereby corrected as shown below:

<u>Title page,</u>
Item [54], Title, should read -- READING APPARATUS IN WHICH IMAGE RECORDING MEANS MAY BE FIXED TO READ AN ORIGINAL BEING CONVEYED --.

Signed and Sealed this

Second Day of May, 2006

JON W. DUDAS
*Director of the United States Patent and Trademark Office*